(12) United States Patent
Dussan et al.

(10) Patent No.: US 12,736,637 B2
(45) Date of Patent: Sep. 15, 2026

(54) HYPER TEMPORAL LIDAR USING MULTIPLE MATCHED FILTERS TO DETERMINE TARGET RETRO-REFLECTIVITY

(71) Applicant: AEye, Inc., Pleasanton, CA (US)

(72) Inventors: Luis Dussan, Dublin, CA (US); Allan Steinhardt, Dublin, CA (US); Joel Benscoter, Dublin, CA (US); Todd Gustavson, Dublin, CA (US)

(73) Assignee: AEye, Inc., Pleasanton, CA (US)

( * ) Notice: Subject to any disclaimer, the term of this patent is extended or adjusted under 35 U.S.C. 154(b) by 999 days.

(21) Appl. No.: 17/525,006

(22) Filed: Nov. 12, 2021

(65) Prior Publication Data

US 2022/0308187 A1 Sep. 29, 2022

Related U.S. Application Data

(60) Provisional application No. 63/219,034, filed on Jul. 7, 2021, provisional application No. 63/209,179, filed
(Continued)

(51) Int. Cl.
*G01S 7/4863* (2020.01)
*G01S 7/481* (2006.01)
(Continued)

(52) U.S. Cl.
CPC .......... *G01S 7/4863* (2013.01); *G01S 7/4814* (2013.01); *G01S 7/4816* (2013.01); *G01S 7/4817* (2013.01);
(Continued)

(58) Field of Classification Search
None
See application file for complete search history.

(56) References Cited

U.S. PATENT DOCUMENTS 4,017,146 A 4/1977 Lichtman
4,579,430 A 4/1986 Bille
(Continued)

FOREIGN PATENT DOCUMENTS

CN 1424591 A 6/2003
CN 102023082 A 4/2011
(Continued)

OTHER PUBLICATIONS

Office Action for U.S. Appl. No. 17/525,034 dated Jan. 13, 2023.
(Continued)

*Primary Examiner* — Matthew G Marini
(74) *Attorney, Agent, or Firm* — Ahmann Kloke LLP

(57) ABSTRACT

A lidar system comprises a photodetector circuit and a signal processing circuit. The photodetector circuit comprises an array of pixels for sensing incident light. The signal processing circuit processes a signal representative of the sensed incident light to detect a reflection of a laser pulse from a target within a field of view. The signal processing circuit can comprise a matched filter corresponding to a retro-reflective target that is tuned to a reflected pulse shape that exhibits a vertical clipping relative to a transmitted pulse shape for the laser pulse that is indicative of the retro-reflective target, and wherein the signal processing circuit determines a retro-reflector status for the target based how the matched filter responds to the applied signal.

28 Claims, 44 Drawing Sheets

Related U.S. Application Data on Jun. 10, 2021, provisional application No. 63/186,661, filed on May 10, 2021, provisional application No. 63/166,475, filed on Mar. 26, 2021.

(51) Int. Cl.

| | |
|---|---|
| ***G01S 7/484*** | (2006.01) |
| ***G01S 7/4865*** | (2020.01) |
| ***G01S 17/18*** | (2020.01) |
| ***G01S 17/89*** | (2020.01) |
| ***G01S 17/894*** | (2020.01) |
| ***G01S 17/931*** | (2020.01) |
| ***G02B 26/08*** | (2006.01) |
| ***G02B 27/00*** | (2006.01) |
| ***H01S 3/00*** | (2006.01) |
| ***H01S 3/067*** | (2006.01) |
| ***H01S 3/094*** | (2006.01) |

(52) U.S. Cl.

CPC ............ *G01S 7/484* (2013.01); *G01S 7/4865* (2013.01); *G01S 17/18* (2020.01); *G01S 17/89* (2013.01); *G01S 17/894* (2020.01); *G01S 17/931* (2020.01); *G02B 26/0816* (2013.01); *G02B 27/0081* (2013.01); *H01S 3/0071* (2013.01); *H01S 3/06754* (2013.01); *H01S 3/094003* (2013.01); *H01S 3/094038* (2013.01)

(56) References Cited

U.S. PATENT DOCUMENTS 4,888,785 A 12/1989 Lee
4,907,337 A 3/1990 Krusi
5,408,351 A 4/1995 Huang
5,552,893 A 9/1996 Akasu
5,596,600 A 1/1997 Dimos et al.
5,625,644 A 4/1997 Myers
5,638,164 A 6/1997 Landau
5,808,775 A 9/1998 Inagaki et al.
5,815,250 A 9/1998 Thomson et al.
5,831,719 A 11/1998 Berg et al.
5,870,181 A 2/1999 Andressen
6,031,601 A 2/2000 McCusker et al.
6,205,275 B1 3/2001 Melville
6,245,590 B1 6/2001 Wine et al.
6,288,816 B1 9/2001 Melville et al.
6,330,523 B1 12/2001 Kacyra et al.
6,704,619 B1 3/2004 Coleman et al.
6,836,320 B2 12/2004 Deflumere et al.
6,847,462 B1 1/2005 Kacyra et al.
6,926,227 B1 8/2005 Young et al.
7,038,608 B1 5/2006 Gilbert
7,206,063 B2 4/2007 Anderson et al.
7,236,235 B2 6/2007 Dimsdale
7,397,019 B1 7/2008 Byars et al.
7,436,494 B1 10/2008 Kennedy et al.
7,532,311 B2 5/2009 Henderson et al.
7,701,558 B2 4/2010 Walsh et al.
7,800,736 B2 9/2010 Pack et al.
7,878,657 B2 2/2011 Hajjar
7,894,044 B1 2/2011 Sullivan
7,944,548 B2 5/2011 Eaton
8,072,663 B2 12/2011 O'Neill et al.
8,081,301 B2 12/2011 Stann et al.
8,120,754 B2 2/2012 Kaehler
8,228,579 B2 7/2012 Sourani
8,427,657 B2 4/2013 Milanovi
8,635,091 B2 1/2014 Amigo et al.
8,681,319 B2 3/2014 Tanaka et al.
8,896,818 B2 11/2014 Walsh et al.
9,052,721 B1 6/2015 Dowdall et al.
9,069,061 B1 6/2015 Harwit
9,085,354 B1 7/2015 Peeters et al.
9,128,190 B1 9/2015 Ulrich et al.
9,261,881 B1 2/2016 Ferguson et al.
9,278,689 B1 3/2016 Delp
9,285,477 B1 3/2016 Smith et al.
9,305,219 B2 4/2016 Ramalingam et al.
9,315,178 B1 4/2016 Ferguson et al.
9,336,455 B1 5/2016 Withers et al.
9,360,554 B2 6/2016 Retterath et al.
9,383,753 B1 7/2016 Templeton et al.
9,437,053 B2 9/2016 Jenkins et al.
9,516,244 B2 12/2016 Borowski
9,575,184 B2 2/2017 Gilliland et al.
9,581,967 B1 2/2017 Krause
9,651,417 B2 5/2017 Shpunt et al.
9,679,367 B1 6/2017 Wald et al.
9,689,987 B1 6/2017 Jannson et al.
9,784,835 B1 10/2017 Droz et al.
9,841,495 B2 12/2017 Campbell et al.
9,885,778 B2 2/2018 Dussan
9,897,687 B1 2/2018 Campbell et al.
9,897,689 B2 2/2018 Dussan
9,933,513 B2 4/2018 Dussan et al.
9,958,545 B2 5/2018 Eichenholz et al.
10,007,001 B1 6/2018 LaChapelle et al.
10,042,043 B2 8/2018 Dussan
10,042,159 B2 8/2018 Dussan et al.
10,073,166 B2 9/2018 Dussan
10,078,133 B2 9/2018 Dussan
10,088,558 B2 10/2018 Dussan
10,134,280 B1 11/2018 You
10,185,028 B2 1/2019 Dussan et al.
10,209,349 B2 2/2019 Dussan et al.
10,215,848 B2 2/2019 Dussan
10,282,591 B2 5/2019 Lindner et al.
10,379,205 B2 8/2019 Dussan et al.
10,386,464 B2 8/2019 Dussan
10,386,467 B2 8/2019 Dussan et al.
10,386,487 B1 8/2019 Wilton et al.
10,473,770 B1 * 11/2019 Zhu ...................... G01S 17/931
10,495,757 B2 12/2019 Dussan et al.
10,509,112 B1 12/2019 Pan
10,598,788 B1 3/2020 Dussan et al.
10,641,872 B2 5/2020 Dussan et al.
10,641,873 B2 5/2020 Dussan et al.
10,641,897 B1 5/2020 Dussan et al.
10,641,900 B2 5/2020 Dussan et al.
10,642,029 B2 5/2020 Dussan et al.
10,656,252 B1 5/2020 Dussan et al.
10,656,272 B1 5/2020 Dussan et al.
10,656,277 B1 5/2020 Dussan et al.
10,663,596 B2 5/2020 Dussan et al.
10,670,718 B1 6/2020 Dussan et al.
10,698,114 B2 6/2020 Keilaf et al.
10,754,015 B2 8/2020 Dussan et al.
10,761,196 B2 9/2020 Dussan et al.
10,782,393 B2 9/2020 Dussan et al.
10,797,460 B2 10/2020 Shand
10,908,262 B2 2/2021 Dussan
10,908,265 B2 2/2021 Dussan
10,921,450 B2 2/2021 Dussan et al.
11,002,857 B2 5/2021 Dussan et al.
11,092,676 B2 8/2021 Dussan et al.
11,119,219 B1 9/2021 LaChapelle et al.
11,175,386 B2 11/2021 Dussan et al.
11,300,667 B1 4/2022 Feru et al.
11,442,152 B1 9/2022 Feru et al.
11,448,734 B1 9/2022 Feru et al.
11,460,552 B1 10/2022 Feru et al.
11,460,553 B1 10/2022 Feru et al.
11,460,556 B1 10/2022 Feru et al.
11,467,263 B1 10/2022 Greene et al.
11,474,212 B1 10/2022 Feru et al.
11,474,213 B1 10/2022 Feru et al.
11,474,214 B1 10/2022 Greene et al.
11,480,680 B2 10/2022 Reddy et al.
11,486,977 B2 11/2022 Greene et al.
11,493,610 B2 11/2022 Feru et al.
11,500,093 B2 11/2022 Dussan et al.
11,604,264 B2 3/2023 Benscoter et al.
11,619,740 B2 4/2023 Reddy et al.

(56) References Cited

U.S. PATENT DOCUMENTS 11,630,188 B1 4/2023 Feru et al.
11,635,495 B1 4/2023 Benscoter et al.
11,675,059 B2 6/2023 Feru et al.
11,686,845 B2 6/2023 Reddy et al.
11,686,846 B2 6/2023 Reddy et al.
11,796,643 B2 10/2023 Morarity et al.
11,822,016 B2 11/2023 Dussan et al.
2002/0039391 A1 4/2002 Wang et al.
2002/0176067 A1 11/2002 Charbon
2003/0122687 A1 7/2003 Trajkovic et al.
2003/0151542 A1 8/2003 Steinlechner et al.
2003/0156658 A1 8/2003 Dartois
2003/0198271 A1 10/2003 Matveev
2004/0156336 A1 8/2004 McFarland et al.
2004/0254728 A1 12/2004 Poropat
2005/0024595 A1 2/2005 Suzuki
2005/0057654 A1 3/2005 Byren
2005/0179581 A1 8/2005 Matsuura
2005/0216237 A1 9/2005 Adachi et al.
2006/0007362 A1 1/2006 Lee et al.
2006/0176468 A1 8/2006 Anderson et al.
2006/0197936 A1 9/2006 Liebman et al.
2006/0227315 A1 10/2006 Beller
2006/0265147 A1 11/2006 Yamaguchi et al.
2006/0269027 A1 11/2006 Beadle et al.
2007/0024956 A1 2/2007 Coyle
2008/0095042 A1 4/2008 McHenry et al.
2008/0136626 A1 6/2008 Hudson et al.
2008/0159591 A1 7/2008 Ruedin
2008/0231494 A1 9/2008 Galati
2009/0059201 A1 3/2009 Willner et al.
2009/0128864 A1 5/2009 Inage
2009/0242468 A1 10/2009 Corben et al.
2009/0292468 A1 11/2009 Wu et al.
2009/0318815 A1 12/2009 Barnes et al.
2010/0027602 A1 2/2010 Abshire et al.
2010/0053715 A1 3/2010 O'Neill et al.
2010/0165322 A1 7/2010 Kane et al.
2010/0204964 A1 8/2010 Pack et al.
2011/0066262 A1 3/2011 Kelly et al.
2011/0085155 A1 4/2011 Stann et al.
2011/0149268 A1 6/2011 Marchant et al.
2011/0149360 A1 6/2011 Sourani
2011/0153367 A1 6/2011 Amigo et al.
2011/0260036 A1 10/2011 Baraniuk et al.
2011/0279366 A1 11/2011 Lohbihler
2011/0282622 A1 11/2011 Canter
2011/0317147 A1 12/2011 Campbell et al.
2012/0038817 A1 2/2012 McMackin et al.
2012/0038903 A1 2/2012 Weimer et al.
2012/0044093 A1 2/2012 Pala
2012/0044476 A1 2/2012 Earhart et al.
2012/0154785 A1 6/2012 Gilliland et al.
2012/0236379 A1 9/2012 da Silva et al.
2012/0249996 A1 10/2012 Tanaka et al.
2012/0257186 A1 10/2012 Rieger et al.
2013/0016251 A1 1/2013 Ogasahara
2013/0050676 A1 2/2013 d'Aligny
2013/0293684 A1 11/2013 Becker et al.
2014/0021354 A1 1/2014 Gagnon et al.
2014/0078514 A1 3/2014 Zhu
2014/0201126 A1 7/2014 Zadeh et al.
2014/0211194 A1 7/2014 Pacala et al.
2014/0291491 A1 10/2014 Shpunt et al.
2014/0300732 A1 10/2014 Friend et al.
2014/0350836 A1 11/2014 Stettner et al.
2015/0006616 A1 1/2015 Walley et al.
2015/0046078 A1 2/2015 Biess et al.
2015/0081211 A1 3/2015 Zeng et al.
2015/0146189 A1 5/2015 Kim
2015/0160340 A1 6/2015 Grauer et al.
2015/0260843 A1 9/2015 Lewis
2015/0268333 A1 9/2015 Schneider et al.
2015/0269439 A1 9/2015 Versace et al.
2015/0285625 A1 10/2015 Deane
2015/0304634 A1 10/2015 Karvounis
2015/0331113 A1 11/2015 Stettner et al.
2015/0334371 A1 11/2015 Galera et al.
2015/0369920 A1 12/2015 Setono et al.
2015/0378011 A1 12/2015 Owechko
2015/0378187 A1 12/2015 Heck et al.
2016/0003946 A1 1/2016 Gilliland et al.
2016/0005229 A1 1/2016 Lee et al.
2016/0041266 A1 2/2016 Smits
2016/0047895 A1 2/2016 Dussan
2016/0047896 A1 2/2016 Dussan
2016/0047897 A1 2/2016 Dussan
2016/0047898 A1 2/2016 Dussan
2016/0047899 A1 2/2016 Dussan
2016/0047900 A1 2/2016 Dussan
2016/0047903 A1 2/2016 Dussan
2016/0054735 A1 2/2016 Switkes et al.
2016/0069998 A1 3/2016 Takasuka et al.
2016/0146595 A1 5/2016 Boufounos et al.
2016/0274589 A1 9/2016 Templeton et al.
2016/0291134 A1 10/2016 Droz et al.
2016/0293647 A1 10/2016 Lin et al.
2016/0313445 A1 10/2016 Bailey et al.
2016/0379094 A1 12/2016 Mittal et al.
2017/0003392 A1 1/2017 Bartlett et al.
2017/0043771 A1 2/2017 Ibanez-Guzman et al.
2017/0094150 A1 3/2017 Chang et al.
2017/0158239 A1 6/2017 Dhome et al.
2017/0176575 A1 6/2017 Smits
2017/0199280 A1 7/2017 Nazemi et al.
2017/0205873 A1 7/2017 Shpunt et al.
2017/0211932 A1 7/2017 Zadravec et al.
2017/0219695 A1 8/2017 Hall et al.
2017/0234973 A1 8/2017 Axelsson
2017/0242102 A1 8/2017 Dussan et al.
2017/0242103 A1 8/2017 Dussan
2017/0242104 A1 8/2017 Dussan
2017/0242105 A1 8/2017 Dussan et al.
2017/0242106 A1 8/2017 Dussan et al.
2017/0242107 A1 8/2017 Dussan et al.
2017/0242108 A1 8/2017 Dussan et al.
2017/0242109 A1 8/2017 Dussan et al.
2017/0263048 A1 9/2017 Glaser et al.
2017/0269197 A1 9/2017 Hall et al.
2017/0269198 A1 9/2017 Hall et al.
2017/0269209 A1 9/2017 Hall et al.
2017/0269215 A1 9/2017 Hall et al.
2017/0307876 A1 10/2017 Dussan et al.
2018/0031703 A1 2/2018 Ngai et al.
2018/0075309 A1 3/2018 Sathyanarayana et al.
2018/0088214 A1 3/2018 O'Keeffe
2018/0088236 A1 3/2018 Eichenholz et al.
2018/0113200 A1 4/2018 Steinberg et al.
2018/0120436 A1 5/2018 Smits
2018/0143300 A1 5/2018 Dussan
2018/0143324 A1 5/2018 Keilaf et al.
2018/0164439 A1 6/2018 Droz et al.
2018/0188355 A1 7/2018 Bao et al.
2018/0203121 A1 7/2018 Mullen et al.
2018/0206743 A1 7/2018 Shamain et al.
2018/0224533 A1 8/2018 Dussan et al.
2018/0238998 A1 8/2018 Dussan et al.
2018/0239000 A1 8/2018 Dussan et al.
2018/0239001 A1 8/2018 Dussan et al.
2018/0239004 A1 8/2018 Dussan et al.
2018/0239005 A1 8/2018 Dussan et al.
2018/0275249 A1 9/2018 Campbell et al.
2018/0284224 A1 10/2018 Weed et al.
2018/0284234 A1 10/2018 Curatu
2018/0284245 A1 10/2018 LaChapelle et al.
2018/0284278 A1 10/2018 Russell et al.
2018/0284279 A1 10/2018 Campbell et al.
2018/0299534 A1 10/2018 LaChapelle et al.
2018/0299552 A1 10/2018 Shu et al.
2018/0306927 A1 10/2018 Slutsky et al.
2018/0341103 A1 11/2018 Dussan et al.
2018/0356500 A1 12/2018 Ingram et al.
2018/0356528 A1 12/2018 Schaffner et al.
2018/0372870 A1 12/2018 Puglia

(56) References Cited

U.S. PATENT DOCUMENTS

2018/0372875 A1 12/2018 Juelsgaard et al.
2019/0011567 A1 1/2019 Pacala et al.
2019/0018119 A1 1/2019 La ifenfeld et al.
2019/0025407 A1 1/2019 Dussan
2019/0033430 A1 1/2019 Ingram et al.
2019/0041503 A1 2/2019 Shand
2019/0056497 A1 2/2019 Pacala et al.
2019/0056498 A1 2/2019 Sonn et al.
2019/0064323 A1 2/2019 Mayer et al.
2019/0069051 A1 2/2019 Al-Stouhi et al.
2019/0086514 A1 3/2019 Dussan et al.
2019/0086522 A1 3/2019 Kubota et al.
2019/0086550 A1 3/2019 Dussan et al.
2019/0097393 A1 3/2019 Moench et al.
2019/0101628 A1 4/2019 Roger et al.
2019/0107606 A1 4/2019 Russell et al.
2019/0154832 A1 5/2019 Maleki et al.
2019/0179026 A1 6/2019 Englard et al.
2019/0195990 A1 6/2019 Shand
2019/0250273 A1 8/2019 Honkanen et al.
2019/0271767 A1 9/2019 Keilaf et al.
2019/0317217 A1 10/2019 Day et al.
2019/0318177 A1* 10/2019 Steinberg .............. G01S 7/4808
2019/0353975 A1 11/2019 Didomenico
2019/0355773 A1 11/2019 Field et al.
2019/0363210 A1 11/2019 Do Valle et al.
2019/0369242 A1 12/2019 Wang et al.
2020/0025886 A1 1/2020 Dussan et al.
2020/0025887 A1 1/2020 Dussan et al.
2020/0025923 A1 1/2020 Eichenholz
2020/0041618 A1 2/2020 Pelz et al.
2020/0103507 A1 4/2020 Kirillov et al.
2020/0116825 A1 4/2020 Keller et al.
2020/0132818 A1 4/2020 Dussan et al.
2020/0158838 A1 5/2020 Henderson et al.
2020/0172095 A1 6/2020 Berger et al.
2020/0183013 A1 6/2020 Iguchi et al.
2020/0191959 A1 6/2020 Zheng et al.
2020/0191962 A1 6/2020 Farris
2020/0200877 A1 6/2020 Yoo et al.
2020/0200878 A1 6/2020 Dussan et al.
2020/0200884 A1 6/2020 Zhu et al.
2020/0209355 A1 7/2020 Pacala et al.
2020/0209400 A1 7/2020 Dussan et al.
2020/0217934 A1 7/2020 Ingram et al.
2020/0225324 A1 7/2020 Dussan et al.
2020/0264286 A1 8/2020 Dussan et al.
2020/0271764 A1 8/2020 Zhu et al.
2020/0278431 A1 9/2020 Zhu et al.
2020/0296304 A1 9/2020 Strand et al.
2020/0333585 A1 10/2020 Van Lierop et al.
2020/0333587 A1 10/2020 Dussan et al.
2020/0341144 A1 10/2020 Pacala et al.
2020/0341146 A1 10/2020 Dussan et al.
2020/0341147 A1 10/2020 Dussan et al.
2020/0386867 A1 12/2020 Darrer et al.
2020/0386868 A1 12/2020 Donovan et al.
2020/0386876 A1 12/2020 Kudla et al.
2020/0400788 A1 12/2020 Van Lierop et al.
2021/0003679 A1 1/2021 Dussan et al.
2021/0058592 A1 2/2021 Akanuma
2021/0072390 A1 3/2021 Baek et al.
2021/0109197 A1 4/2021 O'Keeffe
2021/0109199 A1 4/2021 Hennecke et al.
2021/0141059 A1 5/2021 Dussan
2021/0144325 A1 5/2021 Jin et al.
2021/0199781 A1 7/2021 Jin et al.
2021/0247499 A1 8/2021 Zhu et al.
2021/0271072 A1 9/2021 Schroedter et al.
2021/0364611 A1 11/2021 Dussan et al.
2022/0021174 A1 1/2022 Stultz et al.
2022/0026573 A1 1/2022 Baribault et al.
2022/0026576 A1 1/2022 Baribault et al.
2022/0075067 A1 3/2022 Dussan et al.
2022/0308171 A1 9/2022 Greene et al.
2022/0308176 A1 9/2022 Feru et al.
2022/0308177 A1 9/2022 Feru et al.
2022/0317247 A1 10/2022 Greene et al.
2022/0317248 A1 10/2022 Greene et al.
2022/0317249 A1 10/2022 Greene et al.
2022/0317255 A1 10/2022 Reddy et al.
2022/0373654 A1 11/2022 Benscoter et al.
2023/0044929 A1 2/2023 Benscoter et al.
2023/0148066 A1 5/2023 Benscoter et al.
2023/0251355 A1 8/2023 Feru et al.
2023/0393245 A1 12/2023 Finkelstein et al.

FOREIGN PATENT DOCUMENTS

CN 101589316 B 8/2012
CN 102667571 A 9/2012
CN 103033806 A 4/2013
CN 103885065 B 4/2016
CN 103324945 B 12/2016
CN 110892288 A 3/2020
CN 107076838 B 11/2021
EP 2957926 A1 12/2015
EP 1901093 B1 11/2018
JP H0798381 A 4/1995
JP H11-153664 A 6/1999
JP 2000056018 A 2/2000
JP 2000509150 A 7/2000
JP 2003256820 A 9/2003
JP 2004157044 A 6/2004
JP 2005331273 A 12/2005
JP 2006-329971 A 12/2006
JP 2012202776 A 10/2012
JP 2012252068 A 12/2012
JP 2013015338 A 1/2013
JP 2013156139 A 8/2013
JP 2014059301 A 4/2014
JP 2014059302 A 4/2014
JP 2014077658 A 5/2014
WO 2004034084 A1 4/2004
WO 2006/076474 A1 7/2006
WO 2008008970 A2 1/2008
WO 2012027410 A1 3/2012
WO 2016025908 A2 2/2016
WO 2017/143183 A1 8/2017
WO 2017/143217 A1 8/2017
WO 2018055611 A1 3/2018
WO 2018/152201 A1 8/2018
WO 2019010425 A1 1/2019
WO 2019/216937 A9 1/2020
WO WO-2021026241 A1 * 2/2021 ........... G01S 17/894
WO 2021046547 A1 3/2021
WO 2022144588 A1 7/2022

OTHER PUBLICATIONS

International Preliminary Report on Patentability for PCT/US2022/035950 dated Jan. 18, 2024.
Prosecution History for U.S. Appl. No. 17/524,962, filed Nov. 12, 2021, now U.S. Pat. No. 11,500,093, granted Nov. 15, 2022.
Prosecution History for U.S. Appl. No. 17/525,034, filed Nov. 12, 2021, now U.S. Pat. No. 11,822,016, granted Nov. 21, 2023.
International Search Report and Written Opinion for PCT/US2022/035950 dated Nov. 18, 2022.
Office Action for U.S. Appl. No. 17/525,034 dated Aug. 29, 2022.
Wikepedia Contributors, "Pulse (Signal Processing)", Wikipedia, The Free Encyclopedia, Apr. 20, 2022, Accessed Aug. 2022.
"Compressed Sensing," Wikipedia, 2019, downloaded Jun. 22, 2019 from https://en.wikipedia.org/wiki/Compressed_sensing, 16 pgs.
"Rear-View Mirror", Wikipedia, The Free Encyclopedia, Nov. 24, 2021.
Analog Devices, "Data Sheet AD9680", 98 pages, 2014-2015.
Chen et al., "Estimating Depth from RGB and Sparse Sensing", European Conference on Computer Vision, Springer, 2018, pp. 176-192.
Donoho, "Compressed Sensing", IEEE Transactions on Inmformation Theory, Apr. 2006, pp. 1289-1306, vol. 52, No. 4.

(56) References Cited

OTHER PUBLICATIONS

Howland et al., "Compressive Sensing LIDAR for 3D Imaging", Optical Society of America, May 1-6, 2011, 2 pages.
Hui et al., "Analysis of Scanning Characteristics of a Two-Dimensional Scanning Lidar", Infrared (Monthly), Jun. 2010, pp. 10-14, vol. 31 No. 6 (http://journal.sitp.ac.cn/hw).
Johnson et al., "Development of a Dual-Mirror-Scan Elevation-Monopulse Antenna System", Proceedings of the 8th European Radar Conference, 2011, pp. 281-284, Manchester, UK.
Kessler, "An afocal beam relay for laser XY scanning systems", Proc. of SPIE vol. 8215, 9 pages, 2012.
Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.
Maxim Integrated Products, Inc., Tutorial 800, "Design A Low-Jitter Clock for High Speed Data Converters", 8 pages, Jul. 17, 2002.
Moss et al., "Low-cost compact MEMS scanning LADAR system for robotic applications", Proc. of SPIE, 2012, vol. 8379, 837903-1 to 837903-9.
Polyakov, "Single-Photon Detector Calibration", National Institute of Standards and Technology, 2015, pp. 2.
Redmayne et al., "Understanding the Effect of Clock Jitter on High Speed ADCs", Design Note 1013, Linear Technology, 4 pages, 2006.
Rehn, "Optical properties of elliptical reflectors", Opt. Eng. 43(7), pp. 1480-1488, Jul. 2004.
Sharafutdinova et al., "Improved field scanner incorporating parabolic optics. Part 1: Simulation", Applied Optics, vol. 48, No. 22, p. 4389-4396, Aug. 2009.
Fermann et al., "Ultrafast Lasers Technology and Applications", 2019, 3 pages.
Ishida et al., "Wide Angle and High Frequency (>120 Degrees@ 10 KHZ/90 Degrees@ 30 KHZ) Resonant Si-Mems Mirror Using a Novel Tuning-Fork Driving", IEEE Mems, 2020, 5 pages.
Office Action for U.S. Appl. No. 17/524,962 dated Mar. 22, 2022.
Office Action for U.S. Appl. No. 17/525,034 dated Mar. 30, 2022.
Paschotta, "Field Guide to Laser Pulse Generation", SPIE Field Guides, 134 pages, vol. FG14, 2008.
Ranefjärd, "Matched Filters for Direct-Detection LiDAR in Non-Perpendicular Measurement Scenes", Luleà University of Technology, 2019, pp. 33.
White, "Application Note: A1R HD25: The Latest In Resonant Scanning Technology Allows New Live-Cell Imaging Approaches", Nature Methods, Jan. 2019, Accessed via the web Jan. 21, 2022, https://www.nature.com/articles/d42473-018-00319-2.
Non-Final Office Action for U.S. Appl. No. 17/490,273 dated Apr. 7, 2025, 12 pages.
Non-Final Office Action for U.S. Appl. No. 17/490, 194 dated Apr. 2, 2025, 15 pages.
Non-Final Office Action for U.S. Appl. No. 17/490,213 dated Mar. 28, 2025, 2025, 27 pages.
Non-Final Office Action for U.S. Appl. No. 17/554,237 dated Jun. 11, 2025, 15 pages.
European Patent application No. 22776743.1, Extended European Search Report dated Feb. 12, 2025, 9 pages.
Bijelic, Mario, Tobias Gruber, and Werner Ritter, "A benchmark for lidar sensors in fog: Is detection breaking down?." 2018 IEEE intelligent vehicles symposium (IV). IEEE, 2018. (Year: 2018).
Non-Final Office Action for U.S. Appl. No. 17/490,221 dated May 9, 2025, 25 pages.
Non-Final Office Action for U.S. Appl. No. 17/490,248 dated May 12, 2025, 24 pages.
Non-Final Office Action for U.S. Appl. No. 17/490,204 dated May 23, 2025, 27 pages.
Non-Final Office Action for U.S. Appl. No. 17/520,213 dated May 21, 2025, 8 pages.
Final Office Action for U.S. Appl. No. 17/490,204 dated Sep. 12, 2025, 29 pages.
Final Office Action for U.S. Appl. No. 17/490,213 dated Oct. 1, 2025, 21 pages.
Final Office Action for U.S. Appl. No. 17/490,221 dated Oct. 16, 2025, 22 pages.
Final Office Action for U.S. Appl. No. 17/490,248 dated Sep. 24, 2025, 23 pages.
Final Office Action for U.S. Appl. No. 17/490,273 dated Aug. 29, 2025, 14 pages.
Final Office Action for U.S. Appl. No. 17/554,237 dated Oct. 28, 2025, 15 pages.
Non-Final Office Action for U.S. Appl. No. 17/490,260 dated Oct. 3, 2025, 39 pages.
Non-Final Office Action for U.S. Appl. No. 17/554,256 dated Aug. 21, 2025, 34 pages.
X. T. Nguyen, H. Kim and H. J. Lee, "An Efficient Sampling Algorithm With a K-N N Expanding Operator for Depth Data Acquisitionin a LiDAR System," in IEEE Transactions on Circuits and Systems for Video Technology, vol. 30, No. 12, pp. 4700-4714, Dec. 2020 (Year: 2020).
Final Office Action for U.S. Appl. No. 17/490,273 dated Dec. 18, 2025, 15 pages.

* cited by examiner

When mirror 110 is tilted to a positive non-zero angle, Theta (θ):

- Angle of Pulse Reflection (relative to mirror 110) = θ + ϕ
- μ = 2θ+ ϕ

When mirror 110 is tilted to a negative non-zero angle, -θ:

- Angle of Pulse Reflection (relative to mirror 110) = ϕ - θ
- μ = ϕ - 2θ

TRY: (1, 3, 9)

Left-to-Right Scan

| | Start (t=0) (Angle Zero) | Time Slot 1 (Angle A) | Time Slot 2 (Angle B) | Time Slot 3 (Angle C) | Time Slot 4 (Angle D) | Time Slot 5 (Angle E) | Time Slot 6 (Angle F) | Time Slot 7 (Angle G) | Time Slot 8 (Angle H) | Time Slot 9 (Angle I) | Time Slot 10 (Angle J) |
|---|---|---|---|---|---|---|---|---|---|---|---|
| Seed Energy (S) | | 1 | 1 | 2 | 1 | 2 | 3 | 4 | 5 | 6 | |
| Fiber Energy (F) | | 3 | 2 | 2 | 2 | 2 | 2 | 2 | 2 | 2 | |
| Combined Seed and Fiber Energy (S+F) | | 4 | | 4 | | | | | | 8 | |
| Shot Energy (EF) | | 2 | | 2 | | | | | | 4 | |
| Leftover Fiber Energy (F(next)) | 3 | 2 | | 2 | | | | | | 4 | |

Figure 7D

TRY: (1, 9, 17)

Left-to-Right Scan

| | Start (t=0) (Angle Zero) | Time Slot 1 (Angle A) | Time Slot 2 (Angle B) | Time Slot 3 (Angle C) | Time Slot 4 (Angle D) | Time Slot 5 (Angle E) | Time Slot 6 (Angle F) | Time Slot 7 (Angle G) | Time Slot 8 (Angle H) | Time Slot 9 (Angle I) | Time Slot 10 (Angle J) |
|---|---|---|---|---|---|---|---|---|---|---|---|
| Seed Energy (S) | | 1 | 1 | 2 | 3 | 4 | 5 | 6 | 7 | 8 | 1 |
| Fiber Energy (F) | | 3 | 2 | 2 | 2 | 2 | 2 | 2 | 2 | 2 | 5 |
| Combined Seed and Fiber Energy (S+F) | | 4 | | | | | | | | 10 | |
| Shot Energy (EF) | | 2 | | | | | | | | 5 | |
| Leftover Fiber Energy (F(next)) | 3 | 2 | | | | | | | | 5 | |

Right-to-Left Scan

| | Time Slot 20 (Angle Zero) | Time Slot 19 (Angle A) | Time Slot 18 (Angle B) | Time Slot 17 (Angle C) | Time Slot 16 (Angle D) | Time Slot 15 (Angle E) | Time Slot 14 (Angle F) | Time Slot 13 (Angle G) | Time Slot 12 (Angle H) | Time Slot 11 (Angle I) |
|---|---|---|---|---|---|---|---|---|---|---|
| Seed Energy (S) | | | | 8 | 7 | 6 | 5 | 4 | 3 | 2 |
| Fiber Energy (F) | | | | 5 | 5 | 5 | 5 | 5 | 5 | 5 |
| Combined Seed and Fiber Energy (S+F) | | | | 13 | | | | | | |
| Shot Energy (EF) | | | | 6.5 | | | | | | |
| Leftover Fiber Energy (F(next)) | | | | 6.5 | | | | | | |

Figure 7E

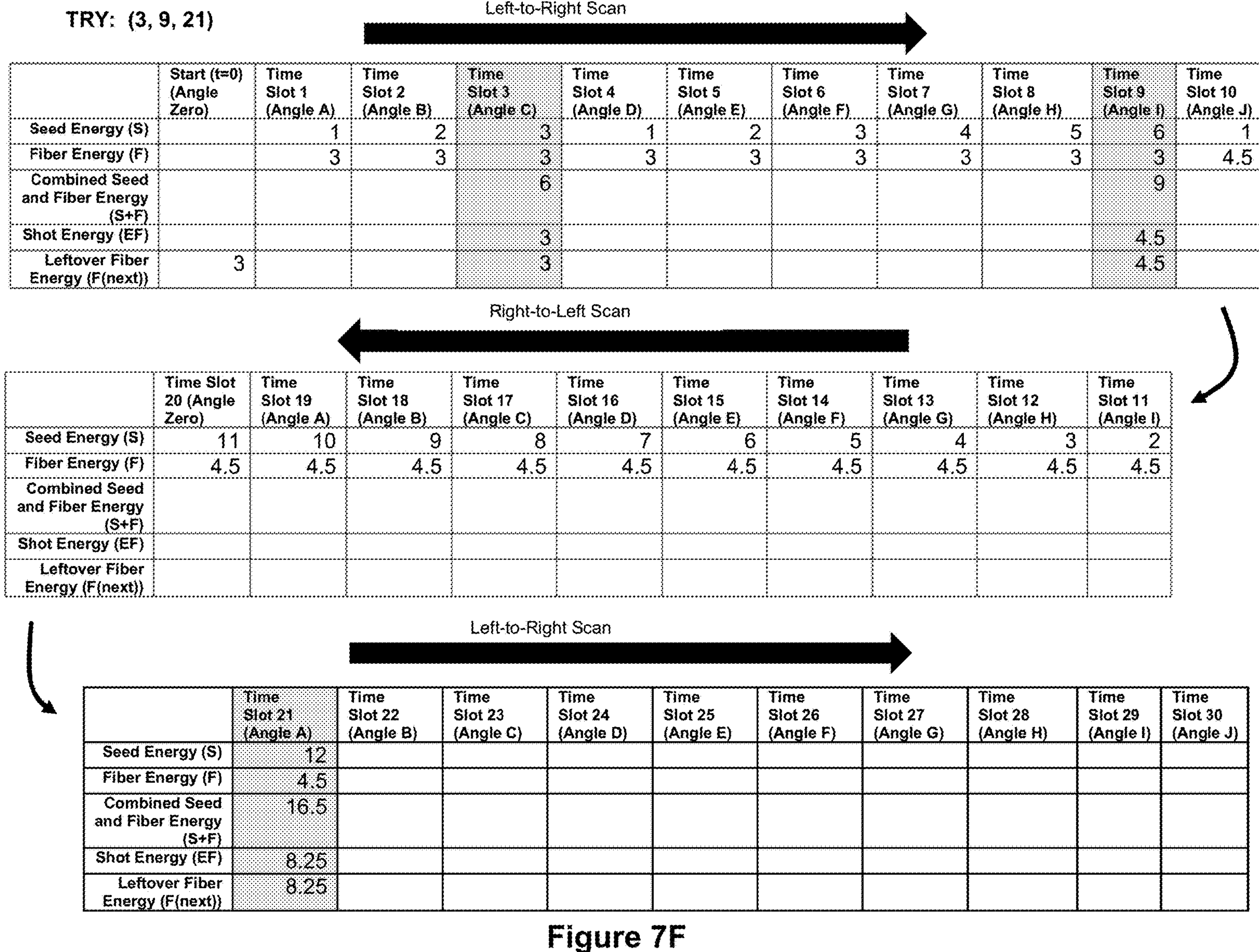

| | Start (t=0) (Angle Zero) | Time Slot 1 (Angle A) | Time Slot 2 (Angle B) | Time Slot 3 (Angle C) | Time Slot 4 (Angle D) | Time Slot 5 (Angle E) | Time Slot 6 (Angle F) | Time Slot 7 (Angle G) | Time Slot 8 (Angle H) | Time Slot 9 (Angle I) | Time Slot 10 (Angle J) |
|---|---|---|---|---|---|---|---|---|---|---|---|
| Seed Energy (S) | | 1 | 2 | 3 | 1 | 2 | 3 | 4 | 5 | 6 | 1 |
| Fiber Energy (F) | | 3 | 3 | 3 | 3 | 3 | 3 | 3 | 3 | 3 | 4.5 |
| Combined Seed and Fiber Energy (S+F) | | | | 6 | | | | | | 9 | |
| Shot Energy (EF) | | | | 3 | | | | | | 4.5 | |
| Leftover Fiber Energy (F(next)) | 3 | | | 3 | | | | | | 4.5 | |

| | Time Slot 20 (Angle Zero) | Time Slot 19 (Angle A) | Time Slot 18 (Angle B) | Time Slot 17 (Angle C) | Time Slot 16 (Angle D) | Time Slot 15 (Angle E) | Time Slot 14 (Angle F) | Time Slot 13 (Angle G) | Time Slot 12 (Angle H) | Time Slot 11 (Angle I) |
|---|---|---|---|---|---|---|---|---|---|---|
| Seed Energy (S) | 11 | 10 | 9 | 8 | 7 | 6 | 5 | 4 | 3 | 2 |
| Fiber Energy (F) | 4.5 | 4.5 | 4.5 | 4.5 | 4.5 | 4.5 | 4.5 | 4.5 | 4.5 | 4.5 |
| Combined Seed and Fiber Energy (S+F) | | | | | | | | | | |
| Shot Energy (EF) | | | | | | | | | | |
| Leftover Fiber Energy (F(next)) | | | | | | | | | | |

| | Time Slot 21 (Angle A) | Time Slot 22 (Angle B) | Time Slot 23 (Angle C) | Time Slot 24 (Angle D) | Time Slot 25 (Angle E) | Time Slot 26 (Angle F) | Time Slot 27 (Angle G) | Time Slot 28 (Angle H) | Time Slot 29 (Angle I) | Time Slot 30 (Angle J) |
|---|---|---|---|---|---|---|---|---|---|---|
| Seed Energy (S) | 12 | | | | | | | | | |
| Fiber Energy (F) | 4.5 | | | | | | | | | |
| Combined Seed and Fiber Energy (S+F) | 16.5 | | | | | | | | | |
| Shot Energy (EF) | 8.25 | | | | | | | | | |
| Leftover Fiber Energy (F(next)) | 8.25 | | | | | | | | | |

Figure 7F

1730: Select Elevation $X_t$ (where selected elevation is larger or smaller than Elevation $X_{t-1}$ by the defined skip interval)

1732: Schedule shots for selected elevation

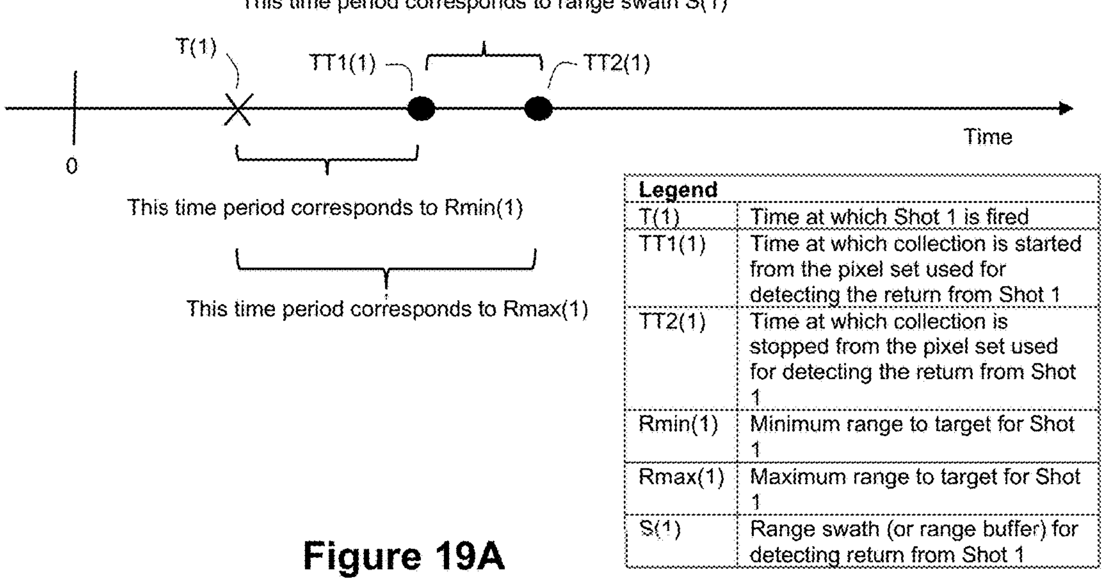

| Legend | |
|---|---|
| T(1) | Time at which Shot 1 is fired |
| TT1(1) | Time at which collection is started from the pixel set used for detecting the return from Shot 1 |
| TT2(1) | Time at which collection is stopped from the pixel set used for detecting the return from Shot 1 |
| Rmin(1) | Minimum range to target for Shot 1 |
| Rmax(1) | Maximum range to target for Shot 1 |
| S(1) | Range swath (or range buffer) for detecting return from Shot 1 |

Figure 19A

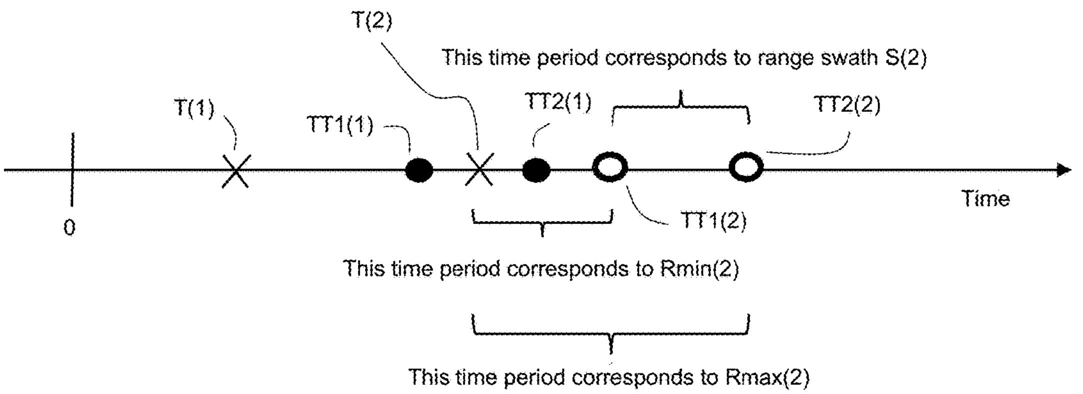

| Legend | | | |
|---|---|---|---|
| T(1) | Time at which Shot 1 is fired | T(2) | Time at which Shot 2 is fired |
| TT1(1) | Time at which collection is started from the pixel set used for detecting the return from Shot 1 | TT1(2) | Time at which collection is started from the pixel set used for detecting the return from Shot 2 |
| TT2(1) | Time at which collection is stopped from the pixel set used for detecting the return from Shot 1 | TT2(2) | Time at which collection is stopped from the pixel set used for detecting the return from Shot 2 |
| Rmin(1) | Minimum range to target for Shot 1 (see FIG 19A) | Rmin(2) | Minimum range to target for Shot 2 |
| Rmax(1) | Maximum range to target for Shot 1 (see FIG 19A) | Rmax(2) | Maximum range to target for Shot 2 |
| S(1) | Range swath (or range buffer) for detecting return from Shot 1 (see FIG 19A) | S(2) | Range swath (or range buffer) for detecting return from Shot 2 |

Figure 19B

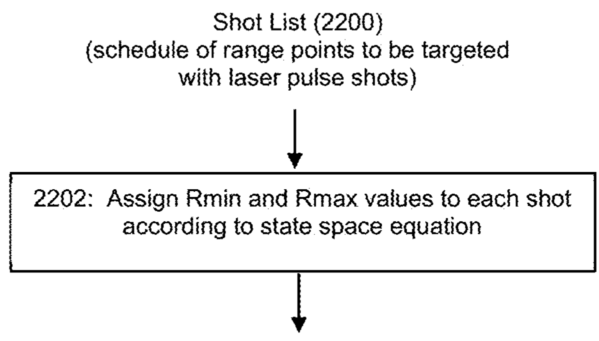

Figure 22

$$A\begin{bmatrix}\overrightarrow{TT2}\\ \vec{b}\end{bmatrix} - G = 0,$$

$$\vec{b} \geq 0$$

$$A = \begin{bmatrix} I_n & I_n & O_n \\ I_n & O_n & I_n \end{bmatrix},$$

$$G = \begin{bmatrix} S\vec{T} \\ (S^2+1)\frac{\vec{T}}{2} \end{bmatrix}$$

Figure 23A

$$Set\ c = \begin{bmatrix}\overrightarrow{TT2}\\ \vec{b}\end{bmatrix}\ and\ solve:$$

$$\min_{c*\geq 0}\left[||A'c*-G'||^2\right], A' = \begin{bmatrix} & A & \\ O_n & I_n & O_n \\ O_n & O_n & I_n \end{bmatrix}, G' = \begin{bmatrix} G \\ O \end{bmatrix}$$

Then, the first 3rd of the entries of the vector *c* is the set of pixel cluster turnoff times

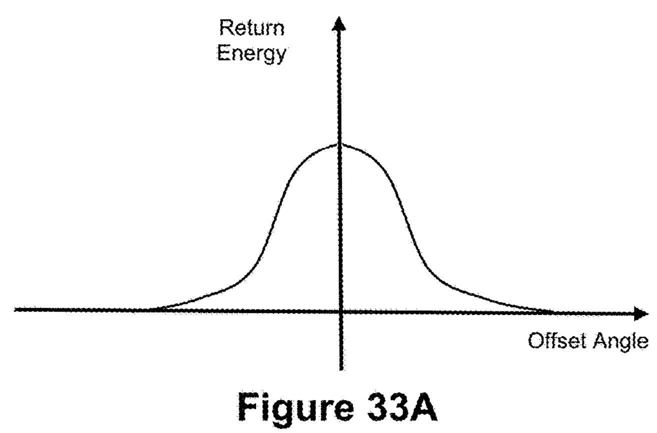
Figure 33A
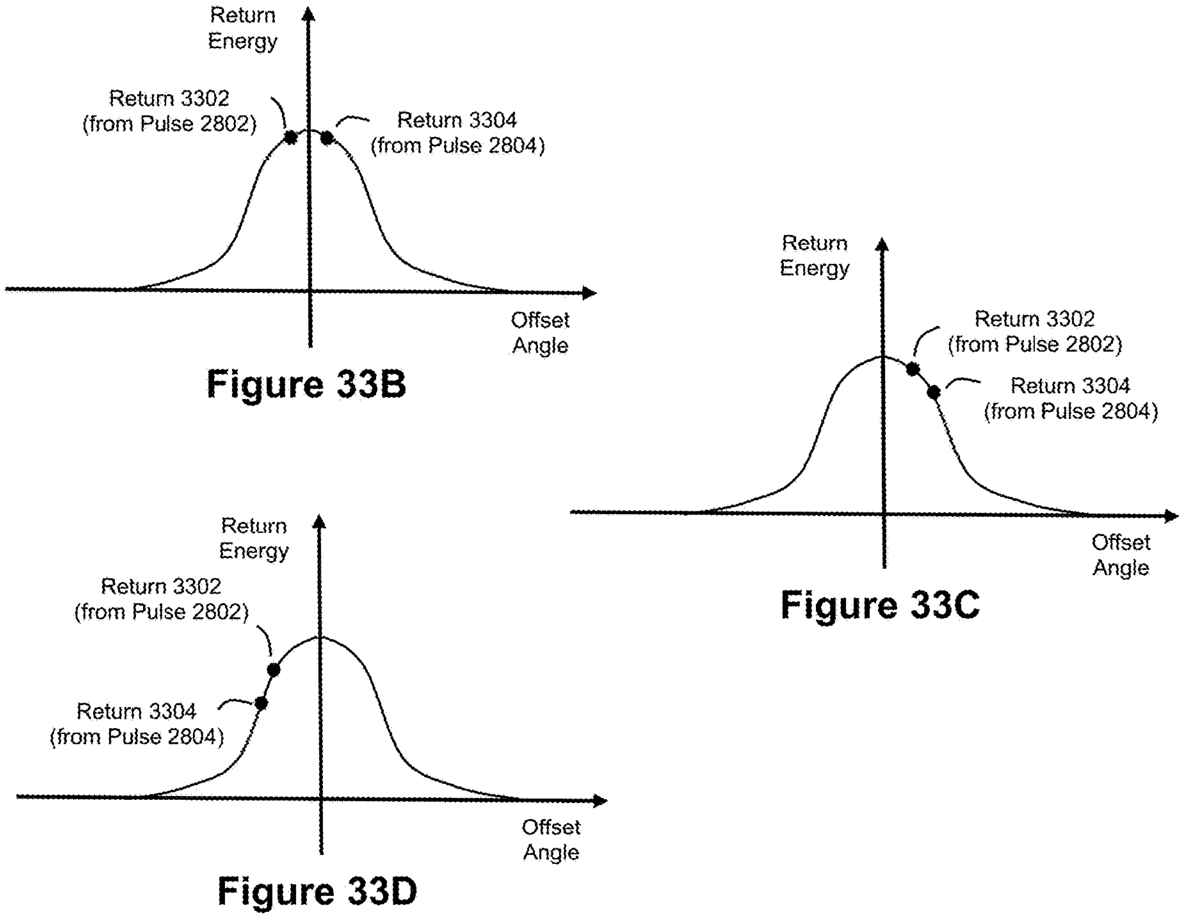

Pulse Return Samples
(2004)

Matched Filter 1
(3610)

Matched Filter N
(3610)

Comparator
(3612)

Logic
(3614)
(Determine target obliquity based on which matched filter produced the largest response)

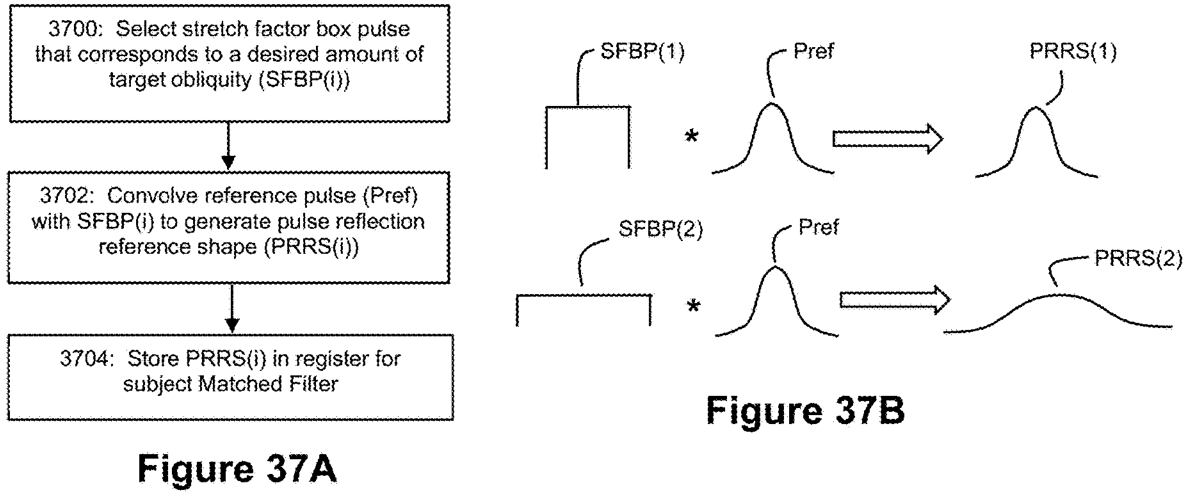
Figure 37A
Figure 37B
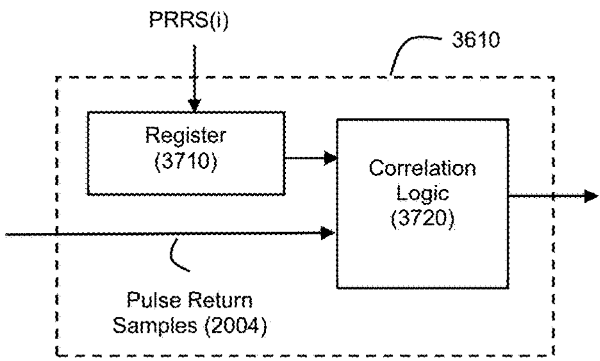
Figure 37C

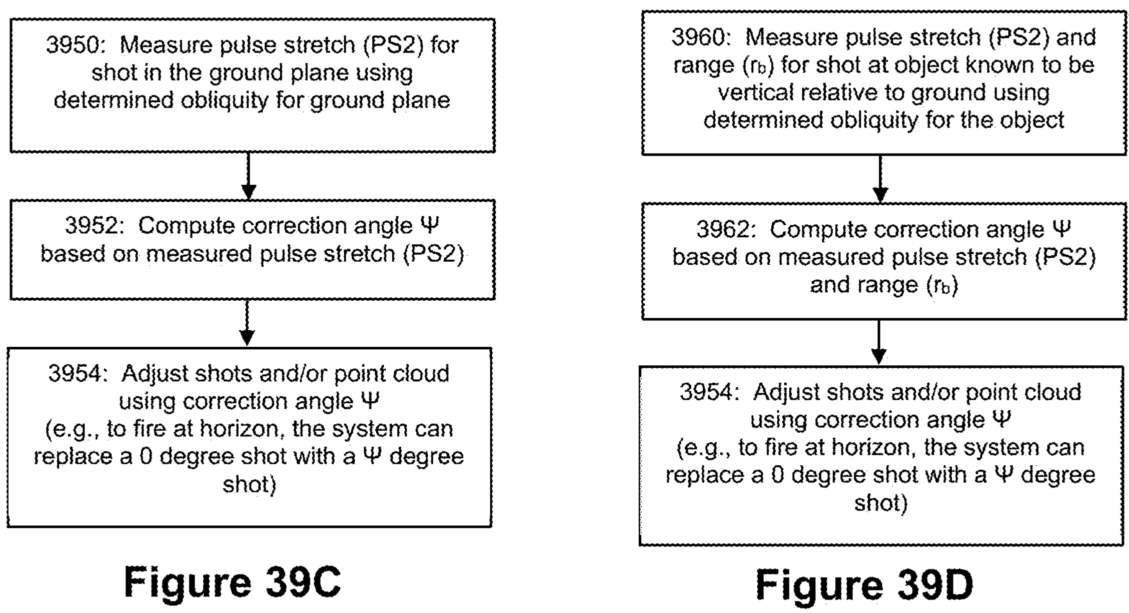
Figure 39C
Figure 39D
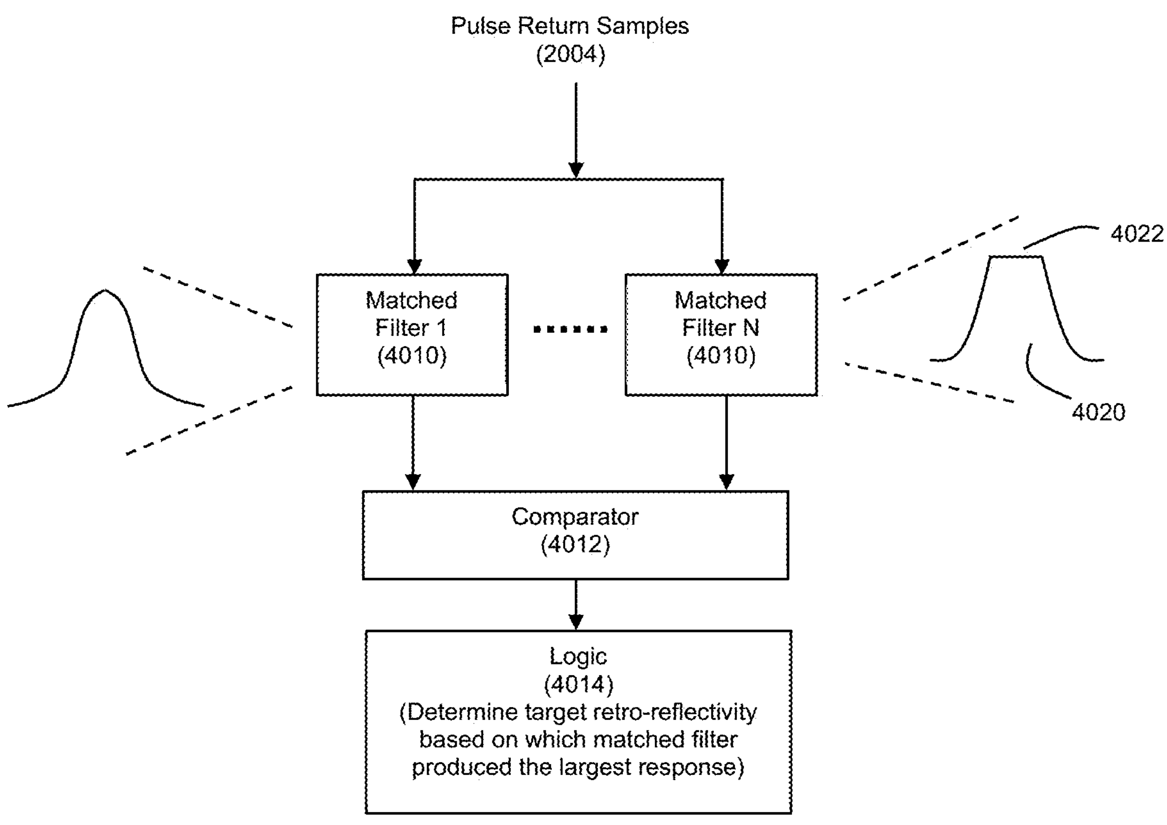
Figure 40

HYPER TEMPORAL LIDAR USING MULTIPLE MATCHED FILTERS TO DETERMINE TARGET RETRO-REFLECTIVITY

CROSS-REFERENCE AND PRIORITY CLAIM TO RELATED PATENT APPLICATIONS

This patent application claims priority to U.S. provisional patent application 63/219,034, filed Jul. 7, 2021, and entitled "Hyper Temporal Lidar Using Multiple Matched Filters to Process Return Data", the entire disclosure of which is incorporated herein by reference.

This patent application also claims priority to U.S. provisional patent application 63/209,179, filed Jun. 10, 2021, and entitled "Hyper Temporal Lidar with Controllable Pulse Bursts", the entire disclosure of which is incorporated herein by reference.

This patent application also claims priority to U.S. provisional patent application 63/186,661, filed May 10, 2021, and entitled "Hyper Temporal Lidar with Controllable Detection Intervals", the entire disclosure of which is incorporated herein by reference.

This patent application also claims priority to U.S. provisional patent application 63/166,475, filed Mar. 26, 2021, and entitled "Hyper Temporal Lidar with Dynamic Laser Control", the entire disclosure of which is incorporated herein by reference.

This patent application is related to (1) U.S. patent application Ser. No. 17/524,962 filed this same day, and entitled "Hyper Temporal Lidar Using Multiple Matched Filters to Determine Target Obliquity" (said patent application being identified by Thompson Coburn and (2) U.S. patent application Ser. No. 17/524,034, filed this same day, and entitled "Hyper Temporal Lidar Using Multiple Matched Filters to Orient a Lidar System to a Frame of Reference" (said patent application being identified by Thompson Coburn, the entire disclosures of each of which are incorporated herein by reference.

INTRODUCTION

There is a need in the art for lidar systems that operate with low latency and rapid adaptation to environmental changes. This is particularly the case for automotive applications of lidar as well as other applications where the lidar system may be moving at a high rate of speed or where there is otherwise a need for decision-making in short time intervals. For example, when an object of interest is detected in the field of view for a lidar transmitter, it is desirable for the lidar transmitter to rapidly respond to this detection by firing high densities of laser pulses at the detected object. However, as the firing rate for the lidar transmitter increases, this places pressure on the operational capabilities of the laser source employed by the lidar transmitter because the laser source will need re-charging time.

This issue becomes particularly acute in situations where the lidar transmitter has a variable firing rate. With a variable firing rate, the laser source's operational capabilities are not only impacted by periods of high density firing but also periods of low density firing. As charge builds up in the laser source during a period where the laser source is not fired, a need arises to ensure that the laser source does not overheat or otherwise exceed its maximum energy limits.

The lidar transmitter may employ a laser source that uses optical amplification to support the generation of laser pulses. Such laser sources have energy characteristics that are heavily impacted by time and the firing rate of the laser source. These energy characteristics of a laser source that uses optical amplification have important operational impacts on the lidar transmitter when the lidar transmitter is designed to operate with fast scan times and laser pulses that are targeted on specific range points in the field of view.

As a technical solution to these problems in the art, the inventors disclose that a laser energy model can be used to model the available energy in the laser source over time. The timing schedule for laser pulses fired by the lidar transmitter can then be determined using energies that are predicted for the different scheduled laser pulse shots based on the laser energy model. This permits the lidar transmitter to reliably ensure at a highly granular level that each laser pulse shot has sufficient energy to meet operational needs, including when operating during periods of high density/high resolution laser pulse firing. The laser energy model is capable of modeling the energy available for laser pulses in the laser source over very short time intervals as discussed in greater detail below. With such short interval time modeling, the laser energy modeling can be referred to as a transient laser energy model.

Furthermore, the inventors also disclose that mirror motion can be modeled so that the system can also reliably predict where a scanning mirror is aimed within a field of view over time. This mirror motion model is also capable of predicting mirror motion over short time intervals as discussed in greater detail below. In this regard, the mirror motion model can also be referred to as a transient mirror motion model. The model of mirror motion over time can be linked with the model of laser energy over time to provide still more granularity in the scheduling of laser pulses that are targeted at specific range points in the field of view. Thus, a control circuit can translate a list of arbitrarily ordered range points to be targeted with laser pulses into a shot list of laser pulses to be fired at such range points using the modeled laser energy coupled with the modeled mirror motion. In this regard, the "shot list" can refer to a list of the range points to be targeted with laser pulses as combined with timing data that defines a schedule or sequence by which laser pulses will be fired toward such range points.

Through the use of such models, the lidar system can provide hyper temporal processing where laser pulses can be scheduled and fired at high rates with high timing precision and high spatial targeting/pointing precision. This results in a lidar system that can operate at low latency, high frame rates, and intelligent range point targeting where regions of interest in the field of view can be targeted with rapidly-fired and spatially dense laser pulse shots.

According to additional example embodiments, the inventors disclose that the detection intervals used by a lidar receiver to detect returns of the fired laser pulse shots can be closely controlled. Such control over the detection intervals used by the lidar receiver allows for close coordination between the lidar transmitter and the lidar receiver where the lidar receiver is able to adapt to variable shot intervals of the lidar transmitter (including periods of high rate firing as well as periods of low rate firing).

Each detection interval can be associated with a different laser pulse shot from which a return is to be collected during the associated detection interval. Accordingly, each detection interval is also associated with the return for its associated laser pulse shot. The lidar receiver can control these detection intervals on a shot-specific basis so that the lidar receiver will be able to use the appropriate pixel sets for detecting the returns from the detection interval's associated shots. The lidar receiver includes a plurality of detector pixels arranged as a photodetector array, and different sets of detector pixels can be selected for use to detect the returns from different laser pulse shots. During a given detection interval, the lidar receiver will collect sensed signal data from the selected pixel set, and this collected signal data can be processed to detect the associated return for that detection interval. The choice of which pixel set to use for detecting a return from a given laser pulse shot can be based on the location in the field of the range point targeted by the given laser pulse shot. In this fashion, the lidar receiver will readout from different pixel sets during the detection intervals in a sequenced pattern that follows the sequenced spatial pattern of the laser pulse shots.

The lidar receiver can use any of a number of criteria for deciding when to start and stop reading out from the different pixel sets for detecting returns. For example, the lidar receiver can use estimates of potential ranges to the targeted range points to decide on when the collections should start and stop from various pixel sets. As an example, if an object at range point X is located 10 meters from the lidar system, it can be expected that the return from the laser pulse shot fired at this object will reach the photodetector array relatively quickly, while it would take relatively longer for a return to reach the photodetector array if the object at range point X is located 1,000 meters from the lidar system. To control when the collections should start and stop from the pixel sets in order to detect returns from the laser pulse shots, the system can determine pairs of minimum and maximum range values for the range points targeted by each laser pulse shot, and these minimum and maximum range values can be translated into on/off times for the pixel sets. Through intelligent control of these on (start collection) and off (stop collection) times, the risk of missing a return due to the return impacting a deactivated pixel is reduced.

Moreover, the detection intervals can vary across different shots (e.g., Detection Interval A (associated with Shot A to support detection of the return from Shot A) can have a different duration than Detection Interval B (associated with Shot B to support detection of the return from Shot B)). Further still, at least some of the detection intervals can be controlled to be of different durations than the shot intervals that correspond to such detection intervals. The shot interval that corresponds to a given detection interval is the time between the shot that is associated with that detection interval and the next shot in the shot sequence. Counterintuitively, the inventors have found that it is often not desirable for a detection interval to be of the same duration as its corresponding shot interval due to factors such as the amount of processing time that is needed to detect returns within return signals. In many cases, it will be desirable for the control process to define a detection interval so that it exhibits a duration shorter than the duration of its corresponding shot interval; while in some other cases it may be desirable for the control process to define a detection interval so that it exhibits a longer duration than the duration of its corresponding shot interval. This characteristic can be referred to as a detection interval that is asynchronous relative to its corresponding shot interval duration.

Further still, the inventors also disclose the use of multiple processors in a lidar receiver to distribute the workload of processing returns. The activation/deactivation times of the pixel sets can be used to define which samples in a return buffer will be used for processing to detect each return, and multiple processors can share the workload of processing these samples in an effort to improve the latency of return detection.

The inventors also disclose the use of multiple readout channels within a lidar receiver that are capable of simultaneously reading out sensed signals from different pixel sets of the photodetector array. In doing so, the lidar receiver can support the use of overlapping detection intervals when collecting signal data for detecting different returns.

Moreover, the inventors disclose a lidar system having a lidar transmitter and lidar receiver that are in a bistatic arrangement with each other. Such a bistatic lidar system can be deployed in a climate-controlled compartment of a vehicle to reduce the exposure of the lidar system to harsher elements so it can operate in more advantageous environments with regards to factors such as temperature, moisture, etc. In an example embodiment, the bistatic lidar system can be connected to or incorporated within a rear view mirror assembly of a vehicle.

Further still, the inventors disclose the use of pulse bursts by a lidar system to improve the precision with which the angle to a target in the field of view is resolved. These pulse bursts can be scheduled in response to detection of the target in the field of view, and the lidar system can employ the laser energy model and mirror motion model to ensure that sufficient energy is available for the scheduled pulses of the pulse burst.

The inventors also disclose the use of an optical amplification laser source that employs a controllable variable seed laser. The variable seed laser can be controlled to adjust the seed energy levels for the laser in a manner that achieves a desired regulation of the energy levels in the pulses of the pulse burst (such as equalization of the energy levels in the pulses of the pulse burst) despite the short time interval between such pulses.

Moreover, the inventors also disclose the use of multiple matched filters in a lidar receiver to determine target characteristics such as target obliquity and/or target retro-reflectivity. For example, the shape of a pulse reflected from a target will be impacted by the target's obliquity. In particular, increasing target obliquity will cause stretching of the reflected pulse relative to the transmitted pulse. Accordingly, different matched filters in the lidar receiver can be tuned to detect pulse shapes corresponding to different amounts of stretching (e.g., no stretching for a non-oblique target versus stretching applicable to an oblique target), and pulse return data can be processed through these matched filters to determine which of the matched filters produces the largest response. The obliquity of the target can then be determined on the basis of which matched filter produced the largest response.

The lidar system can use the determined target obliquity to orient the lidar system relative to a frame of reference such as the horizon. Thus, as a lidar-equipped vehicle may experience displacement (e.g., a tilting vertical displacement due to bumps in the road), the lidar system will be able to quickly adjust its targeting to accommodate the changed field of view caused by the displacement.

In another example, the shaped of a pulse reflected from a target can be impacted by the target's retro-reflectivity. Highly reflective objects such as street signs can produce pulse reflections whose magnitude either exceeds the linear regime of the photodetector array used by the lidar receiver or the maximum sample value of the analog-to-digital converter (ADC) used by the lidar receiver. This has the effect of introducing a vertical clipping into the detected pulse reflection shape. Accordingly, one or more matched filters can be tuned to detect the vertically-clipped pulse shapes that would correspond to target retro-reflectivity. In this fashion, the matched filters can also be used to determine target retro-reflectivity.

These and other features and advantages of the invention will be described in greater detail below.

BRIEF DESCRIPTION OF THE DRAWINGS

FIGS. 7D-7F depict different examples of laser energy predictions produced by the laser energy model with respect to different shot order candidates.

FIGS. 19A and 19B show examples of detection timing for a lidar receiver to detect returns from laser pulse shots.

FIG. 22 shows an example process flow for assigning range swaths to return detections for a shot list of laser pulse shots.

FIGS. 23A and 23B show examples of mathematical operations that can be used to assign range swath values to return detections.

FIGS. 33A-33D show examples of shot return intensity as a function of offset angle to the target.

FIGS. 37A and 37B show how a matched filter can be tuned to detect a defined stretched pulse shape.

FIG. 37C shows an example matched filter that can be tuned to detect a defined pulse shape.

FIG. 39C shows an example process flow for using the determined obliquity of the ground plane to compute an angle correction for aligning the lidar system's field of view with the horizon.

FIG. 39D shows an example process flow for using the determined obliquity of a target with a known orientation relative to the horizon to compute an angle correction for aligning the lidar system's field of view with the horizon.

FIG. 40 shows an example signal processing circuit for a lidar receiver that uses multiple matched filters to determine target retro-reflectivity.

DETAILED DESCRIPTION OF EXAMPLE EMBODIMENTS

Figure 1:
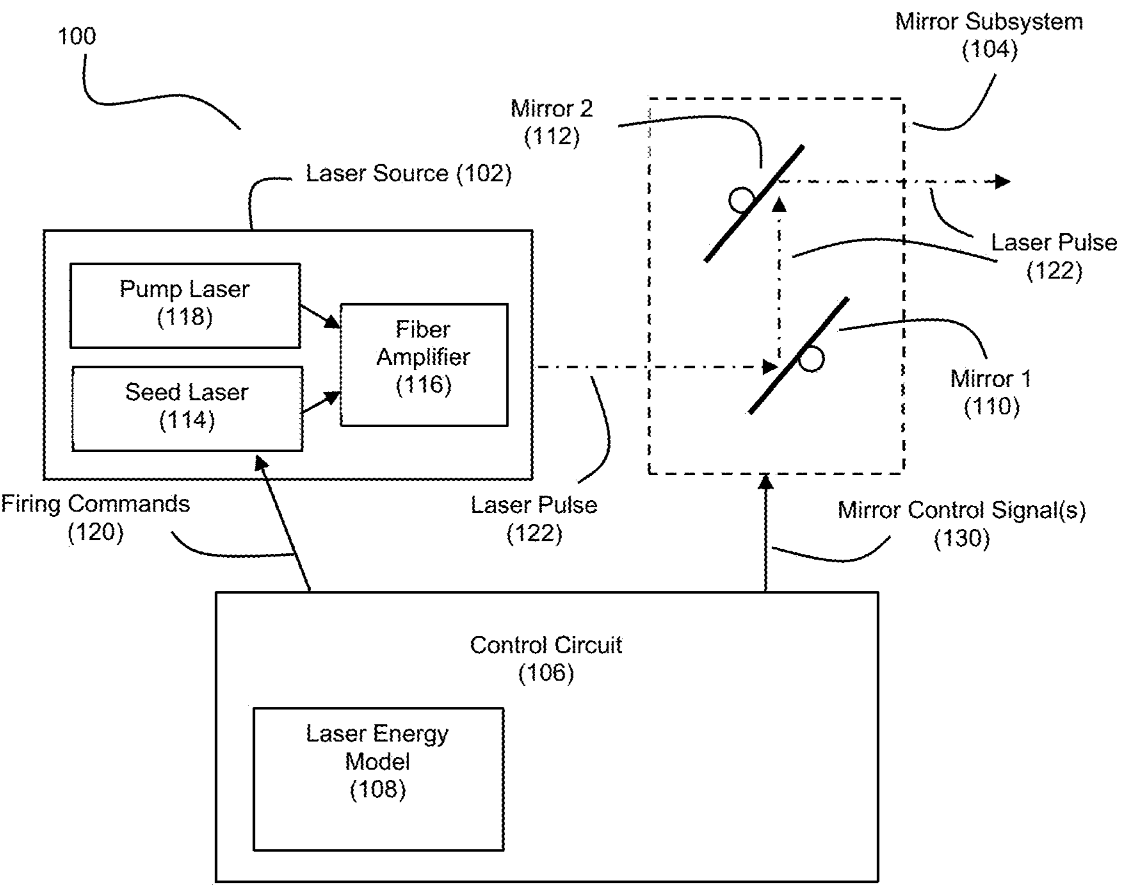
FIG. 1 depicts an example lidar transmitter that uses a laser energy model to schedule laser pulses.

FIG. 1 shows an example embodiment of a lidar transmitter 100 that can be employed to support hyper temporal lidar. In an example embodiment, the lidar transmitter 100 can be deployed in a vehicle such as an automobile. However, it should be understood that the lidar transmitter 100 described herein need not be deployed in a vehicle. As used herein, "lidar", which can also be referred to as "ladar", refers to and encompasses any of light detection and ranging, laser radar, and laser detection and ranging. In the example of FIG. 1, the lidar transmitter 100 includes a laser source 102, a mirror subsystem 104, and a control circuit 106. Control circuit 106 uses a laser energy model 108 to govern the firing of laser pulses 122 by the laser source 102. Laser pulses 122 transmitted by the laser source 102 are sent into the environment via mirror subsystem 104 to target various range points in a field of view for the lidar transmitter 100. These laser pulses 122 can be interchangeably referred to as laser pulse shots (or more simply, as just "shots"). The field of view will include different addressable coordinates (e.g., {azimuth, elevation} pairs) which serve as range points that can be targeted by the lidar transmitter 100 with the laser pulses 122.

In the example of FIG. 1, laser source 102 can use optical amplification to generate the laser pulses 122 that are transmitted into the lidar transmitter's field of view via the mirror subsystem 104. In this regard, a laser source 102 that includes an optical amplifier can be referred to as an optical amplification laser source 102. In the example of FIG. 1, the optical amplification laser source 102 includes a seed laser 114, an optical amplifier 116, and a pump laser 118. In this laser architecture, the seed laser 114 provides the input (signal) that is amplified to yield the transmitted laser pulse 122, while the pump laser 118 provides the power (in the form of the energy deposited by the pump laser 118 into the optical amplifier 116). So, the optical amplifier 116 is fed by two inputs—the pump laser 118 (which deposits energy into the optical amplifier 116) and the seed laser 114 (which provides the signal that stimulates the energy in the optical amplifier 116 and induces pulse 122 to fire).

Thus, the pump laser 118, which can take the form of an electrically-driven pump laser diode, continuously sends energy into the optical amplifier 116. The seed laser 114, which can take the form of an electrically-driven seed laser that includes a pulse formation network circuit, controls when the energy deposited by the pump laser 118 into the optical amplifier 116 is released by the optical amplifier 116 as a laser pulse 122 for transmission. The seed laser 114 can also control the shape of laser pulse 122 via the pulse formation network circuit (which can drive the pump laser diode with the desired pulse shape). The seed laser 114 also injects a small amount of (pulsed) optical energy into the optical amplifier 116.

Given that the energy deposited in the optical amplifier 116 by the pump laser 118 and seed laser 114 serves to seed the optical amplifier 116 with energy from which the laser pulses 122 are generated, this deposited energy can be referred to as "seed energy" for the laser source 102.

The optical amplifier 116 operates to generate laser pulse 122 from the energy deposited therein by the seed laser 114 and pump laser 118 when the optical amplifier 116 is induced to fire the laser pulse 122 in response to stimulation of the energy therein by the seed laser 114. The optical amplifier 116 can take the form of a fiber amplifier. In such an embodiment, the laser source 102 can be referred to as a pulsed fiber laser source. With a pulsed fiber laser source 102, the pump laser 118 essentially places the dopant electrons in the fiber amplifier 116 into an excited energy state. When it is time to fire laser pulse 122, the seed laser 114 stimulates these electrons, causing them to emit energy and collapse down to a lower (ground) state, which results in the emission of pulse 122. An example of a fiber amplifier that can be used for the optical amplifier 116 is a doped fiber amplifier such as an Erbium-Doped Fiber Amplifier (EDFA).

It should be understood that other types of optical amplifiers can be used for the optical amplifier 116 if desired by a practitioner. For example, the optical amplifier 116 can take the form of a semiconductor amplifier. In contrast to a laser source that uses a fiber amplifier (where the fiber amplifier is optically pumped by pump laser 118), a laser source that uses a semiconductor amplifier can be electrically pumped. As another example, the optical amplifier 116 can take the form of a gas amplifier (e.g., a $CO_2$ gas amplifier). Moreover, it should be understood that a practitioner may choose to include a cascade of optical amplifiers 116 in laser source 102.

In an example embodiment, the pump laser 118 can exhibit a fixed rate of energy buildup (where a constant amount of energy is deposited in the optical amplifier 116 per unit time). However, it should be understood that a practitioner may choose to employ a pump laser 118 that exhibits a variable rate of energy buildup (where the amount of energy deposited in the optical amplifier 116 varies per unit time).

The laser source 102 fires laser pulses 122 in response to firing commands 120 received from the control circuit 106. In an example where the laser source 102 is a pulsed fiber laser source, the firing commands 120 can cause the seed laser 114 to induce pulse emissions by the fiber amplifier 116. In an example embodiment, the lidar transmitter 100 employs non-steady state pulse transmissions, which means that there will be variable timing between the commands 120 to fire the laser source 102. In this fashion, the laser pulses 122 transmitted by the lidar transmitter 100 will be spaced in time at irregular intervals. There may be periods of relatively high densities of laser pulses 122 and periods of relatively low densities of laser pulses 122. Examples of laser vendors that provide such variable charge time control include Luminbird and ITF. As examples, lasers that have the capacity to regulate pulse timing over timescales corresponding to preferred embodiments discussed herein and which are suitable to serve as laser source 102 in these preferred embodiments are expected to exhibit laser wavelengths of 1.5 m and available energies in a range of around hundreds of nano-Joules to around tens of micro-Joules, with timing controllable from hundreds of nanoseconds to tens of microseconds and with an average power range from around 0.25 Watts to around 4 Watts.

The mirror subsystem 104 includes a mirror that is scannable to control where the lidar transmitter 100 is aimed. In the example embodiment of FIG. 1, the mirror subsystem 104 includes two mirrors—mirror 110 and mirror 112. Mirrors 110 and 112 can take the form of MEMS mirrors. However, it should be understood that a practitioner may choose to employ different types of scannable mirrors. Mirror 110 is positioned optically downstream from the laser source 102 and optically upstream from mirror 112. In this fashion, a laser pulse 122 generated by the laser source 102 will impact mirror 110, whereupon mirror 110 will reflect the pulse 122 onto mirror 112, whereupon mirror 112 will reflect the pulse 122 for transmission into the environment. It should be understood that the outgoing pulse 122 may pass through various transmission optics during its propagation from mirror 112 into the environment.

In the example of FIG. 1, mirror 110 can scan through a plurality of mirror scan angles to define where the lidar transmitter 100 is targeted along a first axis. This first axis can be an X-axis so that mirror 110 scans between azimuths. Mirror 112 can scan through a plurality of mirror scan angles to define where the lidar transmitter 100 is targeted along a second axis. The second axis can be orthogonal to the first axis, in which case the second axis can be a Y-axis so that mirror 112 scans between elevations. The combination of mirror scan angles for mirror 110 and mirror 112 will define a particular {azimuth, elevation} coordinate to which the lidar transmitter 100 is targeted. These azimuth, elevation pairs can be characterized as {azimuth angles, elevation angles} and/or {rows, columns} that define range points in the field of view which can be targeted with laser pulses 122 by the lidar transmitter 100.

A practitioner may choose to control the scanning of mirrors 110 and 112 using any of a number of scanning techniques. In a particularly powerful embodiment, mirror 110 can be driven in a resonant mode according to a sinusoidal signal while mirror 112 is driven in a point-to-point mode according to a step signal that varies as a function of the range points to be targeted with laser pulses 122 by the lidar transmitter 100. In this fashion, mirror 110 can be operated as a fast-axis mirror while mirror 112 is operated as a slow-axis mirror. When operating in such a resonant mode, mirror 110 scans through scan angles in a sinusoidal pattern. In an example embodiment, mirror 110 can be scanned at a frequency in a range between around 100 Hz and around 20 kHz. In a preferred embodiment, mirror 110 can be scanned at a frequency in a range between around 10 kHz and around 15 kHz (e.g., around 12 kHz). As noted above, mirror 112 can be driven in a point-to-point mode according to a step signal that varies as a function of the range points to be targeted with laser pulses 122 by the lidar transmitter 100. Thus, if the lidar transmitter 100 is to fire a laser pulse 122 at a particular range point having an elevation of X, then the step signal can drive mirror 112 to scan to the elevation of X. When the lidar transmitter 100 is later to fire a laser pulse 122 at a particular range point having an elevation of Y, then the step signal can drive mirror 112 to scan to the elevation of Y. In this fashion, the mirror subsystem 104 can selectively target range points that are identified for targeting with laser pulses 122. It is expected that mirror 112 will scan to new elevations at a much slower rate than mirror 110 will scan to new azimuths. As such, mirror 110 may scan back and forth at a particular elevation (e.g., left-to-right, right-to-left, and so on) several times before mirror 112 scans to a new elevation. Thus, while the mirror 112 is targeting a particular elevation angle, the lidar transmitter 100 may fire a number of laser pulses 122 that target different azimuths at that elevation while mirror 110 is scanning through different azimuth angles. U.S. Pat. Nos. 10,078,133 and 10,642,029, the entire disclosures of which are incorporated herein by reference, describe examples of mirror scan control using techniques and transmitter architectures such as these (and others) which can be used in connection with the example embodiments described herein.

Control circuit 106 is arranged to coordinate the operation of the laser source 102 and mirror subsystem 104 so that laser pulses 122 are transmitted in a desired fashion. In this regard, the control circuit 106 coordinates the firing commands 120 provided to laser source 102 with the mirror control signal(s) 130 provided to the mirror subsystem 104. In the example of FIG. 1, where the mirror subsystem 104 includes mirror 110 and mirror 112, the mirror control signal(s) 130 can include a first control signal that drives the scanning of mirror 110 and a second control signal that drives the scanning of mirror 112. Any of the mirror scan techniques discussed above can be used to control mirrors 110 and 112. For example, mirror 110 can be driven with a sinusoidal signal to scan mirror 110 in a resonant mode, and mirror 112 can be driven with a step signal that varies as a function of the range points to be targeted with laser pulses 122 to scan mirror 112 in a point-to-point mode.

As discussed in greater detail below, control circuit 106 can use a laser energy model 108 to determine a timing schedule for the laser pulses 122 to be transmitted from the laser source 102. This laser energy model 108 can model the available energy within the laser source 102 for producing laser pulses 122 over time in different shot schedule scenarios. By modeling laser energy in this fashion, the laser energy model 108 helps the control circuit 106 make decisions on when the laser source 102 should be triggered to fire laser pulses. Moreover, as discussed in greater detail below, the laser energy model 108 can model the available energy within the laser source 102 over short time intervals (such as over time intervals in a range from 10-100 nanoseconds), and such a short interval laser energy model 108 can be referred to as a transient laser energy model 108.

Control circuit 106 can include a processor that provides the decision-making functionality described herein. Such a processor can take the form of a field programmable gate array (FPGA) or application-specific integrated circuit (ASIC) which provides parallelized hardware logic for implementing such decision-making. The FPGA and/or ASIC (or other compute resource(s)) can be included as part of a system on a chip (SoC). However, it should be understood that other architectures for control circuit 106 could be used, including software-based decision-making and/or hybrid architectures which employ both software-based and hardware-based decision-making. The processing logic implemented by the control circuit 106 can be defined by machine-readable code that is resident on a non-transitory machine-readable storage medium such as memory within or available to the control circuit 106. The code can take the form of software or firmware that define the processing operations discussed herein for the control circuit 106. This code can be downloaded onto the control circuit 106 using any of a number of techniques, such as a direct download via a wired connection as well as over-the-air downloads via wireless networks, which may include secured wireless networks. As such, it should be understood that the lidar transmitter 100 can also include a network interface that is configured to receive such over-the-air downloads and update the control circuit 106 with new software and/or firmware. This can be particularly advantageous for adjusting the lidar transmitter 100 to changing regulatory environments with respect to criteria such as laser dosage and the like. When using code provisioned for over-the-air updates, the control circuit 106 can operate with unidirectional messaging to retain function safety.

Figure 2A:
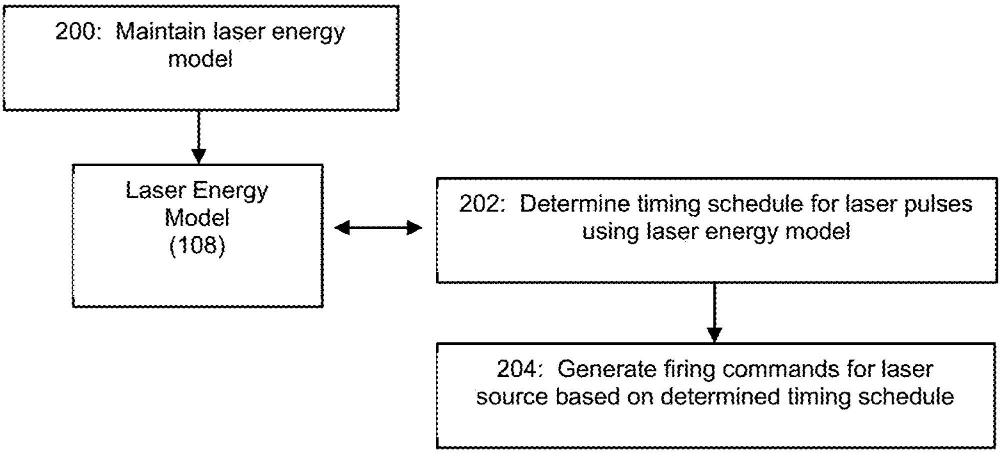
FIG. 2A depicts an example process flow the control circuit of FIG. 1.

Modeling Laser Energy Over Time:

FIG. 2A shows an example process flow for the control circuit 106 with respect to using the laser energy model 108 to govern the timing schedule for laser pulses 122. At step 200, the control circuit 106 maintains the laser energy model 108. This step can include reading the parameters and expressions that define the laser energy model 108, discussed in greater detail below. Step 200 can also include updating the laser energy model 108 over time as laser pulses 122 are triggered by the laser source 102 as discussed below.

In an example embodiment where the laser source 102 is a pulsed fiber laser source as discussed above, the laser energy model 108 can model the energy behavior of the seed laser 114, pump laser 118, and fiber amplifier 116 over time as laser pulses 122 are fired. As noted above, the fired laser pulses 122 can be referred to as "shots". For example, the laser energy model 108 can be based on the following parameters:

- CE(t), which represents the combined amount of energy within the fiber amplifier 116 at the moment when the laser pulse 122 is fired at time t.
- EF(t), which represents the amount of energy fired in laser pulse 122 at time t;
- $E_P$, which represents the amount of energy deposited by the pump laser 118 into the fiber amplifier 116 per unit of time.
- S(t+δ), which represents the cumulative amount of seed energy that has been deposited by the pump laser 118 and seed laser 114 into the fiber amplifier 116 over the time duration δ, where δ represents the amount of time between the most recent laser pulse 122 (for firing at time t) and the next laser pulse 122 (to be fired at time t+δ).
- F(t+δ), which represents the amount of energy left behind in the fiber amplifier 116 when the pulse 122 is fired at time t (and is thus available for use with the next pulse 122 to be fired at time t+δ).
- CE(t+δ), which represents the amount of combined energy within the fiber amplifier 116 at time t+S (which is the sum of S(t+δ) and F(t+δ))
- EF(t+δ), which represents the amount of energy fired in laser pulse 122 fired at time t+S
- a and b, where "a" represents a proportion of energy transferred from the fiber amplifier 116 into the laser pulse 122 when the laser pulse 122 is fired, where "b" represents a proportion of energy retained in the fiber amplifier 116 after the laser pulse 122 is fired, where a+b=1.

While the seed energy (S) includes both the energy deposited in the fiber amplifier 116 by the pump laser 118 and the energy deposited in the fiber amplifier 116 by the seed laser 114, it should be understood that for most embodiments the energy from the seed laser 114 will be very small relative to the energy from the pump laser 118. As such, a practitioner can choose to model the seed energy solely in terms of energy produced by the pump laser 118 over time. Thus, after the pulsed fiber laser source 102 fires a laser pulse at time t, the pump laser 118 will begin re-supplying the fiber amplifier 116 with energy over time (in accordance with $E_P$) until the seed laser 116 is triggered at time t+δ to cause the fiber amplifier 116 to emit the next laser pulse 122 using the energy left over in the fiber amplifier 116 following the previous shot plus the new energy that has been deposited in the fiber amplifier 116 by pump laser 118 since the previous shot. As noted above, the parameters a and b model how much of the energy in the fiber amplifier 116 is transferred into the laser pulse 122 for transmission and how much of the energy is retained by the fiber amplifier 116 for use when generating the next laser pulse 122.

The energy behavior of pulsed fiber laser source 102 with respect to the energy fired in laser pulses 122 in this regard can be expressed as follows:

$$EF(t) = aCE(t)$$

$$F(t+\delta) = bCE(t)$$

$$S(t+\delta) = \delta E_P$$

$$CE(t+\delta) = S(t+\delta) + F(t+\delta)$$

$$EF(t+\delta) = aCE(t+\delta)$$

With these relationships, the value for CE(t) can be re-expressed in terms of EF(t) as follows:

$$CE(t) = \frac{EF(t)}{a}$$

Furthermore, the value for F(t+δ) can be re-expressed in terms of EF(t) as follows:

$$F(t+\delta) = \frac{bEF(t)}{a}$$

This means that the values for CE(t+δ) and EF(t+δ) can be re-expressed as follows:

$$CE(t+\delta) = \delta E_P + \frac{bEF(t)}{a}$$

$$EF(t+\delta) = a\left(\delta E_P + \frac{bEF(t)}{a}\right)$$

And this expression for EF(t+δ) shortens to:

$$EF(t+\delta) = a\delta E_P + bEF(t)$$

It can be seen, therefore, that the energy to be fired in a laser pulse 122 at time t+δ in the future can be computed as a function of how much energy was fired in the previous laser pulse 122 at time t. Given that a, b, $E_P$, and EF(t) are known values, and δ is a controllable variable, these expressions can be used as the laser energy model 108 that predicts the amount of energy fired in a laser pulse at select times in the future (as well as how much energy is present in the fiber amplifier 116 at select times in the future).

While this example models the energy behavior over time for a pulsed fiber laser source 102, it should be understood that these models could be adjusted to reflect the energy behavior over time for other types of laser sources.

Thus, the control circuit 106 can use the laser energy model 108 to model how much energy is available in the laser source 102 over time and can be delivered in the laser pulses 122 for different time schedules of laser pulse shots. With reference to FIG. 2A, this allows the control circuit 106 to determine a timing schedule for the laser pulses 122 (step 202). For example, at step 202, the control circuit 106 can compare the laser energy model 108 with various defined energy requirements to assess how the laser pulse shots should be timed. As examples, the defined energy requirements can take any of a number of forms, including but not limited to (1) a minimum laser pulse energy, (2) a maximum laser pulse energy, (3) a desired laser pulse energy (which can be per targeted range point for a lidar transmitter 100 that selectively targets range points with laser pulses 122), (4) eye safety energy thresholds, and/or (5) camera safety energy thresholds. The control circuit 106 can then, at step 204, generate and provide firing commands 120 to the laser source 102 that trigger the laser source 102 to generate laser pulses 122 in accordance with the determined timing schedule. Thus, if the control circuit 106 determines that laser pulses should be generated at times t1, t2, t3, . . . , the firing commands 120 can trigger the laser source to generate laser pulses 122 at these times.

A control variable that the control circuit 106 can evaluate when determining the timing schedule for the laser pulses is the value of 6, which controls the time interval between successive laser pulse shots. The discussion below illustrates how the choice of 6 impacts the amount of energy in each laser pulse 122 according to the laser energy model 108.

For example, during a period where the laser source 102 is consistently fired every 6 units of time, the laser energy model 108 can be used to predict energy levels for the laser pulses as shown in the following toy example.

Toy Example 1, where $E_P$=1 unit of energy; δ=1 unit of time; the initial amount of energy stored by the fiber laser 116 is 1 unit of energy; a=0.5 and b=05.

| Shot Number | 1 | 2 | 3 | 4 | 5 |
|---|---|---|---|---|---|
| Time | t + 1 | t + 2 | t + 3 | t + 4 | t + 5 |
| Seed Energy from Pump Laser (S) | 1 | 1 | 1 | 1 | 1 |
| Leftover Fiber Energy (F) | 1 | 1 | 1 | 1 | 1 |
| Combined Energy (S + F) | 2 | 2 | 2 | 2 | 2 |
| Energy Fired (EF) | 1 | 1 | 1 | 1 | 1 |

If the rate of firing is increased, this will impact how much energy is included in the laser pulses. For example, relative to Toy Example 1, if the firing rate is doubled (S=0.5 units of time) (while the other parameters are the same), the laser energy model 108 will predict the energy levels per laser pulse 122 as follows below with Toy Example 2.

Toy Example 2, where $E_P$=1 unit of energy; δ=0.5 units of time; the initial amount of energy stored by the fiber laser 116 is 1 unit of energy; a=0.5 and b=0.5:

| Shot Number | 1 | 2 | 3 | 4 | 5 |
|---|---|---|---|---|---|
| Time | t + 0.5 | t + 1 | t + 1.5 | t + 2 | t + 3.5 |
| Seed Energy from Pump Laser (S) | 0.5 | 0.5 | 0.5 | 0.5 | 0.5 |

-continued

| Shot Number | 1 | 2 | 3 | 4 | 5 |
|---|---|---|---|---|---|
| Leftover Fiber Energy (F) | 1 | 0.75 | 0.625 | 0.5625 | 0.53125 |
| Combined Energy (S + F) | 1.5 | 1.25 | 1.125 | 1.0625 | 1.03125 |
| Energy Fired (EF) | 0.75 | 0.625 | 0.5625 | 0.53125 | 0.515625 |

Thus, in comparing Toy Example 1 with Toy Example 2 it can be seen that increasing the firing rate of the laser will decrease the amount of energy in the laser pulses 122. As example embodiments, the laser energy model 108 can be used to model a minimum time interval in a range between around 10 nanoseconds to around 100 nanoseconds. This timing can be affected by both the accuracy of the clock for control circuit 106 (e.g., clock skew and clock jitter) and the minimum required refresh time for the laser source 102 after firing.

If the rate of firing is decreased relative to Toy Example 1, this will increase how much energy is included in the laser pulses. For example, relative to Toy Example 1, if the firing rate is halved (δ=2 units of time) (while the other parameters are the same), the laser energy model 108 will predict the energy levels per laser pulse 122 as follows below with Toy Example 3.

Toy Example 3, where $E_P$=1 unit of energy; δ=2 units of time; the initial amount of energy stored by the fiber laser 116 is 1 unit of energy; a=0.5 and b=0.5:

| Shot Number | 1 | 2 | 3 | 4 | 5 |
|---|---|---|---|---|---|
| Time | t + 2 | t + 4 | t + 6 | t + 8 | t + 10 |
| Seed Energy from Pump Laser (S) | 2 | 2 | 2 | 2 | 2 |
| Leftover Fiber Energy (F) | 1 | 1.5 | 1.75 | 1.875 | 1.9375 |
| Combined Energy (S + F) | 3 | 3.5 | 3.75 | 3.875 | 3.9375 |
| Energy Fired (EF) | 1.5 | 1.75 | 1.875 | 1.9375 | 1.96875 |

If a practitioner wants to maintain a consistent amount of energy per laser pulse, it can be seen that the control circuit 106 can use the laser energy model 108 to define a timing schedule for laser pulses 122 that will achieve this goal (through appropriate selection of values for δ).

For practitioners that want the lidar transmitter 100 to transmit laser pulses at varying intervals, the control circuit 106 can use the laser energy model 108 to define a timing schedule for laser pulses 122 that will maintain a sufficient amount of energy per laser pulse 122 in view of defined energy requirements relating to the laser pulses 122. For example, if the practitioner wants the lidar transmitter 100 to have the ability to rapidly fire a sequence of laser pulses (for example, to interrogate a target in the field of view with high resolution) while ensuring that the laser pulses in this sequence are each at or above some defined energy minimum, the control circuit 106 can define a timing schedule that permits such shot clustering by introducing a sufficiently long value for δ just before firing the clustered sequence. This long δ value will introduce a "quiet" period for the laser source 102 that allows the energy in seed laser 114 to build up so that there is sufficient available energy in the laser source 102 for the subsequent rapid fire sequence of laser pulses. As indicated by the decay pattern of laser pulse energy reflected by Toy Example 2, increasing the starting value for the seed energy (S) before entering the time period of rapidly-fired laser pulses will make more energy available for the laser pulses fired close in time with each other.

Toy Example 4 below shows an example shot sequence in this regard, where there is a desire to fire a sequence of 5 rapid laser pulses separated by 0.25 units of time, where each laser pulse has a minimum energy requirement of 1 unit of energy. If the laser source has just concluded a shot sequence after which time there is 1 unit of energy retained in the fiber laser 116, the control circuit can wait 25 units of time to allow sufficient energy to build up in the seed laser 114 to achieve the desired rapid fire sequence of 5 laser pulses 122, as reflected in the table below.

Toy Example 4, where $E_P$=1 unit of energy; $\delta_{LONG}$=25 units of time; $\delta_{SHORT}$=0.25 units of time; the initial amount of energy stored by the fiber laser 116 is 1 unit of energy; a=0.5 and b=0.5; and the minimum pulse energy requirement is 1 unit of energy:

| Shot Number | 1 | 2 | 3 | 4 | 5 |
|---|---|---|---|---|---|
| Time | t + 25 | t + 25.25 | t + 25.5 | t + 25.75 | t + 26 |
| Seed Energy from Pump Laser (S) | 25 | 0.25 | 0.25 | 0.25 | 0.25 |
| Leftover Fiber Energy (F) | 1 | 13 | 6.625 | 3.4375 | 1.84375 |
| Combined Energy (S + F) | 26 | 13.25 | 6.875 | 3.6875 | 2.09375 |
| Energy Fired (EF) | 13 | 6.625 | 3.4375 | 1.84375 | 1.046875 |

Figure 16:
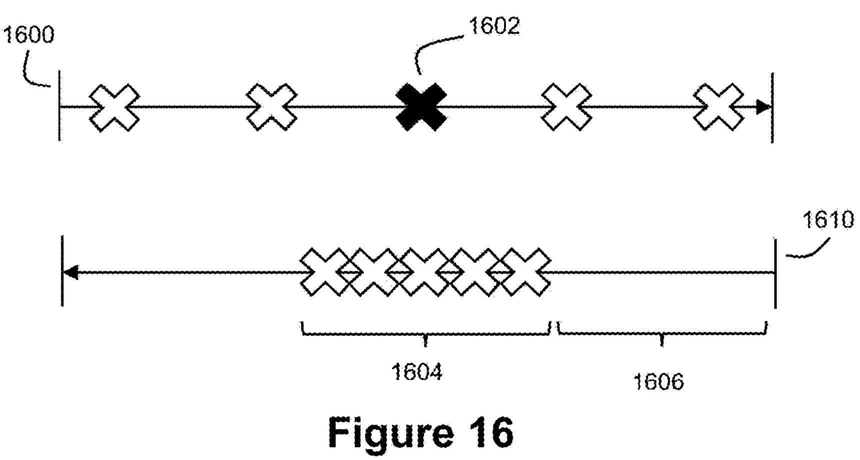
FIG. 16 illustrates how the lidar transmitter can change its firing rate to probe regions in a field of view with denser groupings of laser pulses.

This ability to leverage "quiet" periods to facilitate "busy" periods of laser activity means that the control circuit 106 can provide highly agile and responsive adaptation to changing circumstances in the field of view. For example, FIG. 16 shows an example where, during a first scan 1600 across azimuths from left to right at a given elevation, the laser source 102 fires 5 laser pulses 122 that are relatively evenly spaced in time (where the laser pulses are denoted by the "X" marks on the scan 1600). If a determination is made that an object of interest is found at range point 1602, the control circuit 106 can operate to interrogate the region of interest 1604 around range point 1602 with a higher density of laser pulses on second scan 1610 across the azimuths from right to left. To facilitate this high density period of rapidly fired laser pulses within the region of interest 1604, the control circuit 106 can use the laser energy model 108 to determine that such high density probing can be achieved by inserting a lower density period 1606 of laser pulses during the time period immediately prior to scanning through the region of interest 1604. In the example of FIG. 16, this lower density period 1604 can be a quiet period where no laser pulses are fired. Such timing schedules of laser pulses can be defined for different elevations of the scan pattern to permit high resolution probing of regions of interest that are detected in the field of view.

The control circuit 106 can also use the energy model 108 to ensure that the laser source 102 does not build up with too much energy. For practitioners that expect the lidar transmitter 100 to exhibit periods of relatively infrequent laser pulse firings, it may be the case that the value for δ in some instances will be sufficiently long that too much energy will build up in the fiber amplifier 116, which can cause problems for the laser source 102 (either due to equilibrium overheating of the fiber amplifier 116 or non-equilibrium overheating of the fiber amplifier 116 when the seed laser 114 induces a large amount of pulse energy to exit the fiber amplifier 116). To address this problem, the control circuit 106 can insert "marker" shots that serve to bleed off energy from the laser source 102. Thus, even though the lidar transmitter 100 may be primarily operating by transmitting laser pulses 122 at specific, selected range points, these marker shots can be fired regardless of the selected list of range points to be targeted for the purpose of preventing damage to the laser source 102. For example, if there is a maximum energy threshold for the laser source 102 of 25 units of energy, the control circuit 106 can consult the laser energy model 108 to identify time periods where this maximum energy threshold would be violated. When the control circuit 106 predicts that the maximum energy threshold would be violated because the laser pulses have been too infrequent, the control circuit 106 can provide a firing command 120 to the laser source 102 before the maximum energy threshold has been passed, which triggers the laser source 102 to fire the marker shot that bleeds energy out of the laser source 102 before the laser source's energy has gotten too high. This maximum energy threshold can be tracked and assessed in any of a number of ways depending on how the laser energy model 108 models the various aspects of laser operation. For example, it can be evaluated as a maximum energy threshold for the fiber amplifier 116 if the energy model 108 tracks the energy in the fiber amplifier 116 (S+F) over time. As another example, the maximum energy threshold can be evaluated as a maximum value of the duration δ (which would be set to prevent an amount of seed energy (S) from being deposited into the fiber amplifier 116 that may cause damage when taking the values for $E_P$ and a presumed value for F into consideration.

While the toy examples above use simplified values for the model parameters (e.g. the values for $E_P$ and δ) for the purpose of ease of explanation, it should be understood that practitioners can select values for the model parameters or otherwise adjust the model components to accurately reflect the characteristics and capabilities of the laser source 102 being used. For example, the values for $E_P$, a, and b can be empirically determined from testing of a pulsed fiber laser source (or these values can be provided by a vendor of the pulsed fiber laser source). Moreover, a minimum value for δ can also be a function of the pulsed fiber laser source 102. That is, the pulsed fiber laser sources available from different vendors may exhibit different minimum values for δ, and this minimum value for δ (which reflects a maximum achievable number of shots per second) can be included among the vendor's specifications for its pulsed fiber laser source.

Furthermore, in situations where the pulsed fiber laser source 102 is expected or observed to exhibit nonlinear behaviors, such nonlinear behavior can be reflected in the model. As an example, it can be expected that the pulsed fiber laser source 102 will exhibit energy inefficiencies at high power levels. In such a case, the modeling of the seed energy (S) can make use of a clipped, offset (affine) model for the energy that gets delivered to the fiber amplifier 116 by pump laser 118 for pulse generation. For example, in this case, the seed energy can be modeled in the laser energy model 108 as:

$$S(t+\delta) = E_P \max(a_1\delta + a_0, \text{offset})$$

The values for $a_1$, $a_0$, and offset can be empirically measured for the pulsed fiber laser source 102 and incorporated into the modeling of S(t+δ) used within the laser energy model 108. It can be seen that for a linear regime, the value for $a_1$ would be 1, and the values for $a_0$ and offset would be 0. In this case, the model for the seed energy S(t+δ) reduces to $\delta E_P$ as discussed in the examples above.

Figure 2B:
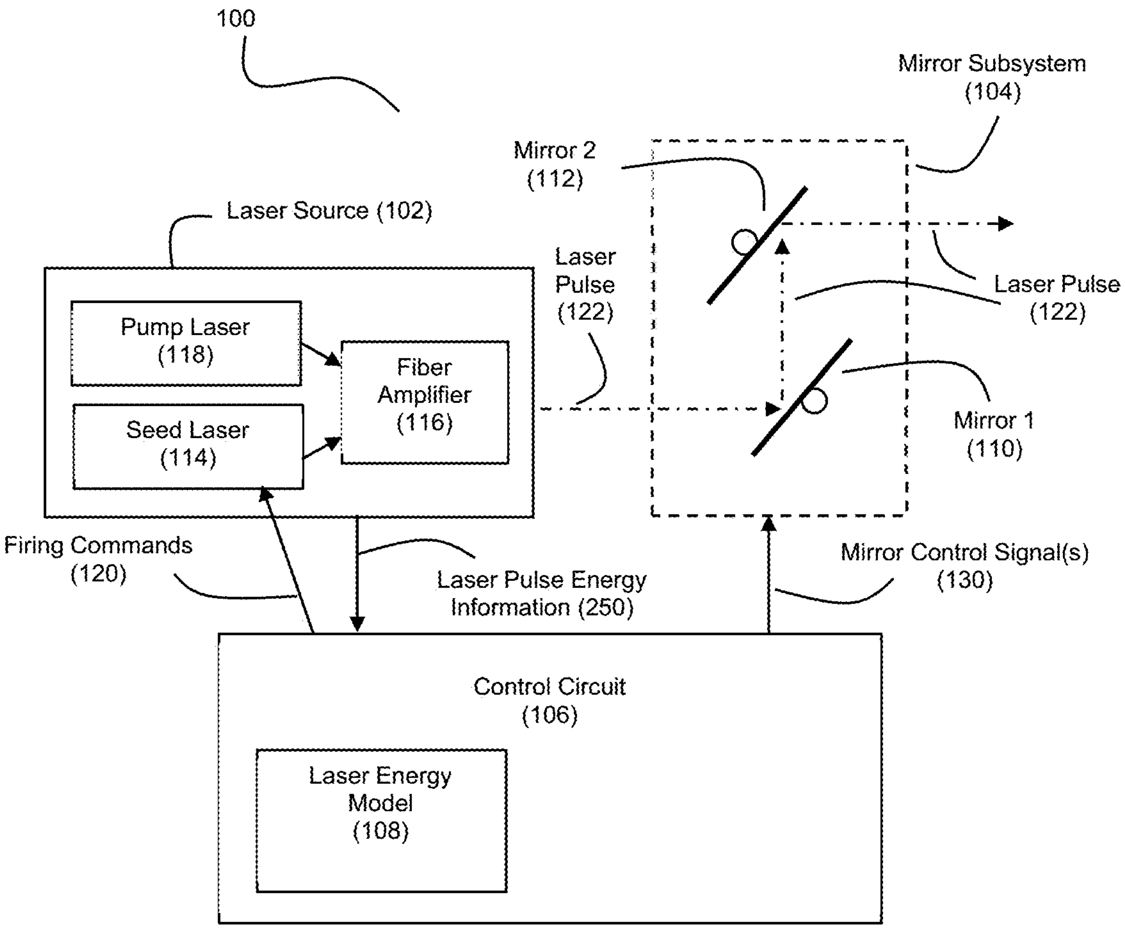
FIG. 2B-2D depict additional examples of lidar transmitters that use a laser energy model to schedule laser pulses.

The control circuit 106 can also update the laser energy model 108 based on feedback that reflects the energies within the actual laser pulses 122. In this fashion, laser energy model 108 can better improve or maintain its accuracy over time. In an example embodiment, the laser source 102 can monitor the energy within laser pulses 122 at the time of firing. This energy amount can then be reported by the laser source 102 to the control circuit 106 (see 250 in FIG. 2B) for use in updating the model 108. Thus, if the control circuit 106 detects an error between the actual laser pulse energy and the modeled pulse energy, then the control circuit 106 can introduce an offset or other adjustment into model 108 to account for this error.

For example, it may be necessary to update the values for a and b to reflect actual operational characteristics of the laser source 102. As noted above, the values of a and b define how much energy is transferred from the fiber amplifier 116 into the laser pulse 122 when the laser source 102 is triggered and the seed laser 114 induces the pulse 122 to exit the fiber amplifier 116. An updated value for a can be computed from the monitored energies in transmitted pulses 122 (PE) as follows:

$$a = \operatorname{argmin}_a\left(\sum\nolimits_{k=1 \ldots N} |PE(t_k+\delta_k) - aPE(t_k) - (1-a)\delta t_k|^2\right)$$

In this expression, the values for PE represent the actual pulse energies at the referenced times ($t_k$ or $t_k+\delta_k$). This is a regression problem and can be solved using commercial software tools such as those available from MATLAB, Wolfram, PTC, ANSYS, and others. In an ideal world, the respective values for PE(t) and PE(t+δ) will be the same as the modeled values of EF(t) and EF(t+δ), However, for a variety of reasons, the gain factors a and b may vary due to laser efficiency considerations (such as heat or aging whereby back reflections reduce the resonant efficiency in the laser cavity). Accordingly, a practitioner may find it useful to update the model 108 overtime to reflect the actual operational characteristics of the laser source 102 by periodically computing updated values to use for a and b.

Figure 2C:
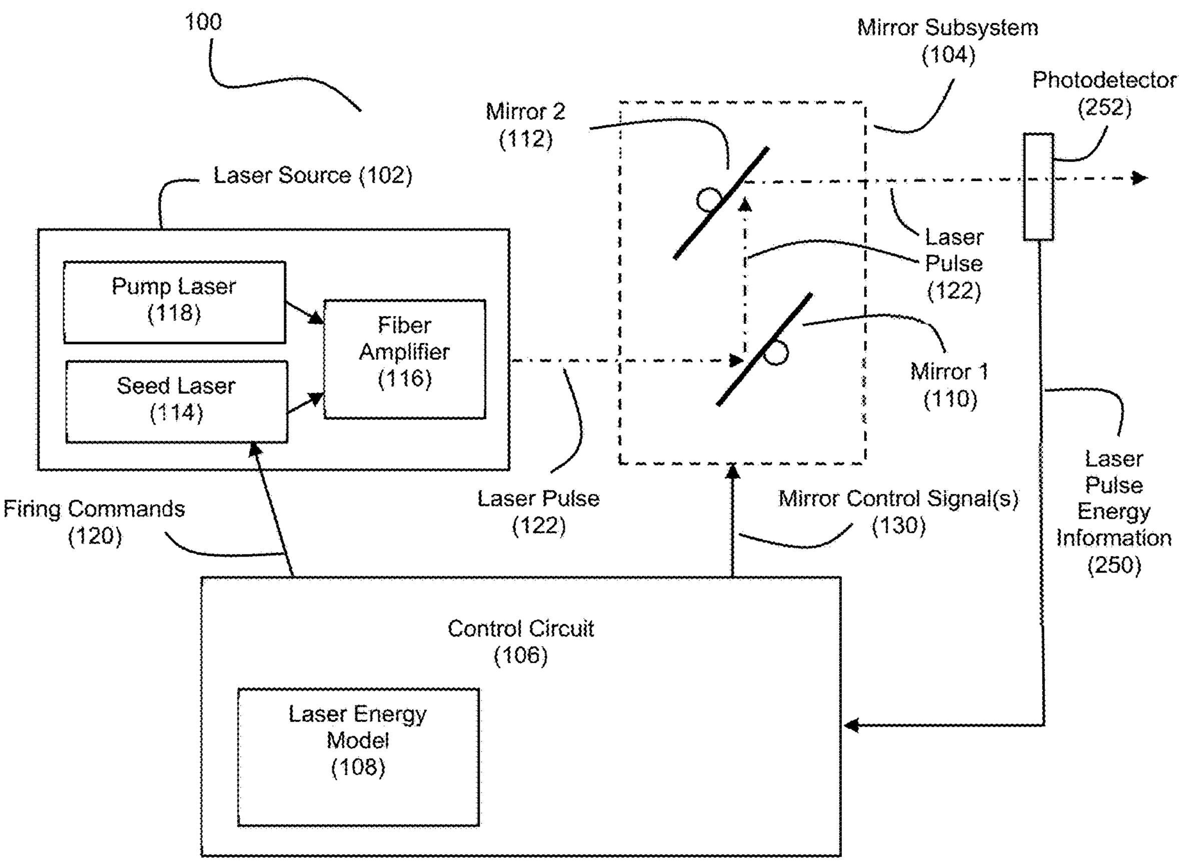
Figure 2D:
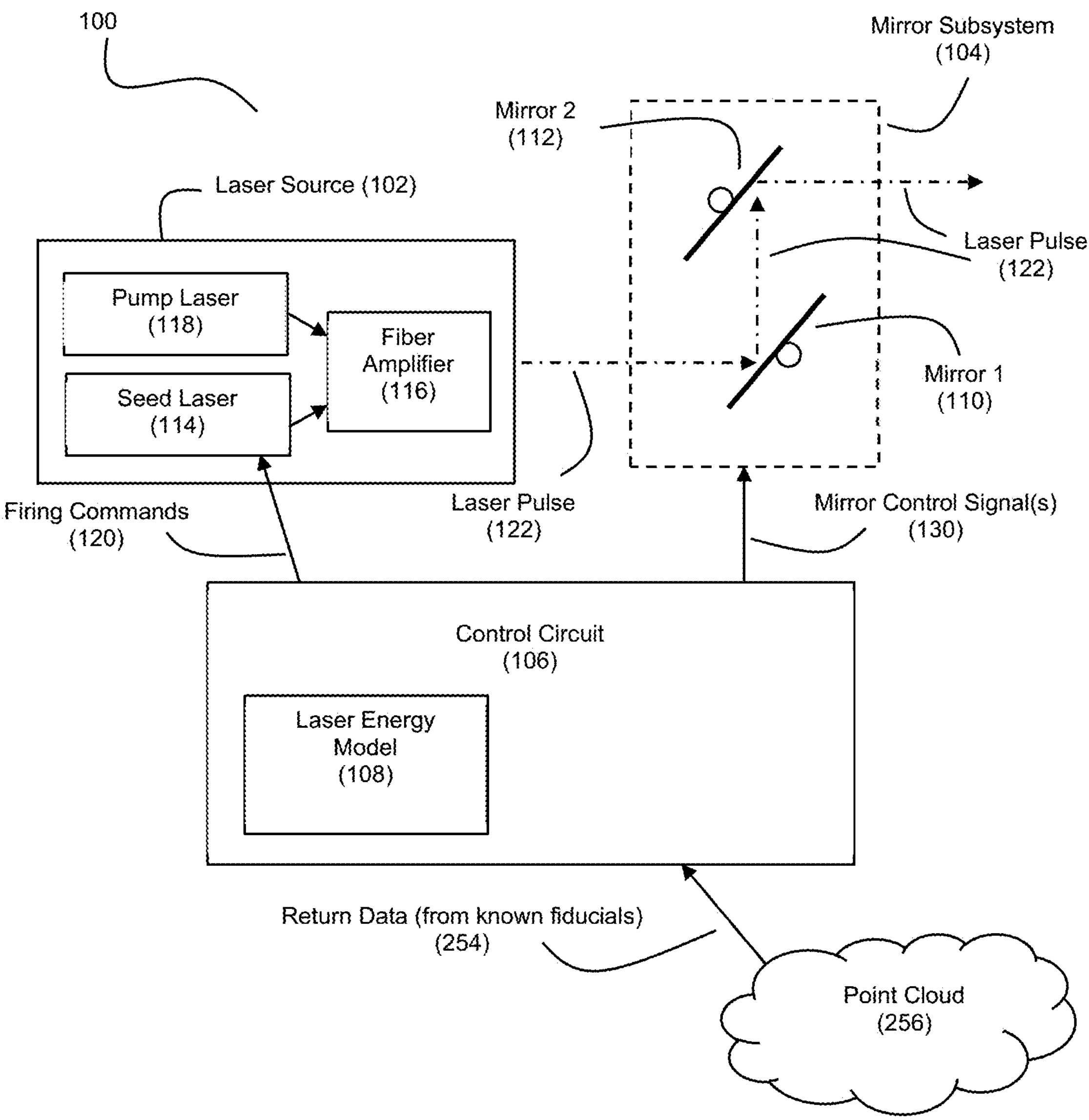

In scenarios where the laser source 102 does not report its own actual laser pulse energies, a practitioner can choose to include a photodetector at or near an optical exit aperture of the lidar transmitter 100 (e.g., see photodetector 252 in FIG. 2C). The photodetector 252 can be used to measure the energy within the transmitted laser pulses 122 (while allowing laser pulses 122 to propagate into the environment toward their targets), and these measured energy levels can be used to detect potential errors with respect to the modeled energies for the laser pulses so model 108 can be adjusted as noted above. As another example for use in a scenario where the laser source 102 does not report its own actual laser pulse energies, a practitioner derives laser pulse energy from return data 254 with respect to returns from known fiducial objects in a field of view (such as road signs which are regulated in terms of their intensity values for light returns) (see 254 in FIG. 2D) as obtained from a point cloud 256 for the lidar system. Additional details about such energy derivations are discussed below. Thus, in such an example, the model 108 can be periodically re-calibrated using point cloud data for returns from such fiducials, whereby the control circuit 106 derives the laser pulse energy that would have produced the pulse return data found in the point cloud 256. This derived amount of laser pulse energy can then be compared with the modeled laser pulse energy for adjustment of the laser energy model 108 as noted above.

Modeling Mirror Motion Over Time:

In a particularly powerful example embodiment, the control circuit 106 can also model mirror motion to predict where the mirror subsystem 104 will be aimed at a given point in time. This can be especially helpful for lidar transmitters 100 that selectively target specific range points in the field of view with laser pulses 122. By coupling the modeling of laser energy with a model of mirror motion, the control circuit 106 can set the order of specific laser pulse shots to be fired to targeted range points with highly granular and optimized time scales. As discussed in greater detail below, the mirror motion model can model mirror motion over short time intervals (such as over time intervals in a range from 5-50 nanoseconds). Such a short interval mirror motion model can be referred to as a transient mirror motion model.

Figure 3:
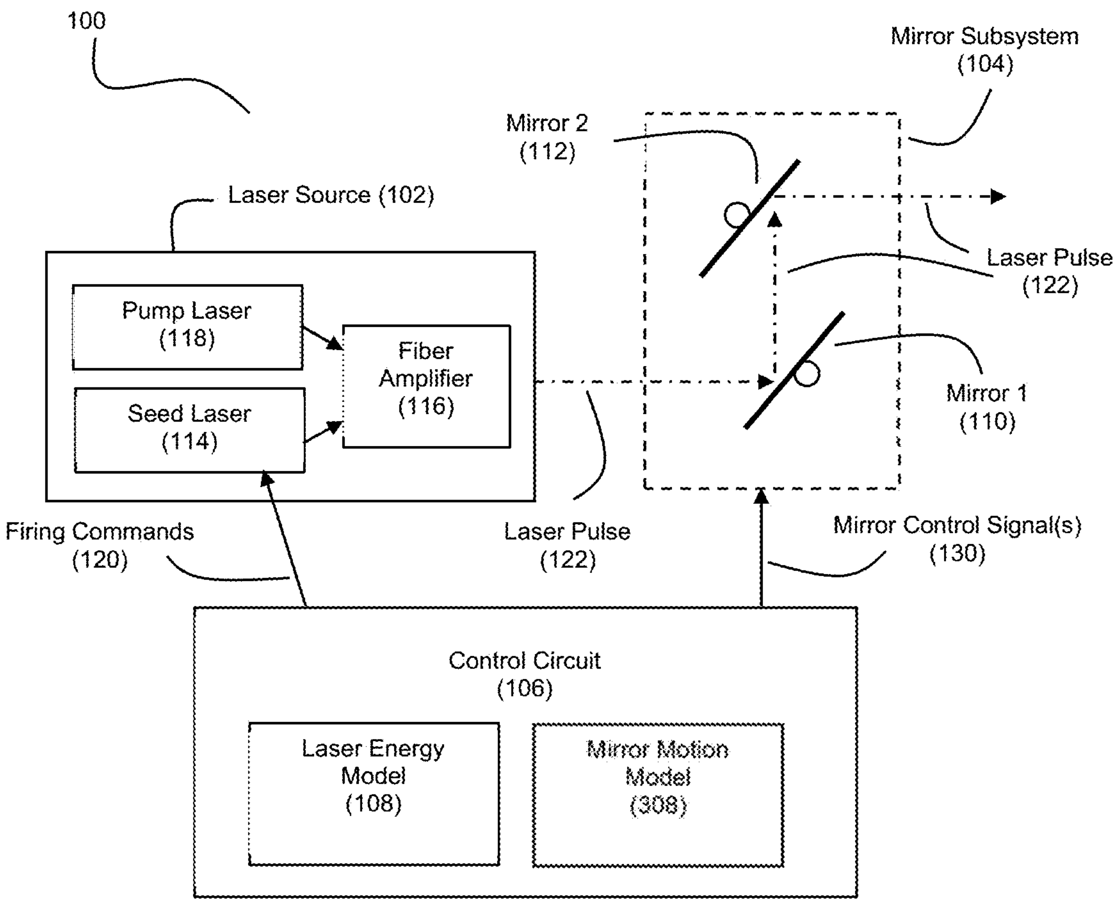
FIG. 3 depicts an example lidar transmitter that uses a laser energy model and a mirror motion model to schedule laser pulses.

FIG. 3 shows an example lidar transmitter 100 where the control circuit 106 uses both a laser energy model 108 and a mirror motion model 308 to govern the timing schedule for laser pulses 122.

In an example embodiment, the mirror subsystem 104 can operate as discussed above in connection with FIG. 1. For example, the control circuit 106 can (1) drive mirror 110 in a resonant mode using a sinusoidal signal to scan mirror 110 across different azimuth angles and (2) drive mirror 112 in a point-to-point mode using a step signal to scan mirror 112 across different elevations, where the step signal will vary as a function of the elevations of the range points to be targeted with laser pulses 122. Mirror 110 can be scanned as a fast-axis mirror, while mirror 112 is scanned as a slow-axis mirror. In such an embodiment, a practitioner can choose to use the mirror motion model 308 to model the motion of mirror 110 as (comparatively) mirror 112 can be characterized as effectively static for one or more scans across azimuth angles.

Figure 4A:
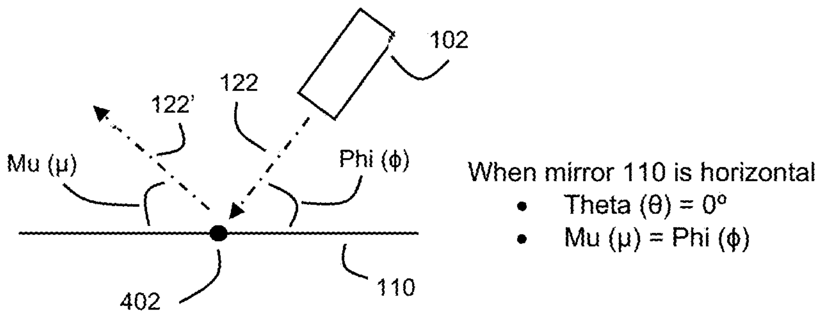
FIGS. 4A-4D illustrate how mirror motion can be modeled for a mirror that scans in a resonant mode.
Figure 4B:
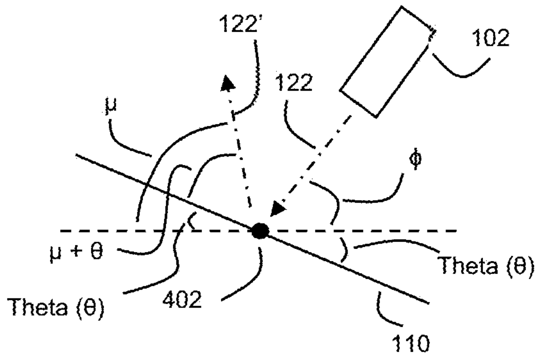
Figure 4C:
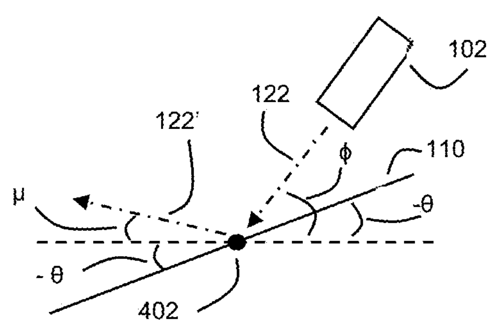

FIGS. 4A-4C illustrate how the motion of mirror 110 can be modeled over time. In these examples, (1) the angle theta (θ) represents the tilt angle of mirror 110, (2) the angle phi (ϕ) represents the angle at which a laser pulse 122 from the laser source 102 will be incident on mirror 110 when mirror 110 is in a horizontal position (where θ is zero degrees—see FIG. 4A), and (3) the angle mu (μ) represents the angle of pulse 422 as reflected by mirror 110 relative to the horizontal position of mirror 110. In this example, the angle can represent the scan angle of the mirror 110, where this scan angle can also be referred to as a shot angle for mirror 110 as angle μ corresponds to the angle at which reflected laser pulse 122' will be directed into the field of view if fired at that time.

FIG. 4A shows mirror 110, where mirror 110 is at "rest" with a tilt angle θ of zero degrees, which can be characterized as the horizon of mirror 110. Laser source 102 is oriented in a fixed position so that laser pulses 122 will impact mirror 110 at the angle ϕ relative to the horizontal position of mirror 110. Given the property of reflections, it should be understood that the value of the shot angle will be the same as the value of angle ϕ when the mirror 110 is horizontal (where θ=0).

FIG. 4B shows mirror 110 when it has been tilted about pivot 402 to a positive non-zero value of θ. It can be seen that the tilting of mirror to angle θ will have the effect of steering the reflected laser pulse 122' clockwise and to the right relative to the angle of the reflected laser pulse 122' in FIG. 4A (when mirror 110 was horizontal).

Mirror 110 will have a maximum tilt angle that can be referred to as the amplitude A of mirror 110. Thus, it can be understood that mirror 110 will scan through its tilt angles between the values of −A (which corresponds to $-\theta_{Max}$) and +A (which corresponds to $+\theta_{Max}$). It can be seen that the angle of reflection for the reflected laser pulse 122' relative to the actual position of mirror 110 is the sum of θ+ϕ as shown by FIG. 4B. In then follows that the value of the shot angle will be equal to 2θ+ϕ, as can be seen from FIG. 4B.

When driven in a resonant mode according to sinusoidal control signal, mirror 110 will change its tilt angle θ according to a cosine oscillation, where its rate of change is slowest at the ends of its scan (when it changes its direction of tilt) and fastest at the mid-point of its scan. In an example where the mirror 110 scans between maximum tilt angles of −A to +A, the value of the angle θ as a function of time can be expressed as:

$$\theta = A\cos(2\pi ft)$$

where f represents the scan frequency of mirror 110 and t represents time. Based on this model, it can be seen that the value for θ can vary from A (when t=0) to 0 (when t is a value corresponding to 90 degrees of phase (or 270 degrees of phase) to −A (when t is a value corresponding to 180 degrees of phase).

This means that the value of the shot angle can be expressed as a function of time by substituting the cosine expression for θ into the expression for the shot angle of μ=2θ+ϕ as follows:

$$\mu = 2A\cos(2\pi ft) + \varphi$$

From this expression, one can then solve for t to produce an expression as follows:

$$t = \frac{\arccos\left(\frac{\mu - \varphi}{2A}\right)}{2\pi f}$$

This expression thus identifies the time t at which the scan of mirror 110 will target a given shot angle μ. Thus, when the control circuit 106 wants to target a shot angle of μ, the time at which mirror 110 will scan to this shot angle can be readily computed given that the values for ϕ, A, and f will be known. In this fashion, the mirror motion model 308 can model that shot angle as a function of time and predict the time at which the mirror 110 will target a particular shot angle. FIG. 4C shows mirror 110 when it has been tilted about pivot 402 to a negative non-zero value of −θ. It can be seen that the tilting of mirror to angle −θ will have the effect of steering the reflected laser pulse 122' counterclockwise and to the left relative to the angle of the reflected laser pulse 122' in FIG. 4A (when mirror 110 was horizontal). FIG. 4C also demonstrates a constraint for a practitioner on the selection of the value for the angle ϕ. Laser source 102 will need to be positioned so that the angle ϕ is greater than the value of A to avoid a situation where the underside of the tilted mirror 110 occludes the laser pulse 122 when mirror is tilted to a value of θ that is greater than ϕ. Furthermore, the value of the angle ϕ should not be 90° to avoid a situation where the mirror 110 will reflect the laser pulse 122 back into the laser source 102. A practitioner can thus position the laser source 102 at a suitable angle ϕ accordingly.

Figure 4D:
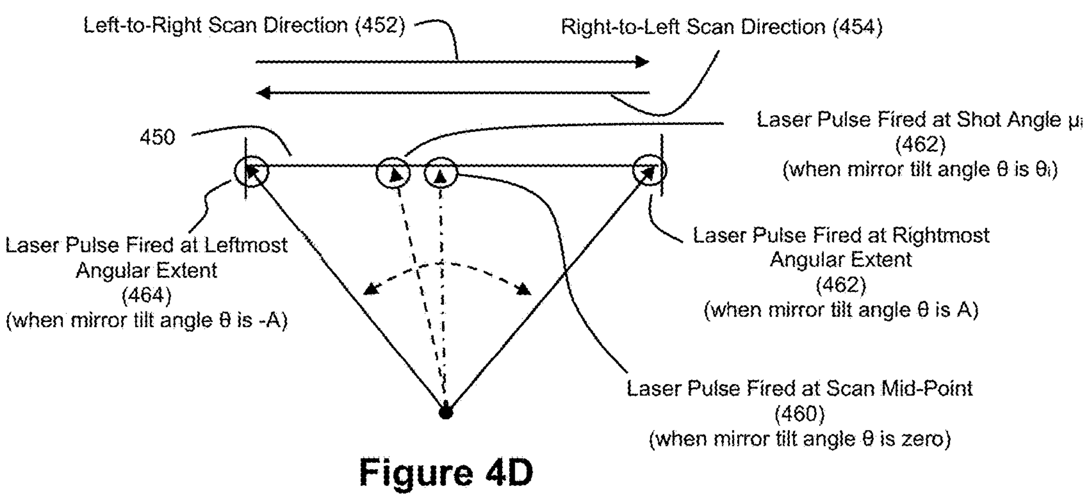

FIG. 4D illustrates a translation of this relationship to how the mirror 110 scans across a field of view 450. The mirror 110 will alternately scan in a left-to-right direction 452 and right-to-left direction 454 as mirror 110 tilts between its range of tilt angles (e.g., θ=−A through +A). For the example of FIG. 4A where the value for θ is zero, this means that a laser pulse fired at the untilted mirror 110 will be directed as shown by 460 in FIG. 4D, where the laser pulse is directed toward a range point at the mid-point of scan. The shot angle for this "straight ahead" gaze is ϕ as discussed above in connection with FIG. 4A. As the angle θ increases from θ=0, this will cause the laser pulses directed by mirror 110 to scan to the right in the field of view until the mirror 110 tilts to the angle θ=+A. When θ=+A, mirror 110 will be at the furthest extent of its rightward scan 452, and it will direct a laser pulse as shown by 462. The shot angle for this rightmost scan position will be the value μ=2A+ϕ. From that point, the mirror 110 will begin scanning leftward in direction 454 by reducing its tilt angle θ. The mirror 110 will once again scan through the mid-point and eventually reach a tilt angle of θ=−A. When θ=−A, mirror 110 will be at the furthest extent of its leftward scan 452, and it will direct a laser pulse as shown by 464. The shot angle for this leftmost scan position will be the value=−2A. From that point, the mirror 110 will begin tilting in the rightward direction 450 again, and the scan repeats. As noted above, due to the mirror motion model 308, the control circuit 106 will know the time at which the mirror 110 is targeting a shot angle of $\mu_i$ to direct a laser pulse as shown by 466 of FIG. 4D.

In an example embodiment, the values for +A and −A can be values in a range between +/−10 degrees and +/−20 degrees (e.g., +/−16 degrees) depending on the nature of mirror chosen as mirror 110. In an example where A is 16 degrees and mirror 110 scans as discussed above in connection with FIGS. 4A-4D, it can be understood that the angular extent of the scan for mirror 110 would be 64 degrees (or 2A from the scan mid-point in both the right and left directions for a total of 4A).

Figure 4E:
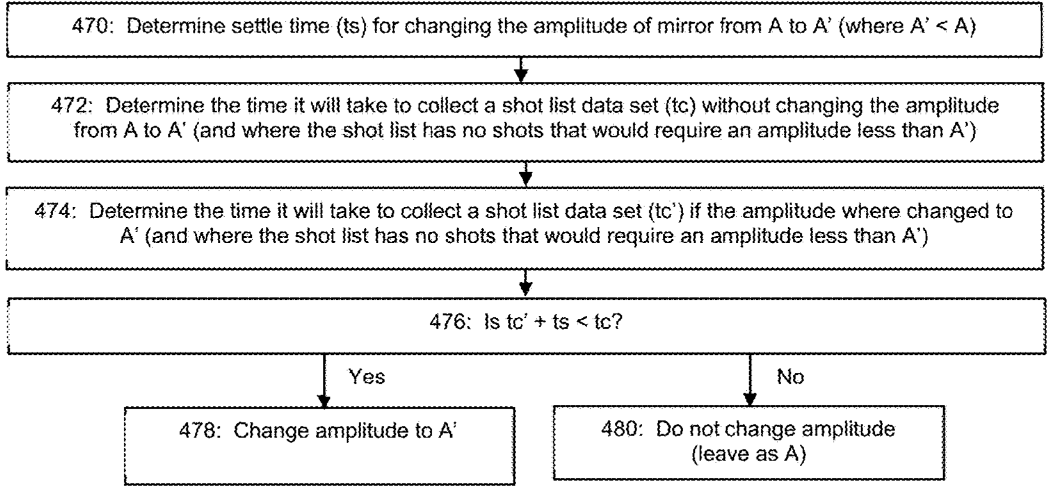
FIG. 4E depicts an example process flow for controllably adjusting an amplitude for mirror scanning.

In some example embodiments, the value for A in the mirror motion model 308 can be a constant value. However, some practitioners may find it desirable to deploy a mirror 110 that exhibits an adjustable value for A (e.g., a variable amplitude mirror such as a variable amplitude MEMS mirror can serve as mirror 110). From the relationships discussed above, it can be seen that the time required to move between two shot angles is reduced when the value for amplitude A is reduced. The control circuit 106 can leverage this relationship to determine whether it is desirable to adjust the amplitude of the mirror 110 before firing a sequence of laser pulses 122. FIG. 4E shows an example process flow in this regard. At step 470, the control circuit 106 determines the settle time (ts) for changing the amplitude from A to A' (where A'<A). It should be understood that changing the mirror amplitude in this fashion will introduce a time period where the mirror is relatively unstable, and time will need to be provided to allow the mirror to settle down to a stable position. This settling time can be empirically determined or tracked for the mirror 110, and the control circuit 106 can maintain this settle time value as a control parameter. At step 472, the control circuit 106 determines the time it will take to collect a shot list data set in a circumstance where the amplitude of the mirror is unchanged (amplitude remains A). This time can be referenced as collection time tc. This value for tc can be computed through the use of the laser energy model 108 and mirror motion model 308 with reference to the shots included in a subject shot list. At step 474, the control circuit 106 determines the time it will take to collect the same shot list data set in a circumstance where the amplitude of the mirror is changed to A'. This time can be referenced as collection time tc'. This value for tc' can be computed through the use of the laser energy model 108 and mirror motion model 308 (as adjusted in view of the reduced amplitude of A') with reference to the shots included in the subject shot list. At step 476, the control circuit compares tc with the sum of tc' and ts. If the sum (tc'+ts) is less than tc, this means that it will be time efficient to change the mirror amplitude to A'. In this circumstance, the process flow proceeds to step 478, and the control circuit 106 adjusts the amplitude of mirror 110 to A'. If the sum (tc'+ts) is not less than tc, then the control circuit 106 leaves the amplitude value unchanged (step 480).

Figure 5:
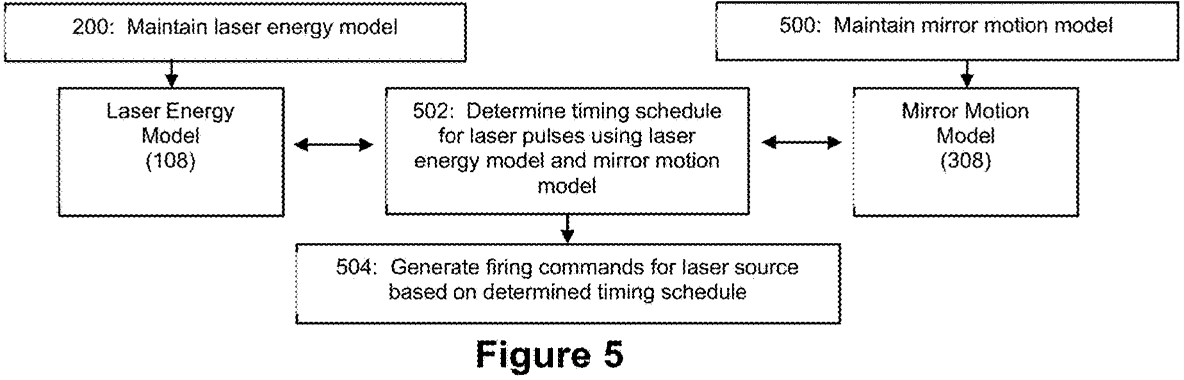
FIG. 5 depicts an example process flow for the control circuit of FIG. 3.

Model-Based Shot Scheduling:

FIG. 5 shows an example process flow for the control circuit 106 to use both the laser energy model 108 and the mirror motion model 308 to determine the timing schedule for laser pulses 122. Step 200 can operate as described above with reference to FIG. 2A to maintain the laser energy model 108. At step 500, the control circuit 106 maintains the mirror motion model 308. As discussed above, this model 308 can model the shot angle that the mirror will target as a function of time. Accordingly, the mirror motion model 308 can predict the shot angle of mirror 110 at a given time t. To maintain and update the model 308, the control circuit 108 can establish the values for A, ϕ, and f to be used for the model 308. These values can be read from memory or determined from the operating parameters for the system.

At step 502, the control circuit 106 determines a timing schedule for laser pulses 122 using the laser energy model 108 and the mirror motion model 308. By linking the laser energy model 108 and the mirror motion model 308 in this regard, the control circuit 106 can determine how much energy is available for laser pulses targeted toward any of the range points in the scan pattern of mirror subsystem 104. For purposes of discussion, we will consider an example embodiment where mirror 110 scans in azimuth between a plurality of shot angles at a high rate while mirror 112 scans in elevation at a sufficiently slower rate so that the discussion below will assume that the elevation is held steady while mirror 110 scans back and forth in azimuth. However, the techniques described herein can be readily extended to modeling the motion of both mirrors 110 and 112.

If there is a desire to target a range point at a Shot Angle A with a laser pulse of at least X units of energy, the control circuit 106, at step 502, can consult the laser energy model 108 to determine whether there is sufficient laser energy for the laser pulse when the mirror 110's scan angle points at Shot Angle A. If there is sufficient energy, the laser pulse 122 can be fired when the mirror 110 scans to Shot Angle A. If there is insufficient energy, the control circuit 106 can wait to take the shot until after mirror 110 has scanned through and back to pointing at Shot Angle A (if the laser energy model 108 indicates there is sufficient laser energy when the mirror returns to Shot Angle A). The control circuit 106 can compare the shot energy requirements for a set of shot angles to be targeted with laser pulses to determine when the laser pulses 122 should be fired. Upon determination of the timing schedule for the laser pulses 122, the control circuit 106 can generate and provide firing commands 120 to the laser source 102 based on this determined timing schedule (step 504).

Figure 6A:
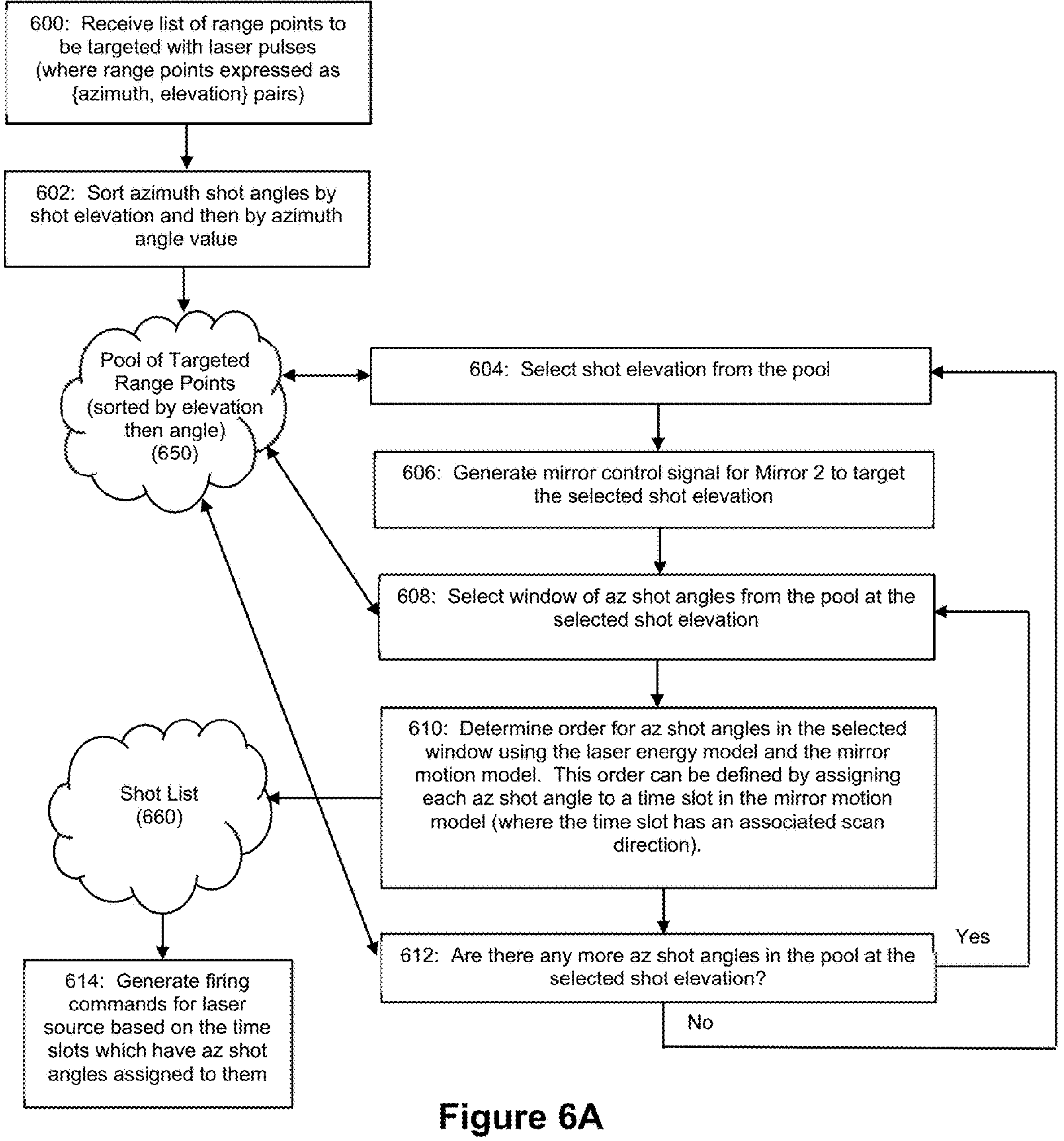
FIGS. 6A and 6B depict example process flows for shot scheduling using the control circuit of FIG. 3.
Figure 6B:
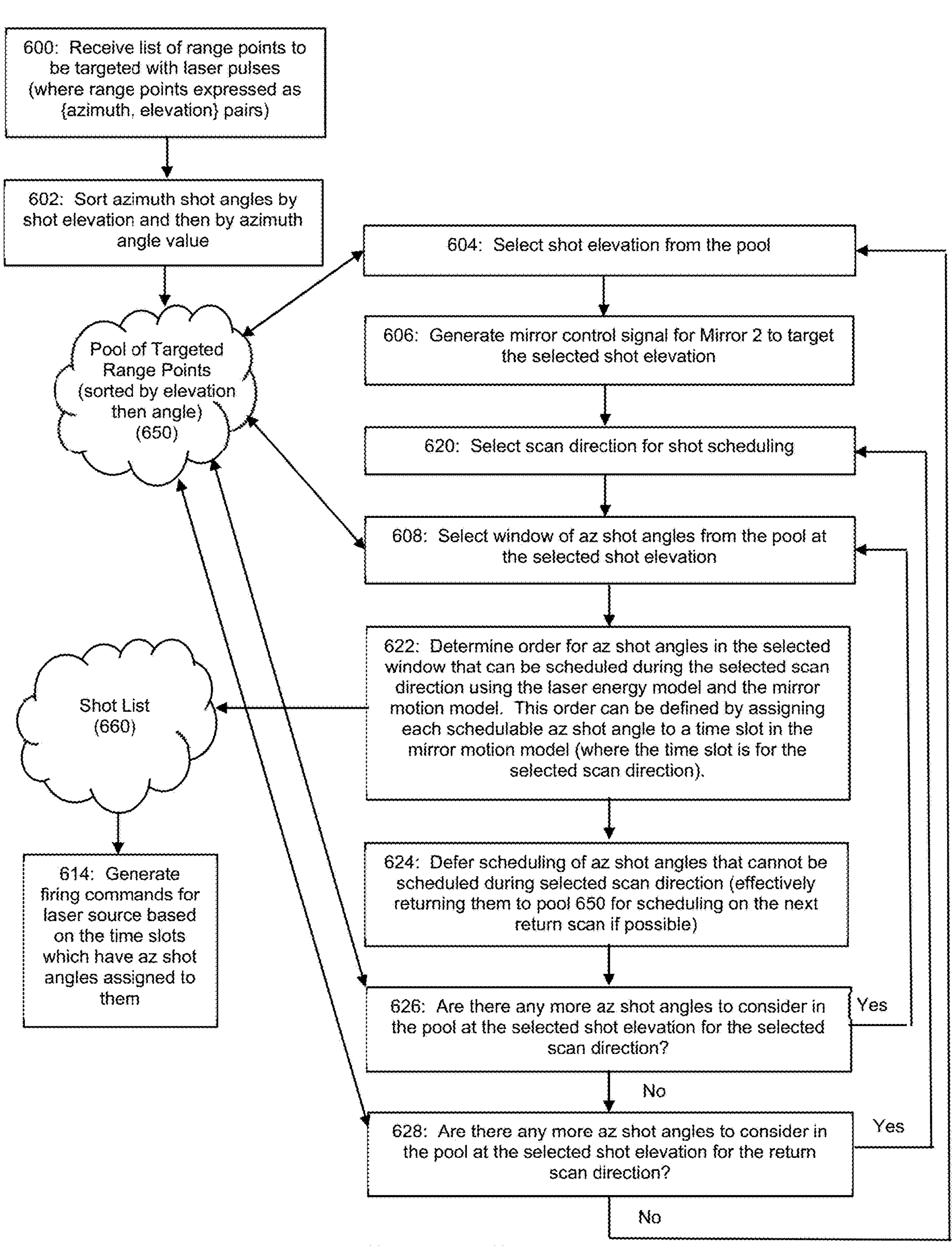

FIGS. 6A and 6B show example process flows for implementing steps 502 and 504 of FIG. 5 in a scenario where the mirror subsystem 104 includes mirror 110 that scans through azimuth shot angles in a resonant mode (fast-axis) and mirror 112 that scans through elevation shot angles in a point-to-point mode (slow-axis). Lidar transmitter 100 in these examples seeks to fire laser pulses 122 at intelligently selected range points in the field of view. With the example of FIG. 6A, the control circuit 106 schedules shots for batches of range points at a given elevation on whichever scan direction of the mirror 110 is schedulable for those range points according to the laser energy model 108. With the example of FIG. 6B, the control circuit 106 seeks to schedule shots for as many range points as it can at a given elevation for each scan direction of the mirror 110 in view of the laser energy model 108. For any shots at the subject elevation that cannot be scheduled for a given scan direction due to energy model constraints, the control circuit 106 then seeks to schedule those range points on the reverse scan (and so on until all of the shots are scheduled).

The process flow of FIG. 6A begins with step 600. At step 600, the control circuit 106 receives a list of range points to be targeted with laser pulses. These range points can be expressed as (azimuth angle, elevation angle) pairs, and they may be ordered arbitrarily.

At step 602, the control circuit 106 sorts the range points by elevation to yield sets of azimuth shot angles sorted by elevation. The elevation-sorted range points can also be sorted by azimuth shot angle (e.g., where all of the shot angles at a given elevation are sorted in order of increasing azimuth angle (smallest azimuth shot angle to largest azimuth shot angle) or decreasing azimuth angle (largest azimuth shot angle to smallest azimuth shot angle). For the purposes of discussing the process flows of FIGS. 6A and 6B, these azimuth shot angles can be referred to as the shot angles for the control circuit 106. Step 602 produces a pool 650 of range points to be targeted with shots (sorted by elevation and then by shot angle).

At step 604, the control circuit 106 selects a shot elevation from among the shot elevations in the sorted list of range points in pool 650. The control circuit 106 can make this selection on the basis of any of a number of criteria. The order of selection of the elevations will govern which elevations are targeted with laser pulses 122 before others.

Figure 17A:
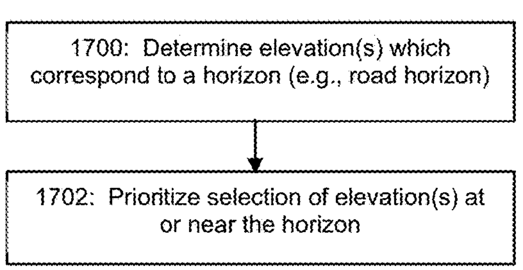
FIGS. 17A-17F depict example process flows for prioritized selections of elevations with respect to shot scheduling.

Accordingly, in an example embodiment, the control circuit 106 can prioritize the selection of elevations at step 604 that are expected to encompass regions of interest in the field of view. As an example, some practitioners may find the horizon in the field of view (e.g., a road horizon) to be high priority for targeting with laser pulses 122. In such a case, step 604 can operate as shown by FIG. 17A to determine the elevation(s) which correspond to a horizon in the field of view (e.g. identify the elevations at or near the road horizon) (see step 1702) and then prioritize the selection of those elevations from pool 650 (see step 1702). Step 1702 can be performed by analyzing lidar return point cloud data and/or camera images of the field of view to identify regions in the field of view that are believed to qualify as the horizon (e.g., using contrast detection techniques, edge detection techniques, and/or other pattern processing techniques applied to lidar or image data).

Figure 17B:
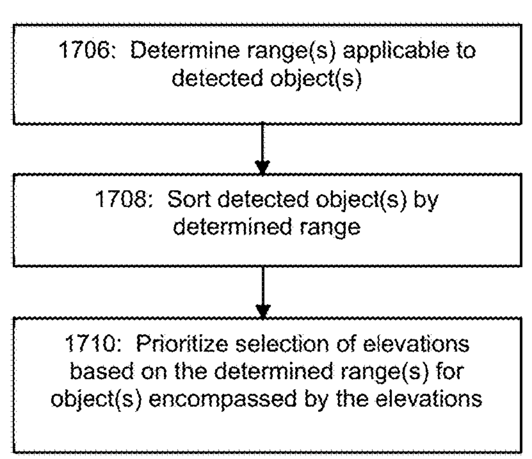

As another example, the control circuit 106 can prioritize the selection of elevations based on the range(s) to detected object(s) in the field of view. Some practitioners may find it desirable to prioritize the shooting of faraway objects in the field of view. Other practitioners may find it desirable to prioritize the shooting of nearby objects in the field of view. Thus, in an example such as that shown by FIG. 17B, the range(s) applicable to detected object(s) is determined (see step 1706). This range information will be available from the lidar return point cloud data. At step 1708, the control circuit sorts the detected object(s) by their determined range(s). Then, at step 1708, the control circuit 106 prioritizes the selection of elevations from pool 650 based on the determined range(s) for object(s) included in those elevations.

With step 1708, prioritization can be given to larger range values than for smaller range values if the practitioner wants to shoot faraway objects before nearby objects. For practitioners that want to shoot nearby objects before faraway objects, step 1708 can give priority to smaller range values than for larger range values. Which objects are deemed faraway and which are deemed nearby can be controlled using any of a number of techniques. For example, a range threshold can be defined, and the control circuit 106 can make the elevation selections based on which elevations include sorted objects whose range is above (or below as the case may be) the defined range threshold. As another example, the relative ranges for the sorted objects can be used to control the selection of elevations (where the sort order of either farthest to nearest or nearest to farthest governs the selection of elevations which include those objects).

Figure 17C:
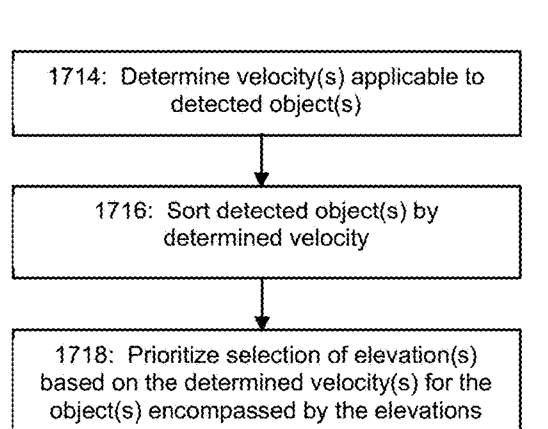

As yet another example, the control circuit 106 can prioritize the selection of elevations based on the velocity (ies) of detected object(s) in the field of view. Some practitioners may find it desirable to prioritize the shooting of fast-moving objects in the field of view. FIG. 17C shows an example process flow for this. At step 1714, the velocity is determined for each detected object in the field of view. This velocity information can be derived from the lidar return point cloud data. At step 1716, the control circuit 106 can sort the detected object(s) by the determined velocity(ies). The control circuit 106 can then use determined velocities for the sorted objects as a basis for prioritizing the selection of elevations which contain those detected objects (step 1718). This prioritization at step 1718 can be carried out in any of a number of ways. For example, a velocity threshold can be defined, and step 1718 can prioritize the selection of elevation include an object moving at or above this defined velocity threshold. As another example, the relative velocities of the sorted objects can be used where an elevation that includes an object moving faster than another object can be selected before an elevation that includes the another (slower moving) object.

Figure 17D:
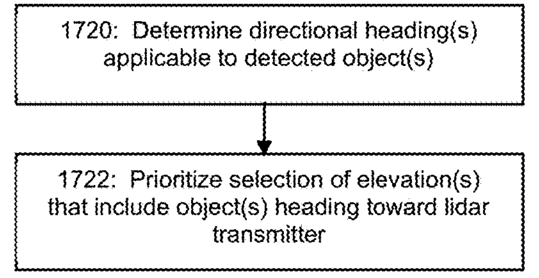

As yet another example, the control circuit 106 can prioritize the selection of elevations based on the directional heading(s) of detected object(s) in the field of view. Some practitioners may find it desirable to prioritize the shooting of objects in the field of view that moving toward the lidar transmitter 100. FIG. 17D shows an example process flow for this. At step 1720, the directional heading is determined for each detected object in the field of view. This directional heading can be derived from the lidar return point cloud data. The control circuit 1722 can then prioritize the selection of elevation(s) that include object(s) that are determined to be heading toward the lidar transmitter 100 (within some specified degree of tolerance where the elevation that contains an object heading near the lidar transmitter 100 would be selected before an elevation that contains an object moving away from the lidar transmitter 100).

Figures 17E, 17F:
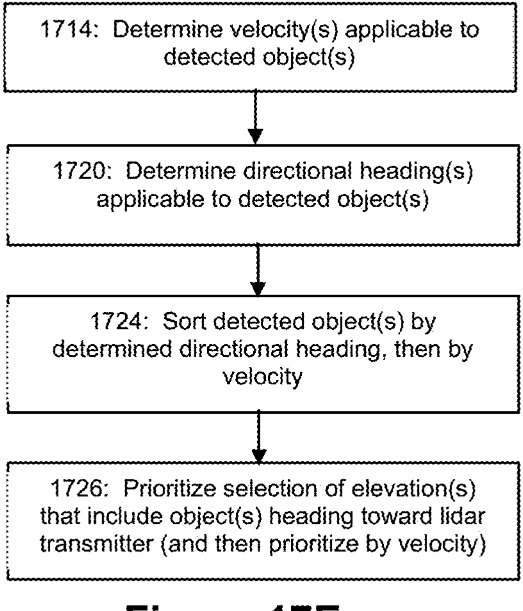

Further still, some practitioners may find it desirable to combine the process flows of FIGS. 17C and 17D to prioritize the selection of fast-moving objects that are heading toward the lidar transmitter 100. An example for this is shown by FIG. 17E. With FIG. 17E, steps 1714 and 1720 can be performed as discussed above. At step 1724, the detected object(s) are sorted by their directional headings (relative to the lidar transmitter 100) and then by the determined velocities. At step 1726, the elevations which contain objected deemed to be heading toward the lidar transmitter 100 (and moving faster than other such objects) are prioritized for selection.

In another example embodiment, the control circuit 106 can select elevations at step 604 based on eye safety or camera safety criteria. For example, eye safety requirements may specify that the lidar transmitter 100 should not direct more than a specified amount of energy in a specified spatial area over of a specified time period. To reduce the risk of firing too much energy into the specified spatial area, the control circuit 106 can select elevations in a manner that avoids successive selections of adjacent elevations (e.g., jumping from Elevation 1 to Elevation 3 rather than Elevation 2) to insert more elevation separation between laser pulses that may be fired close in time. This manner of elevation selection may optionally be implemented dynamically (e.g., where elevation skips are introduced if the control circuit 106 determines that the energy in a defined spatial area has exceeded some level that is below but approaching the eye safety thresholds). Furthermore, it should be understood that the number of elevations to skip (a skip interval) can be a value selected by a practitioner or user to define how many elevations will be skipped when progressing from elevation-to-elevation. As such, a practitioner may choose to set the elevation skip interval to be a value larger than 1 (e.g., a skip interval of 5, which would cause the system to progress from Elevation 3 to Elevation 9). Furthermore, similar measures can be taken to avoid hitting cameras that may be located in the field of view with too much energy. FIG. 17F depicts an example process flow for this approach. At step 1730, the control circuit 106 selects Elevation $X_t$ (where this selected elevation is larger (or smaller) than the preceding selected elevation (Elevation $X_{t-1}$) by the defined skip interval. Then, the control circuit 106 schedules the shots for the selected elevation (step 1732), and the process flow returns to step 1730 where the next elevation (Elevation $X_{t+1}$) is selected (according to the skip interval relative to Elevation $X_t$).

Thus, it should be understood that step 604 can employ a prioritized classification system that decides the order in which elevations are to be targeted with laser pulses 122 based on the criteria of FIGS. 17A-17F or any combinations of any of these criteria.

At step 606, the control circuit 106 generates a mirror control signal for mirror 112 to drive mirror 112 so that it targets the angle of the selected elevation. As noted, this mirror control signal can be a step signal that steps mirror 112 up (or down) to the desired elevation angle. In this fashion, it can be understood that the control circuit 106 will be driving mirror 112 in a point-to-point mode where the mirror control signal for mirror 112 will vary as a function of the range points to be targeted with laser pulses (and more precisely, as a function of the order of range points to be targeted with laser pulses).

At step 608, the control circuit 106 selects a window of azimuth shot angles that are in the pool 650 at the selected elevation. The size of this window governs how many shot angles that the control circuit 106 will order for a given batch of laser pulses 122 to be fired. This window size can be referred to as the search depth for the shot scheduling. A practitioner can configure the control circuit 106 to set this window size based on any of a number of criteria. While the toy examples discussed below use a window size of 3 for purposes of illustration, it should be understood that practitioners may want to use a larger (or smaller) window size in practice. For example, in an example embodiment, the size of the window may be a value in a range between 2 shots and 12 shots. However, should the control circuit 106 have larger capacities for parallel processing or should there be more lenient time constraints on latency, a practitioner may find it desirable to choose larger window sizes. Furthermore, the control circuit 106 can consider a scan direction for the mirror 110 when selecting the shot angles to include in this window. Thus, if the control circuit 106 is scheduling shots for a scan direction corresponding to increasing shot angles, the control circuit 106 can start from the smallest shot angle in the sorted pool 650 and include progressively larger shot angles in the shot angle sort order of the pool 650. Similarly, if the control circuit 106 is scheduling shots for a scan direction corresponding to decreasing shot angles, the control circuit 106 can start from the largest shot angle in the sorted pool 650 and include progressively smaller shot angles in the shot angle sort order of the pool 650.

At step 610, the control circuit 106 determines an order for the shot angles in the selected window using the laser energy model 108 and the mirror motion model 308. As discussed above, this ordering operation can compare candidate orderings with criteria such as energy requirements relating to the shots to find a candidate ordering that satisfies the criteria. Once a valid candidate ordering of shot angles is found, this can be used as ordered shot angles that will define the timing schedule for the selected window of laser pulses 122. Additional details about example embodiments for implementing step 610 are discussed below.

Once the shot angles in the selected window have been ordered at step 610, the control circuit 106 can add these ordered shot angles to the shot list 660. As discussed in greater detail below, the shot list 660 can include an ordered listing of shot angles and a scan direction corresponding to each shot angle.

At step 612, the control circuit 106 determines whether there are any more shot angles in pool 650 to consider at the selected elevation. In other words, if the window size does not encompass all of the shot angles in the pool 650 at the selected elevation, then the process flow can loop back to step 608 to grab another window of shot angles from the pool 650 for the selected elevation. If so, the process flow can then perform steps 610 and 612 for the shot angles in this next window.

Once all of the shots have been scheduled for the shot angles at the selected elevation, the process flow can loop back from step 612 to step 604 to select the next elevation from pool 650 for shot angle scheduling. As noted above, this selection can proceed in accordance with a defined prioritization of elevations. From there, the control circuit 106 can perform steps 606-614 for the shot angles at the newly selected elevation.

Meanwhile, at step 614, the control circuit 106 generates firing commands 120 for the laser source 102 in accordance with the determined order of shot angles as reflected by shot list 660. By providing these firing commands 120 to the laser source 102, the control circuit 106 triggers the laser source 102 to transmit the laser pulses 122 in synchronization with the mirrors 110 and 112 so that each laser pulse 122 targets its desired range point in the field of view. Thus, if the shot list includes Shot Angles A and C to be fired at during a left-to-right scan of the mirror 110, the control circuit 106 can use the mirror motion model 308 to identify the times at which mirror 110 will be pointing at Shot Angles A and C on a left-to-right scan and generate the firing commands 120 accordingly. The control circuit 106 can also update the pool 650 to mark the range points corresponding to the firing commands 120 as being "fired" to effectively remove those range points from the pool 650.

In the example of FIG. 6B, as noted above, the control circuit 106 seeks to schedule as many shots as possible on each scan direction of mirror 110. Steps 600, 602, 604, and 606 can proceed as described above for FIG. 6A.

At step 620, the control circuit 106 selects a scan direction of mirror 110 to use for scheduling. A practitioner can choose whether this scheduling is to start with a left-to-right scan direction or a right-to-left scan direction. Then, step 608 can operate as discussed above in connection with FIG. 6A, but where the control circuit 106 uses the scan direction selected at step 620 to govern which shot angles are included in the selected window. Thus, if the selected scan direction corresponds to increasing shot angles, the control circuit 106 can start from the smallest shot angle in the sorted pool 650 and include progressively larger shot angles in the shot angle sort order of the pool 650. Similarly, if the selected scan direction corresponds to decreasing shot angles, the control circuit 106 can start from the largest shot angle in the sorted pool 650 and include progressively smaller shot angles in the shot angle sort order of the pool 650.

At step 622, the control circuit 106 determines an order for the shot angles based on the laser energy model 108 and the mirror motion model 308 as discussed above for step 610, but where the control circuit 106 will only schedule shot angles if the laser energy model 108 indicates that those shot angles are schedulable on the scan corresponding to the selected scan direction.

Scheduled shot angles are added to the shot list 660. But, if the laser energy model 108 indicates that the system needs to wait until the next return scan (or later) to take a shot at a shot angle in the selected window, then the scheduling of that shot angle can be deferred until the next scan direction for mirror 110 (see step 624). This effectively returns the unscheduled shot angle to pool 650 for scheduling on the next scan direction if possible.

At step 626, the control circuit 106 determines if there are any more shot angles in pool 650 at the selected elevation that are to be considered for scheduling on the scan corresponding to the selected scan direction. If so, the process flow returns to step 608 to grab another window of shot angles at the selected elevation (once again taking into consideration the sort order of shot angles at the selected elevation in view of the selected scan direction).

Once the control circuit 106 has considered all of the shot angles at the selected elevation for scheduling on the selected scan direction, the process flow proceeds to step 628 where a determination is made as to whether there are any more unscheduled shot angles from pool 650 at the scheduled elevation. If so, the process flow loops back to step 620 to select the next scan direction (i.e., the reverse scan direction). From there, the process flow proceeds through steps 608, 622, 624, 626, and 628 until all of the unscheduled shot angles for the selected elevation have been scheduled and added to shot list 660. Once step 628 results in a determination that all of the shot angles at the selected elevation have been scheduled, the process flow can loop back to step 604 to select the next elevation from pool 650 for shot angle scheduling. As noted above, this selection can proceed in accordance with a defined prioritization of elevations, and the control circuit 106 can perform steps 606, 620, 608, 622, 624, 626, 628, and 614 for the shot angles at the newly selected elevation.

Thus, it can be understood that the process flow of FIG. 6B will seek to schedule all of the shot angles for a given elevation during a single scan of mirror 110 (from left-to-right or right-to-left as the case may be) if possible in view of the laser energy model 108. However, should the laser energy model 108 indicate that more time is needed to fire shots at the desired shot angles, then some of the shot angles may be scheduled for the return scan (or subsequent scan) of mirror 110. It should also be understood that the control circuit 106 will always be listening for new range points to be targeted with new laser pulses 122. As such, steps 600 and 602 can be performed while steps 604-614 are being performed (for FIG. 6A) or while steps 604, 606, 620, 608, 622, 624, 626, 628, and 614 are being performed (for FIG. 6B). Similarly, step 614 can be performed by the control circuit 106 while the other steps of the FIGS. 6A and 6B process flows are being performed. Furthermore, it should be understood that the process flows of FIGS. 6A and 6B can accommodate high priority requests for range point targeting. For example, as described in U.S. Pat. No. 10,495,757, the entire disclosure of which is incorporated herein by reference, a request may be received to target a set of range points in a high priority manner. Thus, the control circuit 106 can also always be listening for such high priority requests and then cause the process flow to quickly begin scheduling the firing of laser pulses toward such range points. In a circumstance where a high priority targeting request causes the control circuit 106 to interrupt its previous shot scheduling, the control circuit 106 can effectively pause the current shot schedule, schedule the new high priority shots (using the same scheduling techniques) and then return to the previous shot schedule once laser pulses 122 have been fired at the high priority targets.

Accordingly, as the process flows of FIGS. 6A and 6B work their way through the list of range points in pool 650, the control circuit 106 will provide improved scheduling of laser pulses 122 fired at those range points through use of the laser energy model 108 and mirror motion model 308 as compared to defined criteria such as shot energy thresholds for those shots. Moreover, by modeling laser energy and mirror motion over short time intervals on the order of nanoseconds using transient models as discussed above, these shot scheduling capabilities of the system can be characterized as hyper temporal because highly precise shots with highly precise energy amounts can be accurately scheduled over short time intervals if necessary.

While FIGS. 6A and 6B show their process flows as an iterated sequence of steps, it should be understood that if the control circuit 106 has sufficient parallelized logic resources, then many of the iterations can be unrolled and performed in parallel without the need for return loops (or using a few number of returns through the steps). For example, different windows of shot angles at the selected elevation can be processed in parallel with each other if the control circuit 106 has sufficient parallelized logic capacity. Similarly, the control circuit 106 can also work on scheduling for different elevations at the same time if it has sufficient parallelized logic capacity.

Figures 7A, 7B:
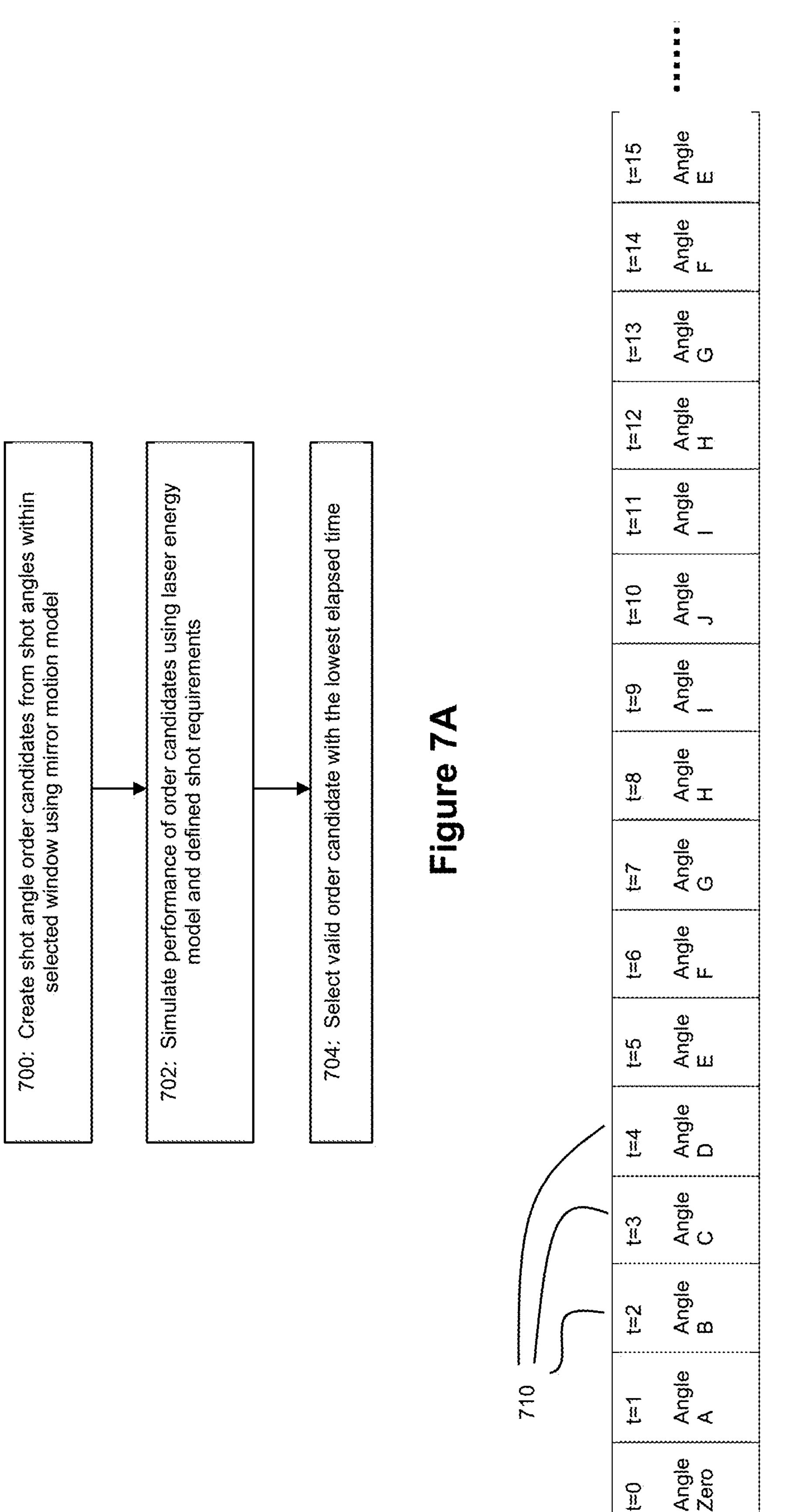
FIG. 7A depicts an example process flow for simulating and evaluating different shot ordering candidates based on the laser energy model and the mirror motion model.
FIG. 7B depicts an example of how time slots in a mirror scan can be related to the shot angles for the mirror using the mirror motion model.

FIG. 7A shows an example process flow for carrying out step 610 of FIG. 6A. At step 700, the control circuit 106 creates shot angle order candidates from the shot angles that are within the window selected at step 608. These candidates can be created based on the mirror motion model 308.

For example, as shown by FIG. 7B, the times at which the mirror 110 will target the different potential shot angles can be predicted using the mirror motion model 308. Thus, each shot angle can be assigned a time slot 710 with respect to the scan of mirror 110 across azimuth angles (and back). As shown by FIG. 7B, if mirror 110 starts at Angle Zero at Time 1, it will then scan to Angle A at Time 2, then scan to Angle B at Time 3, and so on through its full range of angles (which in the example of FIG. 7B reaches Angle J before the mirror 110 begins scanning back toward Angle Zero). The time slots for these different angles can be computed using the mirror motion model 308. Thus, if the window of shot angles identifies Angle A, Angle C, and Angle I as the shot angles, then the control circuit 106 will know which time slots of the mirror scan for mirror 110 will target those shot angles. For example, according to FIG. 7B, Time Slots 1, 3, and 9 will target Angles A, C, and I. On the return scan, Time Slot 11 will also target Angle I (as shown by FIG. 7B), while Time Slots 17 and 19 will also target Angles C and A respectively. As example embodiments, the time slots 710 can correspond to time intervals in a range between around 5 nanoseconds and around 50 nanoseconds, which would correspond to angular intervals of around 0.01 to 0.1 degrees if mirror 110 is scanning at 12 kHz over an angular extent of 64 degrees (where +/−A is +/−16 degrees).

To create the order candidates at step 700, the control circuit 106 can generate different permutations of time slot sequences for different orders of the shot angles in the selected window. Continuing with an example where the shot angles are A, C, and I, step 700 can produce the following set of example order candidates (where each order candidate can be represented by a time slot sequence):

| Order Candidate | Time Slot Sequence | Comments |
|---|---|---|
| Candidate 1 | 1, 3, 9 | This would correspond to firing laser pulses in the shot angle order of ACI during the first scan for mirror 110 (which moves from left-to-right) |
| Candidate 2 | 1, 9, 17 | This would correspond to firing laser pulses in the shot angle order of AIC, where laser pulses are fired at Shot Angles A and I during the first scan for mirror 110 and where the laser pulse is fired at Shot Angle C during the second (return) scan for mirror 110 (where this second scan moves from right-to-left). |
| Candidate 3 | 3, 9, 19 | This would correspond to firing laser pulses in the shot angle order of CIA, where laser pulses are fired at Shot Angles C and I during the first scan for mirror 110 and where the laser pulse is fired at Shot Angle A during the second (return) scan for mirror 110. |
| Candidate 4 | 3, 9, 21 | This would correspond to firing laser pulses in the shot angle order of CIA, where laser pulses are fired at Shot Angles C and I during the first scan for mirror 110 and where the laser pulse is fired at Shot Angle A during the third scan for mirror 110 (which moves from left-to-right) |
| . . . | . . . | . . . |

It should be understood that the control circuit 106 could create additional candidate orderings from different permutations of time slot sequences for Shot Angles A, C, and I. A practitioner can choose to control how many of such candidates will be considered by the control circuit 106.

At step 702, the control circuit 106 simulates the performance of the different order candidates using the laser energy model 108 and the defined shot requirements. As discussed above, these shot requirements may include requirements such as minimum energy thresholds for each laser pulse (which may be different for each shot angle), maximum energy thresholds for each laser pulse (or for the laser source), and/or desired energy levels for each laser pulse (which may be different for each shot angle).

Figure 7C:
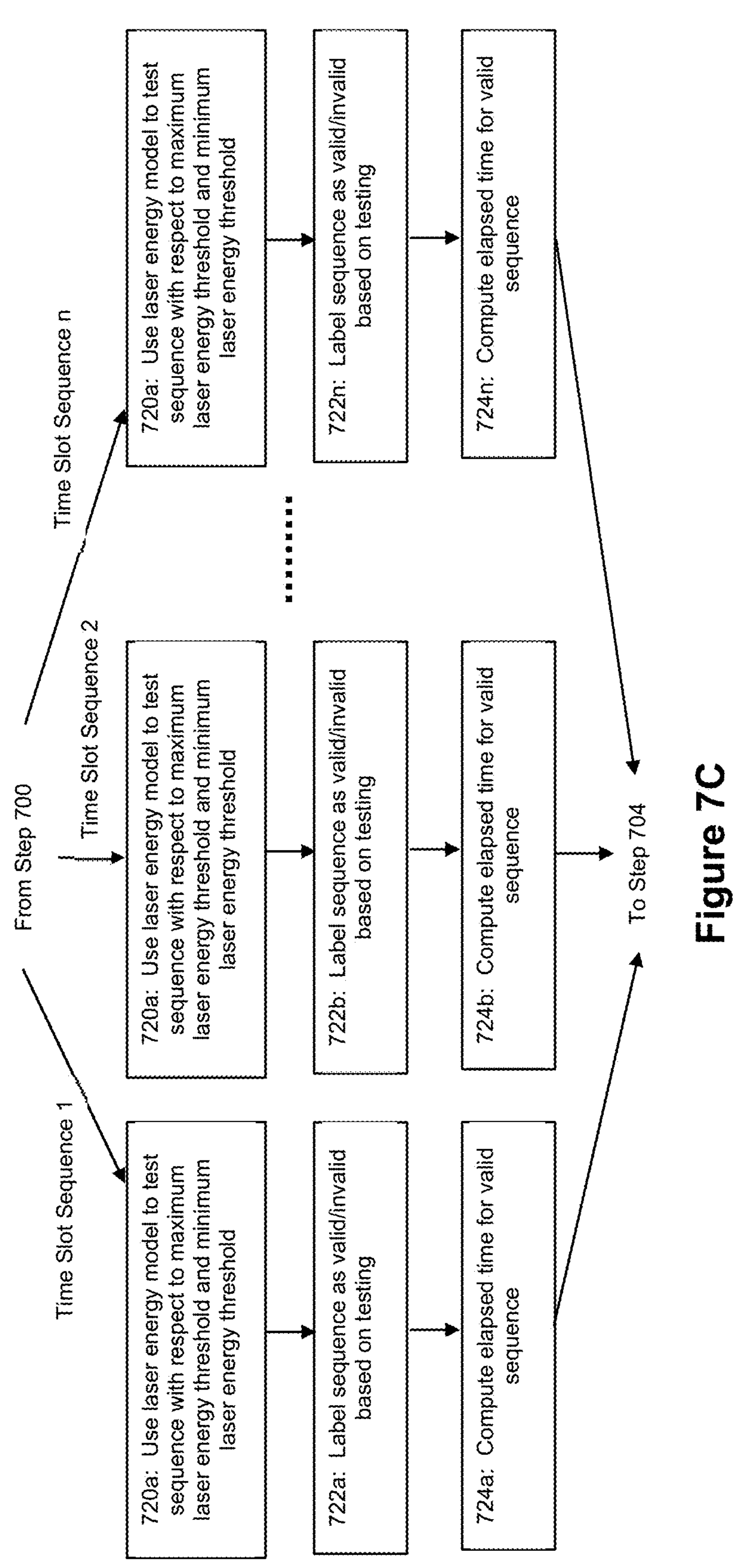
FIG. 7C depicts an example process flow for simulating different shot ordering candidates based on the laser energy model.

To reduce computational latency, this simulation and comparison with shot requirements can be performed in parallel for a plurality of the different order candidates using parallelized logic resources of the control circuit 106. An example of such parallelized implementation of step 702 is shown by FIG. 7C. In the example of FIG. 7C, steps 720, 722, and 724 are performed in parallel with respect to a plurality of the different time slot sequences that serve as the order candidates. Thus, steps 720*a*, 722*a*, and 724*a* are performed for Time Slot Sequence 1; steps 720*b*, 722*b*, and 724*b* are performed for Time Slot Sequence 2; and so on through steps 720*n*, 722*n*, and 724*n* for Time Slot Sequence n.

At step 720, the control circuit 106 uses the laser energy model 108 to predict the energy characteristics of the laser source and resultant laser pulse if laser pulse shots are fired at the time slots corresponding to the subject time slot sequence. These modeled energies can then be compared to criteria such as a maximum laser energy threshold and a minimum laser energy threshold to determine if the time slot sequence would be a valid sequence in view of the system requirements. At step 722, the control circuit 106 can label each tested time slot sequence as valid or invalid based on this comparison between the modeled energy levels and the defined energy requirements. At step 724, the control circuit 106 can compute the elapsed time that would be needed to fire all of the laser pulses for each valid time slot sequence. For example, Candidate 1 from the example above would have an elapsed time duration of 9 units of time, while Candidate 2 from the example above would have an elapsed time duration of 17 units of time.

FIGS. 7D, 7E, and 7F show examples of such simulations of time slot sequences for our example where the shot angles to be scheduled with laser pulses are Shot Angles A, C, and I. In this scenario, we will assume that the laser energy model 108 will employ (1) the value for $E_S$ as a constant value of 1 unit of energy per unit of time and (2) the values for a and b as 0.5 each. Furthermore, we will assume that there are 3 units of energy left in the fiber laser 116 when the scan begins (and where the scan begins at Angle Zero while moving from left-to-right). Moreover, for the purposes of this example, the energy requirements for the shots can be defined as (8,3,4) for minimum shot energies with respect to shot angles A, C, and I respectively, and where the maximum laser energy for the laser source can be defined as 20 units of combined seed and stored fiber energy (which would translate to a maximum laser pulse energy of 10 units of energy).

FIG. 7D shows an example result for simulating the time slot sequence of laser pulses at time slots 1, 3, and 9. In this example, it can be seen that this time slot sequence is invalid because the shot energy for Time Slot 1 (targeting Shot Angle A) is only 2 units of energy, which is below the minimum energy threshold of 8 units for Shot Angle A. This time slot sequence also fails because the shot energy for Time Slot 3 (targeting Shot Angle C) is only 2 units of energy, which is below the minimum energy threshold of 3 units for Shot Angle C.

FIG. 7E shows an example result for simulating the time slot sequence of laser pulses at time slots 1, 9, and 17. In this example, it can be seen that this time slot sequence is invalid because the shot energy for Time Slot 1 (targeting Shot Angle A) is too low.

FIG. 7F shows an example result for simulating the time slot sequence of laser pulses at time slots 3, 9, and 21. In this example, it can be seen that this time slot sequence is valid because the shot energies for each time slot are at or above the minimum energy thresholds for their corresponding shot angles (and none of the time slots would violate the maximum energy threshold for the laser source). It can be further surmised from FIG. 7F that a simulation of a Time Slot Sequence of (3,9,19) also would have failed because there is insufficient energy in a laser pulse that would have been fired at Shot Angle A.

Accordingly, the simulation of these time slot sequences would result in a determination that the time slot sequence of (3,9,21) is a valid candidate, which means that this time slot sequence can define the timing schedule for laser pulses fired toward the shot angles in the selected window. The elapsed time for this valid candidate is 21 units of time.

Returning to FIG. 7A, at step 704, the control circuit 106 selects the valid order candidate which has the lowest elapsed time. Thus, in a scenario where the simulations at step 702 would have produced two or more valid order candidates, the control circuit 106 will select the order candidate that will complete its firing of laser pulses the soonest which helps improve the latency of the system.

For example embodiments, the latency with which the control circuit 106 is able to determine the shot angle order and generate appropriate firing commands is an important operational characteristic for the lidar transmitter 100. To maintain high frame rates, it is desirable for the control circuit 106 to carry out the scheduling operations for all of the shot angles at a selected elevation in the amount of time it takes to scan mirror 110 through a full left-to-right or right-to-left scan if feasible in view of the laser energy model 108 (where this time amount is around 40 microseconds for a 12 kHz scan frequency). Moreover, it is also desirable for the control circuit 106 to be able to schedule shots for a target that is detected based on returns from shots on the current scan line during the next return scan (e.g., when a laser pulse 122 fired during the current scan detects something of interest that is to be interrogated with additional shots (see FIG. 16 discussed above)). In this circumstance, the detection path for a pulse return through a lidar receiver and into a lidar point cloud generator where the target of interest is detected will also need to be taken into account. This portion of the processing is expected to require around 0.4 to 10 microseconds, which leaves around 30 microseconds for the control circuit 106 to schedule the new shots at the region of interest during the next return scan if possible. For a processor of the control circuit 106 which has 2G flops of processing per second (which is a value available from numerous FPGA and ASIC vendors), this amounts to 50 operations per update, which is sufficient for the operations described herein. For example, the control circuit 106 can maintain lookup tables (LUTs) that contain pre-computed values of shot energies for different time slots within the scan. Thus, the simulations of step 702 can be driven by looking up precomputed shot energy values for the defined shot angles/time slots. The use of parallelized logic by the control circuit 106 to accelerate the simulations helps contribute to the achievement of such low latency. Furthermore, practitioners can adjust operational parameters such as the window size (search depth) in a manner to achieve desired latency targets.

Figure 8:
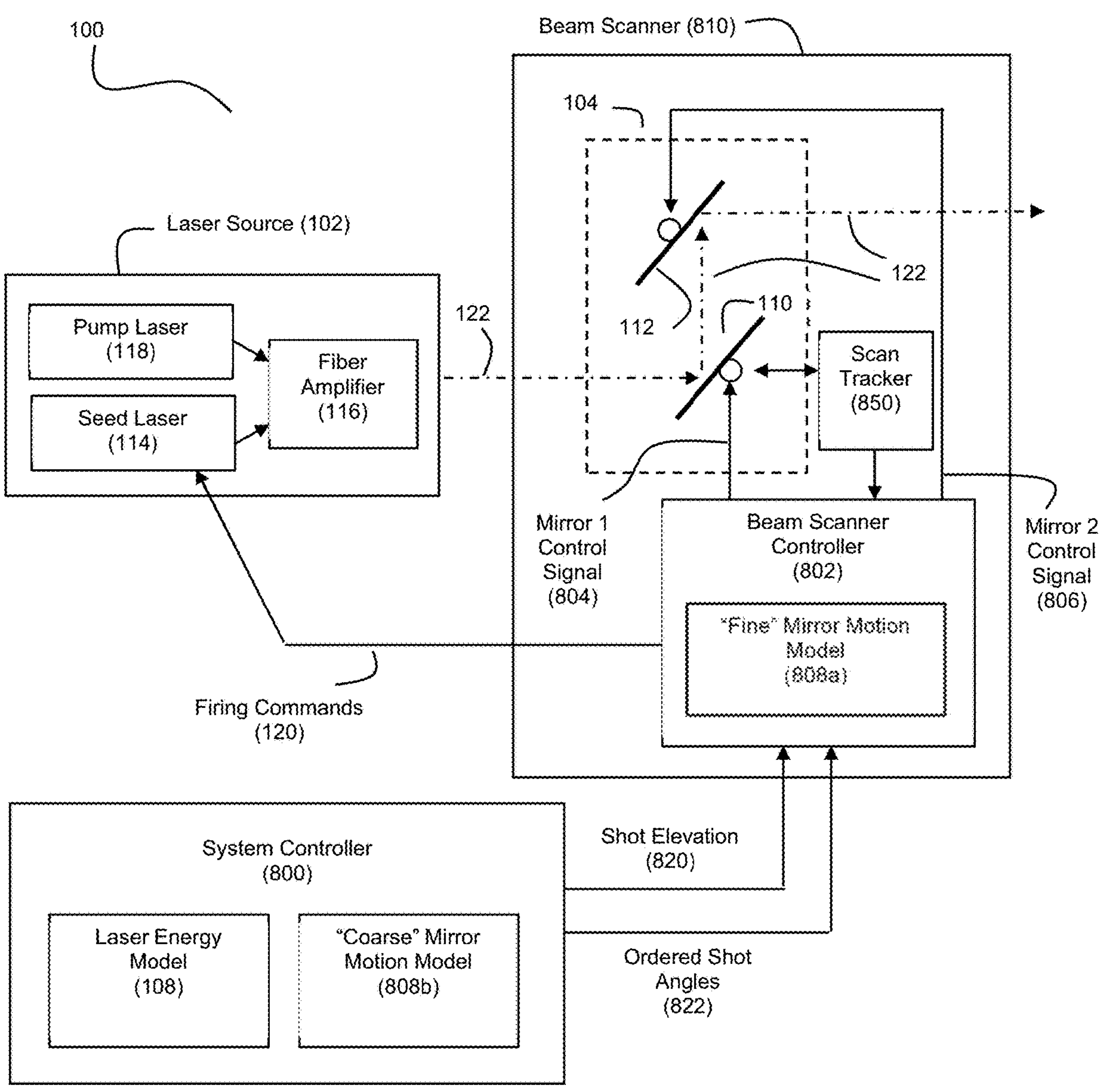
FIG. 8 depicts an example lidar transmitter that uses a laser energy model and a mirror motion model to schedule laser pulses, where the control circuit includes a system controller and a beam scanner controller.

FIG. 8 shows an example embodiment for the lidar transmitter 100 where the control circuit 106 comprises a system controller 800 and a beam scanner controller 802. System controller 800 and beam scanner controller 802 can each include a processor and memory for use in carrying out its tasks. The mirror subsystem 104 can be part of beam scanner 810 (which can also be referred to as a lidar scanner). Beam scanner controller 802 can be embedded as part of the beam scanner 810. In this example, the system controller 800 can carry out steps 600, 602, 604, 608, 610, and 612 of FIG. 6A if the control circuit 106 employs the FIG. 6A process flow (or steps 600, 602, 604, 620, 608, 622, 624, 626, and 628 of FIG. 6B if the control circuit 106 employs the FIG. 6B process flow), while beam scanner controller 802 carries out steps 606 and 614 for the FIGS. 6A and 6B process flows. Accordingly, once the system controller 800 has selected the elevation and the order of shot angles, this information can be communicated from the system controller 800 to the beam scanner controller 802 as shot elevation 820 and ordered shot angles 822.

The ordered shot angles 822 can also include flags that indicate the scan direction for which the shot is to be taken at each shot angle. This scan direction flag will also allow the system to recognize scenarios where the energy model indicates there is a need to pass by a time slot for a shot angle without firing a shot and then firing the shot when the scan returns to that shot angle in a subsequent time slot. For example, with reference to the example above, the scan direction flag will permit the system to distinguish between Candidate 3 (for the sequence of shot angles CIA at time slots 3, 9, and 19) versus Candidate 4 (for the same sequence of shot angles CIA but at time slots 3, 9, and 21). A practitioner can explicitly assign a scan direction to each ordered shot angle by adding the scan direction flag to each ordered shot angle if desired, or a practitioner indirectly assign a scan direction to each ordered shot angle by adding the scan direction flag to the ordered shot angles for which there is a change in scan direction. Together, the shot elevations 802 and order shot angles 822 serve as portions of the shot list 660 used by the lidar transmitter 100 to target range points with laser pulses 122.

The beam scanner controller 802 can generate control signal 806 for mirror 112 based on the defined shot elevation 820 to drive mirror 112 to a scan angle that targets the elevation defined by 820. Meanwhile, the control signal 804 for mirror 110 will continue to be the sinusoidal signal that drives mirror 110 in a resonant mode. However, some practitioners may choose to also vary control signal 804 as a function of the ordered shot angles 822 (e.g., by varying amplitude A as discussed above).

In the example of FIG. 8, the mirror motion model 308 can comprise a first mirror motion model 808*a* maintained and used by the beam scanner controller 802 and a second mirror motion model 808*b* maintained and used by the system controller 800. With FIG. 8, the task of generating the firing commands 120 can be performed by the beam scanner controller 802. The beam scanner controller 810 can include a feedback system 850 that tracks the actual mirror tilt angles θ for mirror 110. This feedback system 850 permits the beam scanner controller 802 to closely monitor the actual tilt angles of mirror 110 over time which then translates to the actual scan angles of mirror 110. This knowledge can then be used to adjust and update mirror motion model 808*a* maintained by the beam scanner controller 802. Because model 808*a* will closely match the actual scan angles for mirror 110 due to the feedback from 850, we can refer to model 808*a* as the "fine" mirror motion model 808*a*. In this fashion, when the beam scanner controller 802 is notified of the ordered shot angles 822 to be targeted with laser pulses 122, the beam scanner controller 802 can use this "fine" mirror motion model 808*a* to determine when the mirror has hit the time slots which target the ordered shot angles 822. When these time slots are hit according to the "fine" mirror motion model 808*a*, the beam scanner controller 802 can generate and provide corresponding firing commands 120 to the laser source 102.

Examples of techniques that can be used for the scan tracking feedback system 850 are described in the above-referenced and incorporated U.S. Pat. No. 10,078,133. For example, the feedback system 850 can employ optical feedback techniques or capacitive feedback techniques to monitor and adjust the scanning (and modeling) of mirror 110. Based on information from the feedback system 850, the beam scanner controller 802 can determine how the actual mirror scan angles may differ from the modeled mirror scan angles in terms of frequency, phase, and/or maximum amplitude. Accordingly, the beam scanner controller 802 can then incorporate one or more offsets or other adjustments relating the detected errors in frequency, phase, and/or maximum amplitude into the mirror motion model 808*a* so that model 808*a* more closely reflects reality. This allows the beam scanner controller 802 to generate firing commands 120 for the laser source 102 that closely match up with the actual shot angles to be targeted with the laser pulses 122.

Errors in frequency and maximum amplitude within the mirror motion model 808*a* can be readily derived from the tracked actual values for the tilt angle θ as the maximum amplitude A should be the maximum actual value for 0, and the actual frequency is measurable based on tracking the time it takes to progress from actual values for A to −A and back.

Phased locked loops (or techniques such as PID control, both available as software tools in MATLAB) can be used to track and adjust the phase of the model 808*a* as appropriate. The expression for the tilt angle θ that includes a phase component (p) can be given as:

$$\theta = A\cos(2\pi f t + p)$$

From this, we can recover the value for the phase p by the relation:

$$\theta \approx A\cos(2\pi f t) - A\sin(2\pi f t)p$$

Solving for p, this yields the expression:

$$p = \frac{A\cos(2\pi f t) - \theta}{A\sin(2\pi f t)}$$

Given that the tracked values for A, f, t, and θ are each known, the value for p can be readily computed. It should be understood that this expression for p assumes that the value of the p is small, which will be an accurate assumption if the actual values for A, f, t, and θ are updated frequently and the phase is also updated frequently. This computed value of p can then be used by the "fine" mirror motion model 808*a* to closely track the actual shot angles for mirror 110, and identify the time slots that correspond to those shot angles according to the expression:

$$t = \frac{\arccos\left(\frac{\mu - \varphi}{2A}\right) - p}{2\pi f}$$

While a practitioner will find it desirable for the beam scanner controller 802 to rely on the highly accurate "fine" mirror motion model 808*a* when deciding when the firing commands 120 are to be generated, the practitioner may also find that the shot scheduling operations can suffice with less accurate mirror motion modeling. Accordingly, the system controller 800 can maintain its own model 808*b*, and this model 808*b* can be less accurate than model 808*a* as small inaccuracies in the model 808*b* will not materially affect the energy modeling used to decide on the ordered shot angles 822. In this regard, model 808*b* can be referred to as a "coarse" mirror motion model 808*b*. If desired, a practitioner can further communicate feedback from the beam scanner controller 802 to the system controller 800 so the system controller 800 can also adjusts its model 808*b* to reflect the updates made to model 808*a*. In such a circumstance, the practitioner can also decide on how frequently the system will pass these updates from model 808*a* to model 808*b*.

Figure 9:
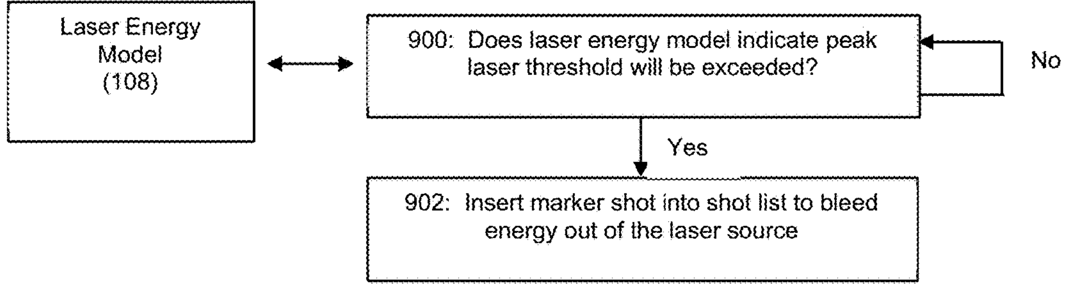
FIG. 9 depicts an example process flow for inserting marker shots into a shot list.

Marker Shots to Bleed Off and/or Regulate Shot Energy:

FIG. 9 depicts an example process flow for execution by the control circuit 106 to insert marker shots into the shot list in order to bleed off energy from the laser source 102 when needed. As discussed above, the control circuit 106 can consult the laser energy model 108 as applied to the range points to be targeted with laser pulses 122 to determine whether a laser energy threshold would be violated. If so, the control circuit 106 may insert a marker shot into the shot list to bleed energy out of the laser source 102 (step 902). In an example embodiment, this threshold can be set to define a maximum or peak laser energy threshold so as to avoid damage to the laser source 102. In another example embodiment, this threshold can be set to achieve a desired consistency, smoothness, and/or balance in the energies of the laser pulse shots. For example, the marker shot can be fired to bleed off energy so that a later targeted laser pulse shot (or set of shots) exhibits a desired amount of energy.

For example, one or more marker shots can be fired to bleed off energy so that a later targeted laser pulse shot (or set of targeted shots) exhibits a desired amount of energy. As an example embodiment, the marker shots can be used to bleed off energy so that the targeted laser pulse shots exhibit consistent energy levels despite a variable rate of firing for the targeted laser pulse shots (e.g., so that the targeted laser pulse shots will exhibit X units of energy (plus or minus some tolerance) even if those targeted laser pulse shots are irregularly spaced in time). The control circuit 106 can consult the laser energy model 108 to determine when such marker shots should be fired to regulate the targeted laser pulse shots in this manner.

Figure 10:
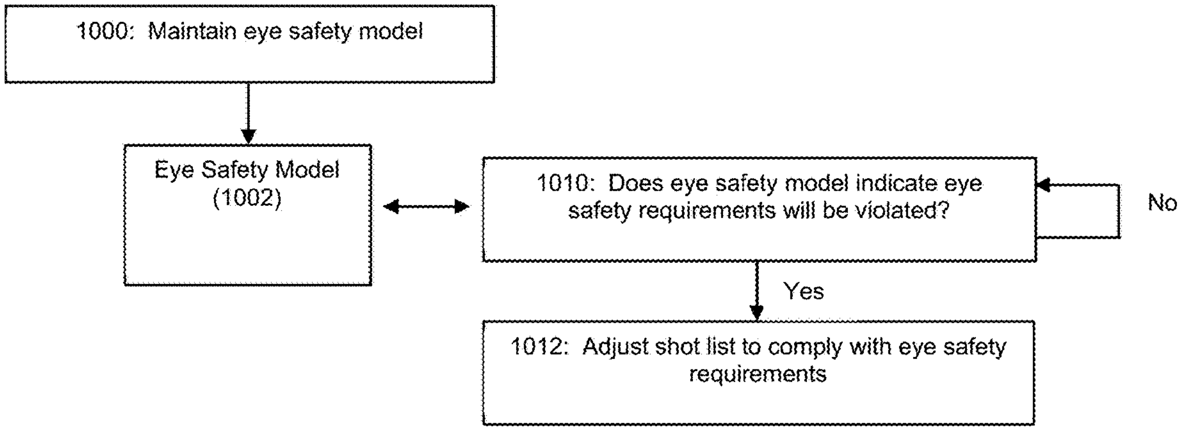
FIG. 10 depicts an example process flow for using an eye safety model to adjust a shot list.

Modeling Eye and Camera Safety Over Time:

FIG. 10 depicts an example process flow for execution by the control circuit 106 where eye safety requirements are also used to define or adjust the shot list. To support these operations, the control circuit 106 can also, at step 1000, maintain an eye safety model 1002. Eye safety requirements for a lidar transmitter 100 may be established to define a maximum amount of energy that can be delivered within a defined spatial area in the field of view over a defined time period. Since the system is able to model per pulse laser energy with respect to precisely targeted range points over highly granular time periods, this allows the control circuit 106 to also monitor whether a shot list portion would violate eye safety requirements. Thus, the eye safety model 1002 can model how much aggregated laser energy is delivered to the defined spatial area over the defined time period based on the modeling produced from the laser energy model 108 and the mirror motion model 308. At step 1010, the control circuit 106 uses the eye safety model 1002 to determine whether the modeled laser energy that would result from a simulated sequence of shots would violate the eye safety requirements. If so, the control circuit can adjust the shot list to comply with the eye safety requirements (e.g., by inserting longer delays between ordered shots delivered close in space, by re-ordering the shots, etc.)

Figure 11:
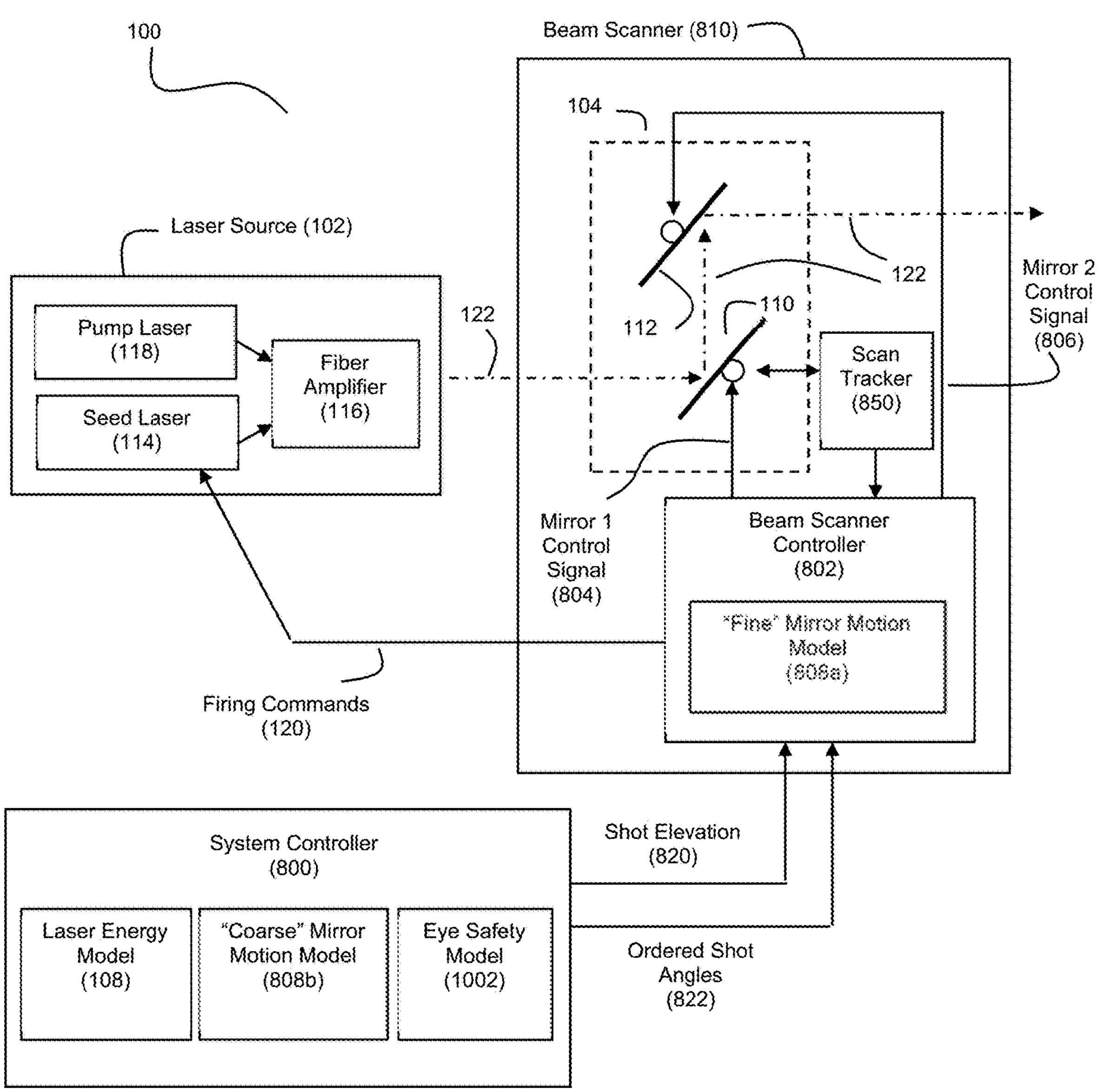
FIG. 11 depicts an example lidar transmitter that uses a laser energy model, a mirror motion model, and an eye safety model to schedule laser pulses.
Figure 12:
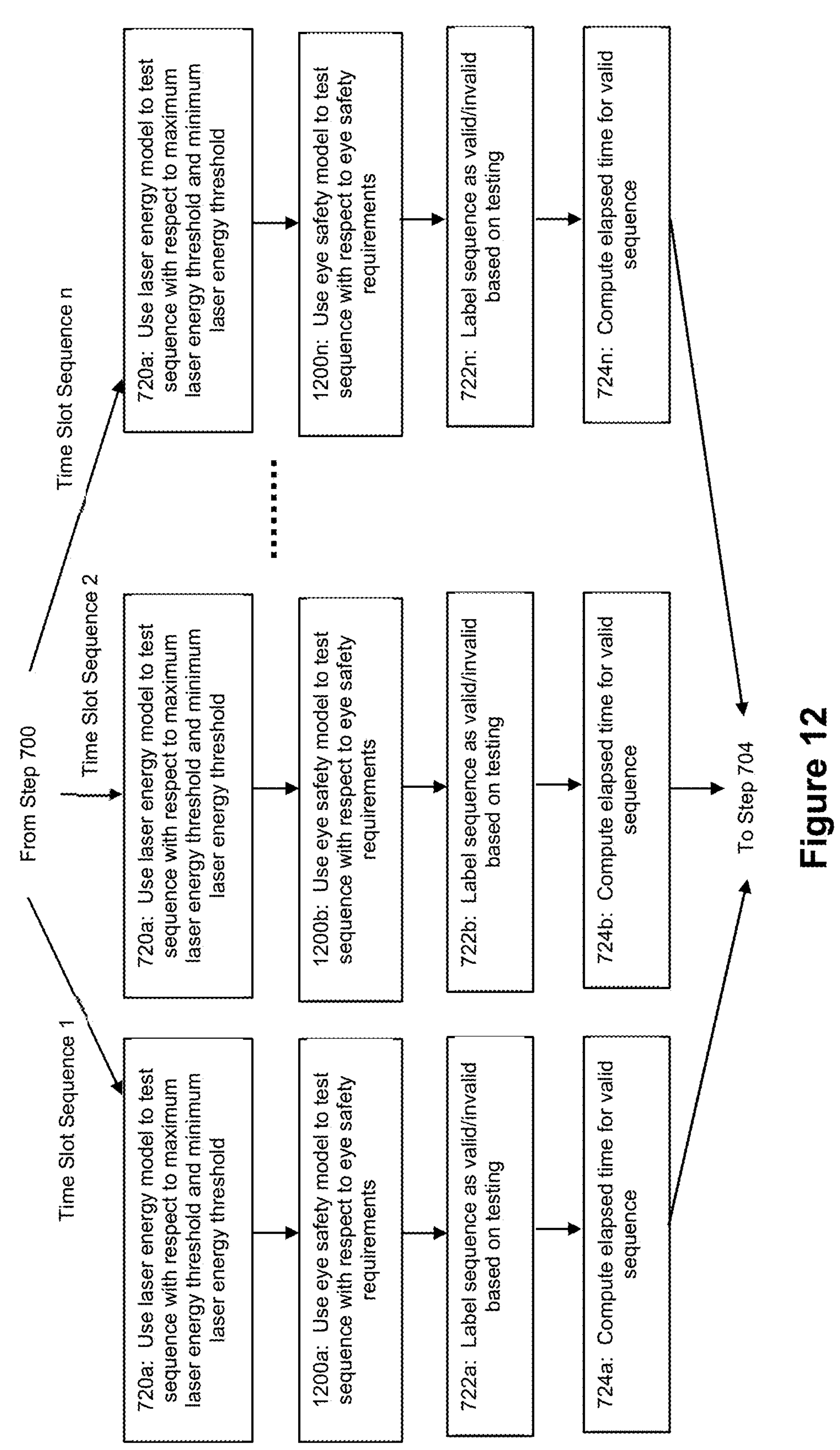
FIG. 12 depicts an example process flow for simulating different shot ordering candidates based on the laser energy model and eye safety model.

FIG. 11 shows an example lidar transmitter 100 that is similar in nature to the example of FIG. 8, but where the system controller 800 also considers the eye safety model 1002 when deciding on how to order the shot angles. FIG. 12 shows how the simulation step 702 from FIG. 7A can be performed in example embodiments where the eye safety model 1002 is used. As shown by FIG. 12, each parallel path can include steps 720, 722, and 724 as discussed above. Each parallel path can also include a step 1200 to be performed prior to step 722 where the control circuit 106 uses the eye safety model 1002 to test whether the modeled laser energy for the subject time slot sequence would violate eye safety requirements. If the subject time slot sequence complies with the criteria tested at steps 720 and 1200, then the subject time slot sequence can be labeled as valid. If the subject time slot sequence violates the criteria tested at steps 720 or 1200, then the subject time slot sequence can be labeled as invalid.

Similar to the techniques described for eye safety in connection with Figured 10, 11, and 12, it should be understood that a practitioner can also use the control circuit to model and evaluate whether time slot sequences would violate defined camera safety requirements. To reduce the risk of laser pulses 122 impacting on and damaging cameras in the field of view, the control circuit can also employ a camera safety model in a similar manner and toward similar ends as the eye safety model 1002. In the camera safety scenario, the control circuit 106 can respond to detections of objects classified as cameras in the field of view by monitoring how much aggregated laser energy will impact that camera object over time. If the model indicates that the camera object would have too much laser energy incident on it in too short of a time period, the control circuit can adjust the shot list as appropriate.

Moreover, as noted above with respect to the laser energy model 108 and the mirror motion model 308, the eye safety and camera safety models can track aggregated energy delivered to defined spatial areas over defined time periods over short time intervals, and such short interval eye safety and camera safety models can be referred to as transient eye safety and camera safety models.

Additional Example Embodiments

Figure 13:
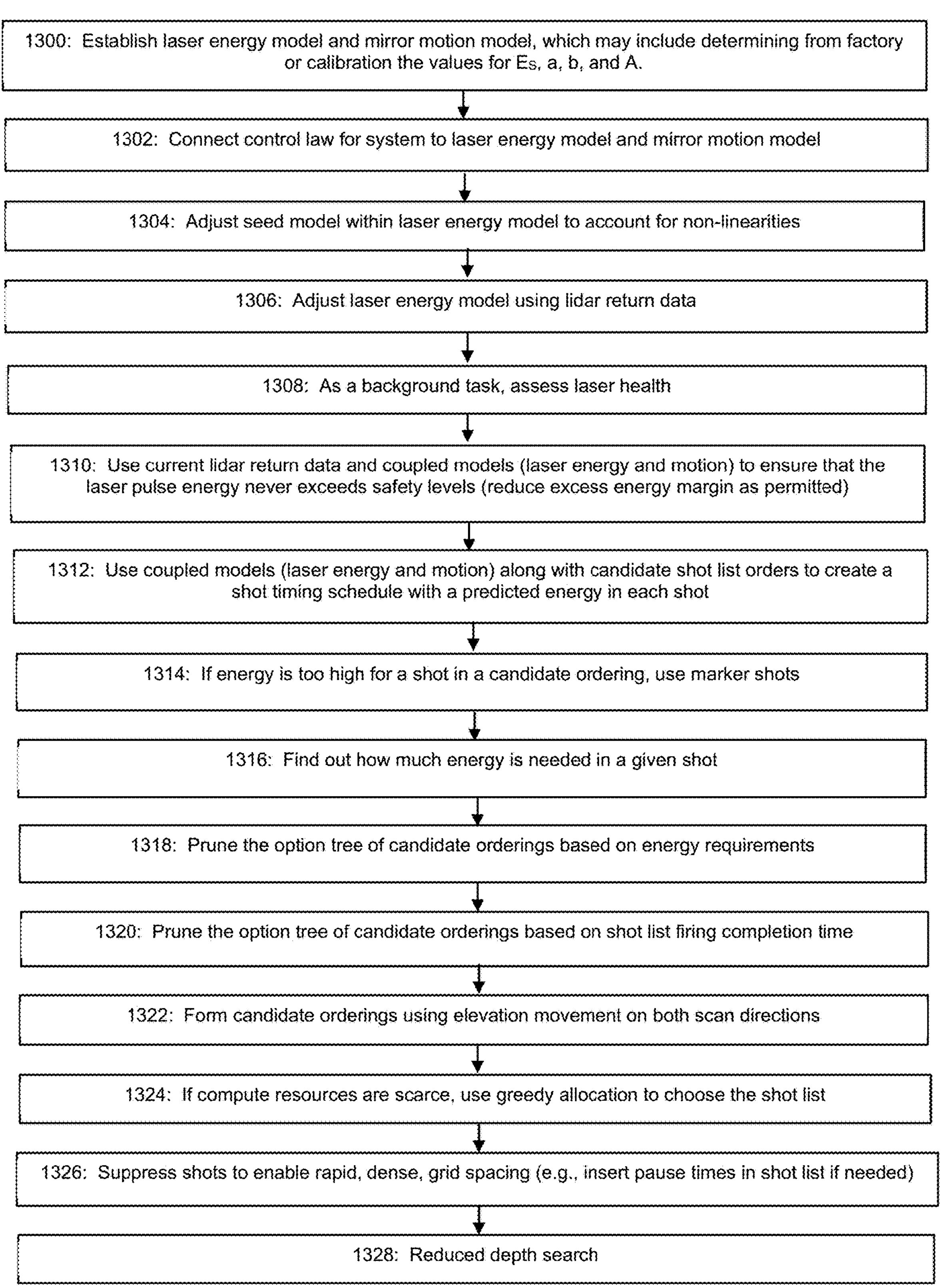
FIG. 13 depicts another example process for determining shot schedules using the models.

FIG. 13 shows another example of a process flow for the control circuit 106 with respect to using the models to dynamically determine the shot list for the transmitter 100.

At step 1300, the laser energy model 108 and mirror motion model 308 are established. This can include determining from factory or calibration the values to be used in the models for parameters such as $E_P$, a, b, and A. Step 1300 can also include establishing the eye safety model 1002 by defining values for parameters that govern such a model (e.g. parameters indicative of limits for aggregated energy for a defined spatial area over a defined time period). At step 1302, the control law for the system is connected to the models established at step 1300.

At step 1304, the seed energy model used by the laser energy model 108 is adjusted to account for nonlinearities. This can employ the clipped, offset (affine) model for seed energy as discussed above.

At step 1306, the laser energy model 108 can be updated based on lidar return data and other feedback from the system. For example, as noted above in connection with FIG. 2D, the actual energies in laser pulses 122 can be derived from the pulse return data included in point cloud 256. For example, the pulse return energy can be modeled as a function of the transmitted pulse energy according to the following expression (for returns from objects that are equal to or exceed the laser spot size and assuming modest atmospheric attenuation):

$$\text{Pulse Return Energy} = \left(\frac{PEAperture_{Receiver}}{\pi R^2}\right)\text{Reflectivity}$$

In this expression, Pulse Return Energy represents the energy of the pulse return (which is known from the point cloud 256), PE represents the unknown energy of the transmitted laser pulse 122, $\text{Aperture}_{Receiver}$ represents the known aperture of the lidar receiver (see 1400 in FIG. 14), R represents the measured range for the return (which is known from the point cloud 256), and Reflectivity represents the percentage of reflectivity for the object from which the return was received. Therefore, one can solve for PE so long as the reflectivity is known. This will be the case for objects like road signs whose reflectivity is governed by regulatory agencies. Accordingly, by using returns from known fiducials such as road signs, the control circuit 106 can derive the actual energy of the transmitted laser pulse 122 and use this value to facilitate determinations as to whether any adjustments to the laser energy model 108 are needed (e.g., see discussions above re updating the values for a and b based on PE values which represent the actual energies of the transmitted laser pulses 122).

Also, at step 1308, the laser health can be assessed and monitored as a background task. The information derived from the feedback received for steps 1306 and 1308 can be used to update model parameters as discussed above. For example, as noted above, the values for the seed energy model parameters as well as the values for a and b can be updated by measuring the energy produced by the laser source 102 and fitting the data to the parameters. Techniques which can be used for this process include least squares, sample matrix inversion, regression, and multiple exponential extensions. Further still, as noted above, the amount of error can be reduced by using known targets with a given reflectivity and using these to calibrate the system. This is helpful because the reflectivity of a quantity that is known, i.e. a fiducial, allows one to explicitly extract shot energy (after backing out range dependencies and any obliquity). Examples of fiducials that may be employed include road signs and license plates.

At step 1310, the lidar return data and the coupled models can be used to ensure that the laser pulse energy does not exceed safety levels. These safety levels can include eye safety as well as camera safety as discussed above. Without step 1310, the system may need to employ a much more stringent energy requirement using trial and error to establish laser settings to ensure safety. For example if we only had a laser model where the shot energy is accurate to only ±3J per shot around the predicted shot, and maximum shot energy is limited to 8, we could not use any shots predicted to exceed 5. However, the hyper temporal modeling and control that is available from the laser energy model 108 and mirror motion model 308 as discussed herein allows us to obtain accurate predictions within a few percent error, virtually erasing the operational lidar impact of margin.

At step 1312, the coupled models are used with different orderings of shots, thereby obtaining a predicted shot energy in any chosen ordered sequence of shots drawn from the specified list of range points. Step 1312 may employ simulations to predict shot energies for different time slots of shots as discussed above.

At step 1314, the system inserts marker shots in the timing schedule if the models predict that too much energy will build up in the laser source 102 for a given shot sequence. This reduces the risk of too much energy being transferred into the fiber laser 116 and causing damage to the fiber laser 116.

At step 1316, the system determines the shot energy that is needed to detect targets with each shot. These values can be specified as a minimum energy threshold for each shot. The value for such threshold(s) can be determined from radiometric modeling of the lidar, and the assumed range and reflectivity of a candidate target. In general, this step can be a combination of modeling assumptions as well as measurements. For example, we may have already detected a target, so the system may already know the range (within some tolerance). Since the energy required for detection is expected to vary as the square of the range, this knowledge would permit the system to establish the minimum pulse energy thresholds so that there will be sufficient energy in the shots to detect the targets.

Steps 1318 and 1320 operate to prune the candidate ordering options based on the energy requirements (e.g., minimum energy thresholds per shot) (for step 1318) and shot list firing completion times (to favor valid candidate orderings with faster completion times) (for step 1320).

At step 1322, candidate orderings are formed using elevation movements on both scan directions. This allows the system to consider taking shots on both a left-to-right scan and a right-to-left scan. For example, suppose that the range point list has been completed on a certain elevation, when the mirror is close to the left hand side. Then it is faster to move the elevation mirror at that point in time and begin the fresh window of range points to be scheduled beginning on this same left hand side and moving right. Conversely, if we deplete the range point list when the mirror is closer to the right hand side it is faster to move the mirror in elevation whilst it is on the right hand side. Moreover, in choosing an order from among the order candidates, and when moving from one elevation to another, movement on either side of the mirror motion, the system may move to a new elevation when mirror 110 is at one of its scan extremes (full left or full right). However, in instances where a benefit may arise from changing elevations when mirror 110 is not at one of its scan extremes, the system may implement interline skipping as described in the above-referenced and incorporated U.S. Pat. No. 10,078,133. The mirror motion model

308 can also be adjusted to accommodate potential elevation shift during a horizontal scan.

At step 1324, if processing time allows the control circuit 106 to implement auctioning (whereby multiple order candidates are investigated, the lowest "cost" (e.g., fastest lidar execution time) order candidate is selected by the control circuit 106 (acting as "auctioneer"). A practitioner may not want the control circuit to consider all of the possible order candidates as this may be too computationally expensive and introduce an undue amount of latency. Thus, the control circuit 106 can enforce maximums or other controls on how many order candidates are considered per batch of shots to be ordered. Greedy algorithms can be used when choosing ordering shots. Generally, the system can use a search depth value (which defines how many shots ahead the control circuit will evaluate) in this process in a manner that is consistent with any real time consideration in shot list generation. At step 1326, delays can be added in the shot sequence to suppress a set of shots and thus increase available shot energy to enable a finer (denser) grid as discussed above. The methodology for sorting through different order candidates can be considered a special case of the Viterbi algorithm which can be implemented using available software packages such as Mathworks. This can also be inferred using equivalence classes or group theoretic methods. Furthermore, if the system detects that reduced latency is needed, the search depth can be reduced (see step 1328).

Figure 14:
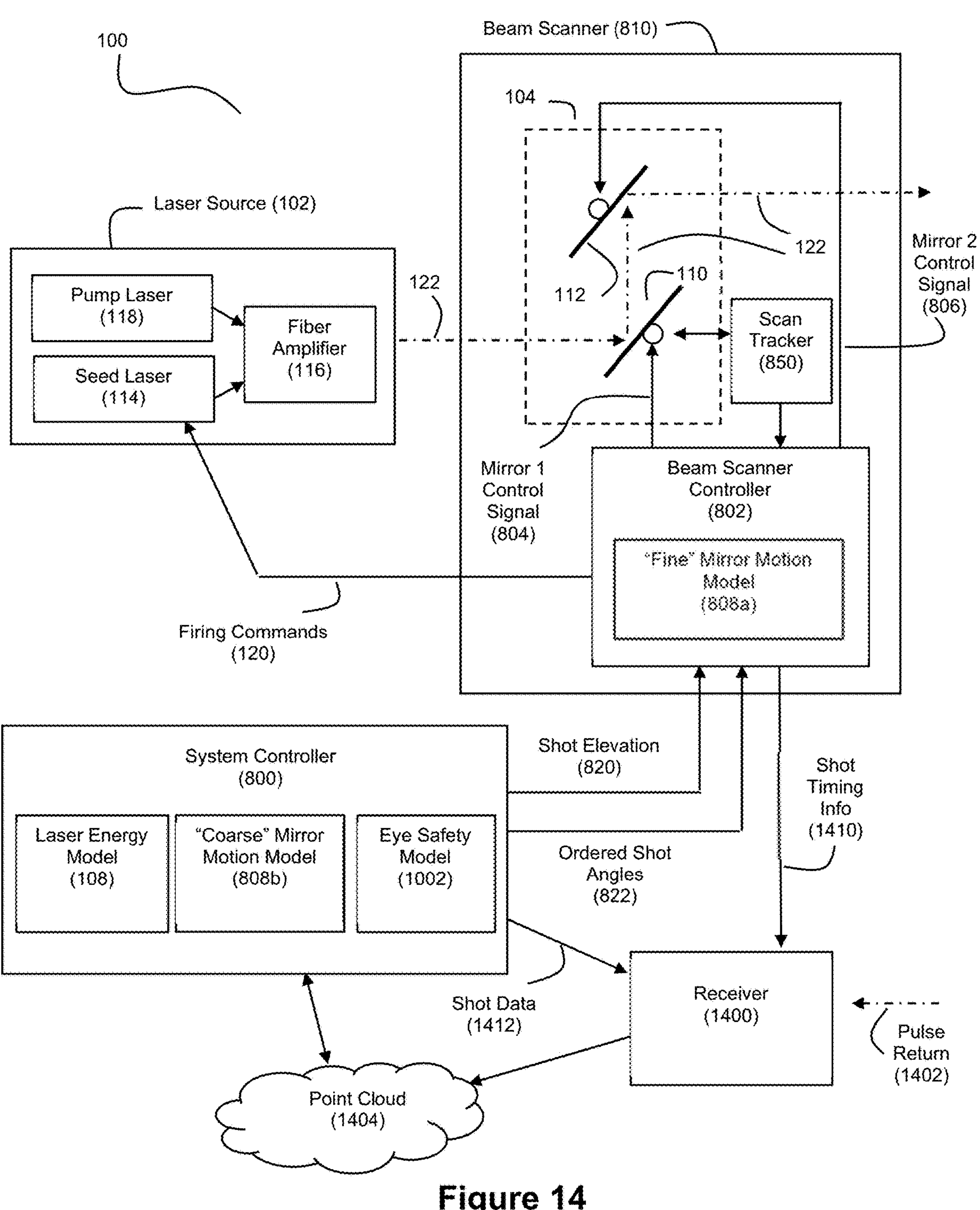
FIG. 14 depicts an example lidar system where a lidar transmitter and a lidar receiver coordinate their operations with each other.

FIG. 14 depicts an example embodiment for a lidar transmitter 100 that shows how the system controller 800 can interact with the lidar receiver 1400 to coordinate system operations. The lidar receiver 1400 can receive and process pulse returns 1402 to compute range information for objects in the field of view impacted by the laser pulses 122. This range information can then be included in the point cloud 1404 generated by the lidar system. Examples of suitable technology for use as the lidar receiver 1400 are described in U.S. Pat. Nos. 9,933,513 and 10,754,015, the entire disclosures of which are incorporated herein by reference. In the example of FIG. 14, the system controller 800 can use the point cloud 1404 to intelligently select range points for targeting with laser pulses, as discussed in the above-referenced and incorporated patents. For example, the point cloud data can be used to determine ranges for objects in the field of view that are to be targeted with laser pulses 122. The control circuit 106 can use this range information to determine desired energy levels for the laser pulses 122 which will target range points that are believed to correspond to those objects. In this fashion, the control circuit 106 can controllably adjust the laser pulse energy as a function of the estimated range of the object being targeted so the object is illuminated with a sufficient amount of light energy given its estimated range to facilitate adequate detection by the lidar receiver 1400. Further still, the beam scanner controller 802 can provide shot timing information 1410 to the receiver 1400 and the system controller 800 can provide shot data 1412 (such as data identifying the targeting range points) to the receiver 1400. The combination of this information informs the receiver how to control which pixels of the receiver 1400 should be activated for detecting pulse returns 1402 (including when those pixels should be activated). As discussed in the above-referenced and incorporated '513 and '015 patents, the receiver can select pixels for activation to detect pulse returns 1402 based on the locations of the targeted range points in the field of view. Accordingly, precise knowledge of which range points were targeted and when those range points were targeted helps improve the operations of receiver 1400. Although not shown in FIG. 14, it should also be understood that a practitioner may choose to also include a camera that images the field of view, and this camera can be optically co-axial (co-bore sighted) with the lidar transmitter 100. Camera images can also be used to facilitate intelligent range point selection among other tasks.

Figure 15:
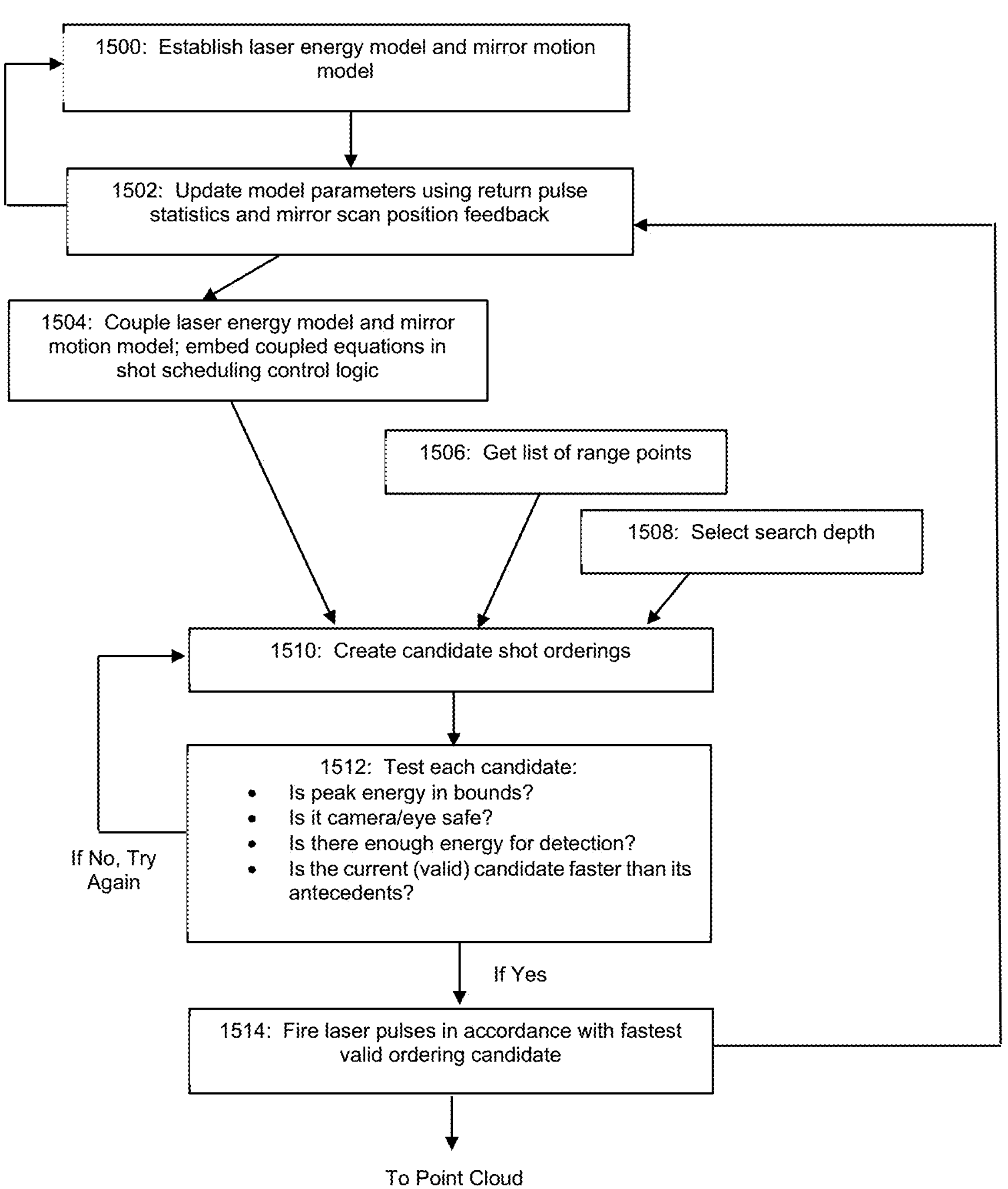
FIG. 15 depicts another example process for determining shot schedules using the models.

FIG. 15 shows another example of a process flow for the control circuit 106 with respect to using the models to dynamically determine the shot list for the transmitter 100. At step 1500, the laser energy model 108 and mirror motion model 308 are established. This can operate like step 1300 discussed above. At step 1502, the model parameters are updated using pulse return statistics (which may be derived from point cloud 1404 or other information provided by the receiver 1400) and mirror scan position feedback (e.g., from feedback system 850). At step 1504, the models are coupled so that shot angles are assigned to time slots according to the mirror motion model 308 for which shot energies can be predicted according to the laser energy model 108. These coupled models can then be embedded in the shot scheduling logic used by control circuit 106. At step 1506, a list of range points to be targeted with laser pulses 122 is received. At step 1508, a selection is made for the search depth that governs how far ahead the system will schedule shots.

Based on the listed range points and the defined search depth, the order candidates for laser pulse shots are created (step 1510). The mirror motion model 308 can assign time slots to these order candidates as discussed above. At step 1512, each candidate is tested using the laser energy model 108. This testing may also include testing based on the eye safety model 1002 and a camera safety model. This testing can evaluate the order candidates for compliance with criteria such as peak energy constraints, eye safety constraints, camera safety constraints, minimum energy thresholds, and completion times. If a valid order candidate is found, the system can fire laser pulses in accordance with the timing/sequencing defined by the fastest of the valid order candidates. Otherwise, the process flow can return to step 1510 to continue the search for a valid order candidate.

Figure 18A:
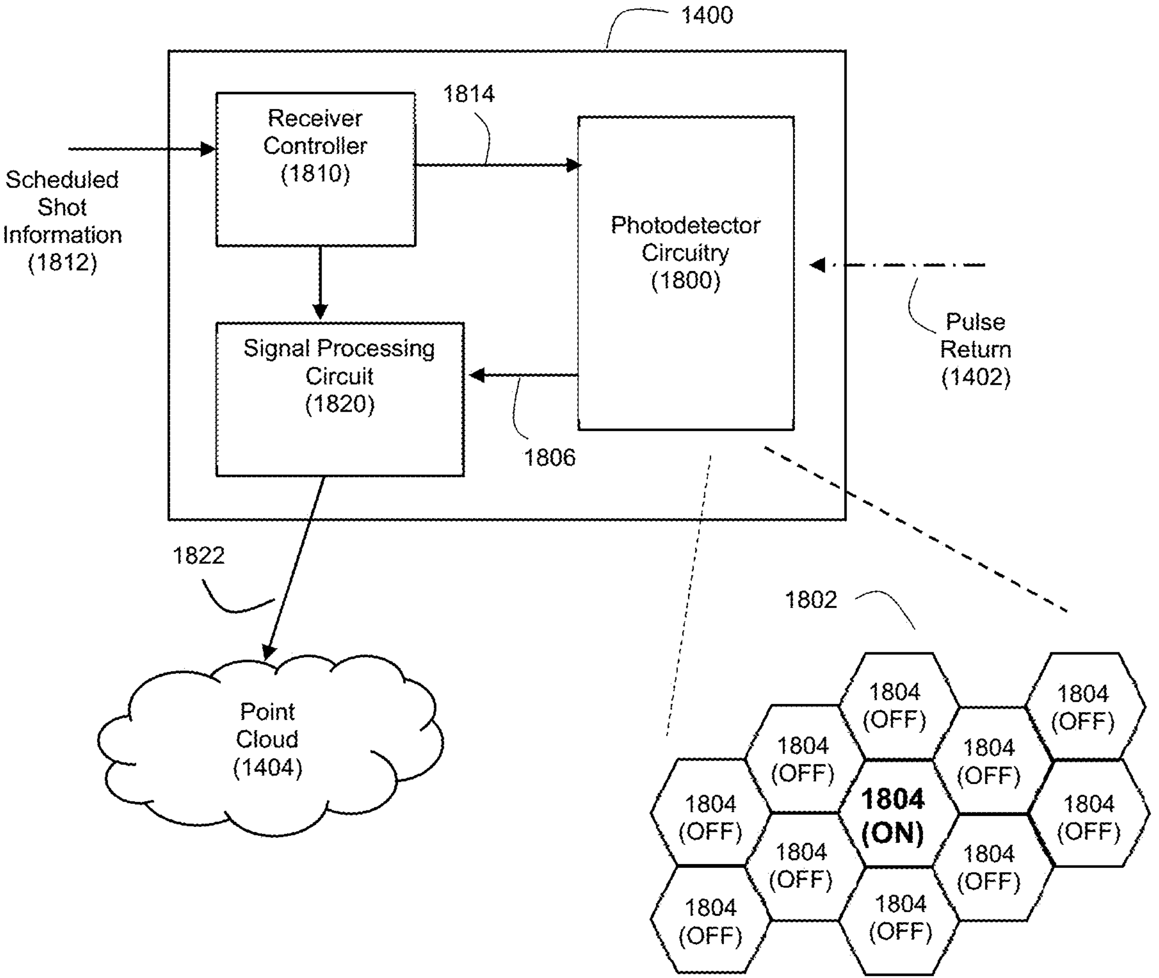
FIG. 18A depicts an example lidar receiver in accordance with an example embodiment.

Controllable Detection Intervals for Return Processing:

In accordance with another example embodiment, the shot list can be used to exercise control over how the lidar receiver 1400 detects returns from laser pulse shots 122. FIG. 18A shows an example lidar receiver 1400 for use in a lidar system. The lidar receiver 1400 comprises photodetector circuitry 1800 which includes a photodetector array 1802. The photodetector array 1802 comprises a plurality of detector pixels 1804 that sense incident light and produce a signal representative of the sensed incident light. The detector pixels 1804 can be organized in the photodetector array 1802 in any of a number of patterns. In some example embodiments, the photodetector array 1802 can be a two-dimensional (2D) array of detector pixels 1804. However, it should be understood that other example embodiments may employ a one-dimensional (1D) array of detector pixels 1804 if desired by a practitioner.

The photodetector circuitry 1800 generates a return signal 1806 in response to a pulse return 1402 that is incident on the photodetector array 1802. The choice of which detector pixels 1804 to use for collecting a return signal 1806 corresponding to a given return 1402 can be made based on where the laser pulse shot 122 corresponding to the return 1402 that was targeted. Thus, if a laser pulse shot 122 is targeting a range point located as a particular azimuth angle, elevation angle pair; then the lidar receiver can map that azimuth, elevation angle pair to a set of pixels 1804 within the array 1802 that will be used to detect the return 1402 from that laser pulse shot 122. The mapped pixel set can include one or more of the detector pixels 1804. This pixel set can then be activated and read out from to support detection of the subject return 1402 (while the pixels outside the pixel set are deactivated so as to minimize potential obscuration of the return 1402 within the return signal 1806 by ambient or interfering light that is not part of the return 1402 but would be part of the return signal 1806 if unnecessary pixels 1804 were activated when return 1402 was incident on array 1802). In this fashion, the lidar receiver 1400 will select different pixel sets of the array 1802 for readout in a sequenced pattern that follows the sequenced spatial pattern of the laser pulse shots 122. Return signals 1806 can be read out from the selected pixel sets, and these return signals 1806 can be processed to detect returns 1402 therewithin.

FIG. 18A shows an example where one of the pixels 1804 is turned on to start collection of a sensed signal that represents incident light on that pixel (to support detection of a return 1402 within the collected signal), while the other pixels 1804 are turned off (or at least not selected for readout). While the example of FIG. 18A shows a single pixel 1804 being included in the pixel set selected for readout, it should be understood that a practitioner may prefer that multiple pixels 1804 be included in one or more of the selected pixel sets. For example, it may be desirable to include in the selected pixel set one or more pixels 1804 that are adjacent to the pixel 1804 where the return 1402 is expected to strike.

Examples of circuitry and control logic that can used for this selective pixel set readout are described in U.S. Pat. Nos. 10,754,015 and 10,641,873, the entire disclosures of each of which are incorporated herein by reference. These incorporated patents also describe example embodiments for the photodetector circuitry 1800, including the use of a multiplexer to selectively read out signals from desired pixel sets as well as an amplifier stage positioned between the photodetector array 1802 and multiplexer.

Signal processing circuit 1820 operates on the return signal 1806 to compute return information 1822 for the targeted range points, where the return information 1822 is added to the lidar point cloud 1404. The return information 1822 may include, for example, data that represents a range to the targeted range point, an intensity corresponding to the targeted range point, an angle to the targeted range point, etc. As described in the above-referenced and incorporated '015 and '873 patents, the signal processing circuit 1820 can include an analog-to-digital converter (ADC) that converts the return signal 1806 into a plurality of digital samples. The signal processing circuit 1820 can process these digital samples to detect the returns 1402 and compute the return information 1822 corresponding to the returns 1402. In an example embodiment, the signal processing circuit 1820 can perform time of flight (TOF) measurement to compute range information for the returns 1402. However, if desired by a practitioner, the signal processing circuit 1820 could employ time-to-digital conversion (TDC) to compute the range information. Additional details about how the signal processing circuit 1820 can operate for an example embodiment are discussed below.

The lidar receiver 1400 can also include circuitry that can serve as part of the control circuit 106 of the lidar system. This control circuitry is shown as a receiver controller 1810 in FIG. 18A. The receiver controller 1810 can process scheduled shot information 1812 to generate the control data 1814 that defines which pixel set to select (and when to use each pixel set) for detecting returns 1402. The scheduled shot information 1812 can include shot data information that identifies timing and target coordinates for the laser pulse shots 122 to be fired by the lidar transmitter 100. In an example embodiment, the scheduled shot information 1812 can also include detection range values to use for each scheduled shot to support the detection of returns 1412 from those scheduled shots. These detection range values may include minimum and maximum range values (Rmin and Rmax respectively) for each shot. In this fashion, Rmin(i) would be the minimum detection range associated with Shot(i) and Rmax(i) would be the maximum detection range associated with Shot(i). These minimum and maximum range values can be translated by the receiver controller 1810 into times for starting and stopping collections from the selected pixels 1804 of the array 1802 as discussed below.

The receiver controller 1810 and/or signal processing circuit 1820 may include one or more processors. These one or more processors may take any of a number of forms. For example, the processor(s) may comprise one or more microprocessors. The processor(s) may also comprise one or more multi-core processors. As another example, the one or more processors can take the form of a field programmable gate array (FPGA) or application-specific integrated circuit (ASIC) which provide parallelized hardware logic for implementing their respective operations. The FPGA and/or ASIC (or other compute resource(s)) can be included as part of a system on a chip (SoC). However, it should be understood that other architectures for such processor(s) could be used, including software-based decision-making and/or hybrid architectures which employ both software-based and hardware-based decision-making. The processing logic implemented by the receiver controller 1810 and/or signal processing circuit 1820 can be defined by machine-readable code that is resident on a non-transitory machine-readable storage medium such as memory within or available to the receiver controller 1810 and/or signal processing circuit 1820. The code can take the form of software or firmware that define the processing operations discussed herein. This code can be downloaded onto the processor using any of a number of techniques, such as a direct download via a wired connection as well as over-the-air downloads via wireless networks, which may include secured wireless networks. As such, it should be understood that the lidar receiver 1400 can also include a network interface that is configured to receive such over-the-air downloads and update the processor(s) with new software and/or firmware. This can be particularly advantageous for adjusting the lidar receiver 1400 to changing regulatory environments. When using code provisioned for over-the-air updates, the lidar receiver 1400 can operate with unidirectional messaging to retain function safety.

FIGS. 19A and 19B illustrate time constraints involved in detecting shot returns 1402 and how these time constraints relate to the Rmin and Rmax values.

In FIGS. 19A and 19B, the horizontal axes correspond to time. In FIG. 19A, the time at which a first laser pulse shot (Shot 1) is fired is denoted by T(1) (where the parenthetical (1) in T(1) references the shot number). TT1(1) denotes when the receiver 1400 starts the collection from the pixel set used for detecting a return from Shot 1. The time at which collection stops from this pixel set (to end the readout of signal from the pixel set for detecting a return from Shot 1) is denoted as TT2(2). It should be understood that the parentheticals in these terms T, TT1, and TT2 reference the shot number for the detection. Thus, the time duration from TT1(1) to TT2(1) represents the detection interval for detecting a return from Shot 1 because it is during this time interval that the receiver 1400 is able to collect signal from the pixel set used for detecting a return from Shot 1.

As shown by FIG. 19A, the time duration from T(1) to TT1(1) corresponds to the minimum range that must exist to the target (relative to the receiver 1400) in order to detect a return from Shot 1. This minimum range is denoted by Rmin(1) in FIG. 19A (where the parenthetical references the shot number to which the minimum range value is applicable). If the target were located less than Rmin(1) from the receiver 1400, then the receiver 1400 would not be able to detect the return from Shot 1 because the lidar receiver would not yet have started collection from the pixel set used for detecting that return.

FIG. 19A also shows that the time duration from T(1) to TT2(1) corresponds to the maximum range to the target for detecting a return from Shot 1. This maximum range is denoted by Rmax(1) in FIG. 19A (where the parenthetical references the shot number to which the maximum range value is applicable). If the target were located greater than Rmax(1) from the receiver 1400, then the receiver 1400 would not be able to detect the return from Shot 1 because the lidar receiver would have already stopped collection from the pixel set used for detecting that return by the time that the return strikes that pixel set.

Thus, so long as the target for Shot 1 is located at a range between Rmin(1) and Rmax(1), the receiver 1400 is expected to be capable of detecting the return if collection from the pixel set starts at time TT1(1) and stops at time TT2(1). The range interval encompassed by the detection interval of TT1(1) to TT2(1) can be referred to as the range swath S(1) (where the parenthetical references the shot number to which the range swath is applicable). This range swath can also be referenced as a range buffer as it represents a buffer of ranges for the target that make the target detectable by the receiver 1400.

FIG. 19B further extends these time-range relationships by adding a second shot (Shot 2). The time at which Shot 2 is fired by the lidar transmitter 100 is denoted as T(2) in FIG. 19B. The start collection time for the pixel set used to detect the return from Shot 2 is denoted as TT1(2) in FIG. 19B, and the stop collection time for the pixel set used with respect to detecting the return from Shot 2 is denoted as TT2(2) in FIG. 19B. FIG. 19B further shows that (1) the time duration from T(2) to TT1(2) corresponds to the minimum range to the target for detecting a return from Shot 2 and (2) the time duration from T(2) to TT2(2) corresponds to the maximum range to the target for detecting a return from Shot 2. These minimum and maximum range values are denoted as Rmin (2) and Rmax(2) respectively by FIG. 19B. The range swath S(2) defines the range interval (or range buffer) between Rmin(2) and Rmax(2) for the detection interval of TT1(2) to TT2(2).

In an example embodiment, the photodetector circuitry 1800 is capable of sensing returns from one pixel set at a time. For such an example embodiment, the detection interval for detecting a return for a given shot cannot overlap with the detection interval for detecting a return from another shot. This means that TT1(2) should be greater than or equal to TT2(1), which then serves as a constraint on the choice of start and stop collection times for the pixel clusters. However, it should be understood that this constraint could be eliminated with other example embodiments through the use of multiple readout channels for the lidar receiver 1400 as discussed below in connection with FIG. 26.

As noted above, each detection interval (D(i), which corresponds to (TT1(i) to TT2(i)) will be associated with a particular laser pulse shot (Shot(i)). The system can control these shot-specific detection intervals so that they can vary across different shots. As such, the detection interval of D(j) for Shot(j) can have a different duration than the detection interval of D(k) for Shot(k).

Moreover, as noted above, each detection interval D(i) has a corresponding shot interval SI(i), where the shot interval SI(i) corresponding to D(i) can be represented by the interval from shot time T(i) to the shot time T(i+1). Thus, consider a shot sequence of Shots 1-4 at times T(1), T(2), T(3), and T(4) respectively. For this shot sequence, detection interval D(1) for detecting the return from Shot(1) would have a corresponding shot interval SI(1) represented by the time interval from T(1) to T(2). Similarly, detection interval D(2) for detecting the return from Shot(2) would have a corresponding shot interval SI(2) represented by the time interval from T(2) to T(3); and the detection interval D(3) for detecting the return from Shot(3) would have a corresponding shot interval SI(3) represented by the time interval from T(3) to T(4). Counterintuitively, the inventors have found that it is often not desirable for a detection interval to be of the same duration as its corresponding shot interval due to factors such as the amount of processing time that is needed to detect returns within return signals (as discussed in greater detail below). In many cases, it will be desirable for the control process to define a detection interval so that it exhibits a duration shorter than the duration of its corresponding shot interval (D(i)<SI(i)). In this fashion, processing resources in the signal processing circuit 1820 can be better utilized, as discussed below. Furthermore, in some other cases, it may be desirable for the variability of the detection intervals relative to their corresponding shot intervals to operate where a detection interval exhibits a duration longer than the duration of its corresponding shot interval (D(i)>SI(i)). For example, if the next shot at T(i+1) has an associated Rmin value greater than zero, and where the shot at T(i) is targeting a range point expected to be at a long range while the shot at T(i+1) is targeting a range point expected to be at medium or long range, then it may be desirable for D(i) to be greater than SI(i).

It can be appreciated that a laser pulse shot, Shot(i), fired at time T(i) will be traveling at the speed of light. On this basis, and using the minimum and maximum range values of Rmin(i) and Rmax(i) for detecting the return from Shot(i), the minimum roundtrip distance for Shot(i) and its return would be 2Rmin(i) and the minimum roundtrip time for Shot(i) and its return would be TT1(i)−T(i). The value for TT1(i) could be derived from Rmin(i) according to these relationships as follows (where the term c represents the speed of light):

$$(TT1(i) - T(i))c = 2Rmin(i)$$

which can be re-expressed as:

$$TT1(i) = \frac{2Rmin(i)}{c} + T(i)$$

Thus, knowledge of when Shot(i) is fired and knowledge of the value for Rmin(i) allows the receiver 1400 to define when collection should start from the pixel set to be used for detecting the return from Shot (i).

Similarly, the value for TT2(i) can be derived from Rmax(i) according to these relationships as follows (where the term c represents the speed of light):

$$(TT2(i) - T(i))c = 2Rmax(i)$$

which can be re-expressed as:

$$TT2(i) = \frac{2Rmax(i)}{c} + T(i)$$

Thus, knowledge of when Shot(i) is fired and knowledge of the value for Rmax(i) allows the receiver 1400 to define when collection can stop from the pixel set to be used for detecting the return from Shot(i).

A control process for the lidar system can then operate to determine suitable Rmin(i) and Rmax(i) values for detecting the returns from each Shot(i). These Rmin, Rmax pairs can then be translated into appropriate start and stop collection times (the on/off times of TT1 and TT2) for each shot. In an example embodiment, if the lidar point cloud 1404 has range data and location data about a plurality of objects of interest in a field of view for the receiver 1400, this range data and location data can be used to define current range estimates for the objects of interest, and suitable Rmin, Rmax values for detecting returns from laser pulse shots that target range points corresponding to where these objects of interest are located can be derived from these range estimates. In another example embodiment, the control process for the lidar system can access map data based on the geographic location of the receiver 1400. From this map data, the control process can derive information about the environment of the receiver 1400, and suitable Rmin, Rmax values can be derived from this environmental information. Additional example embodiments for determine the values for the Rmin, Rmax pairs are discussed below.

Figure 18B:
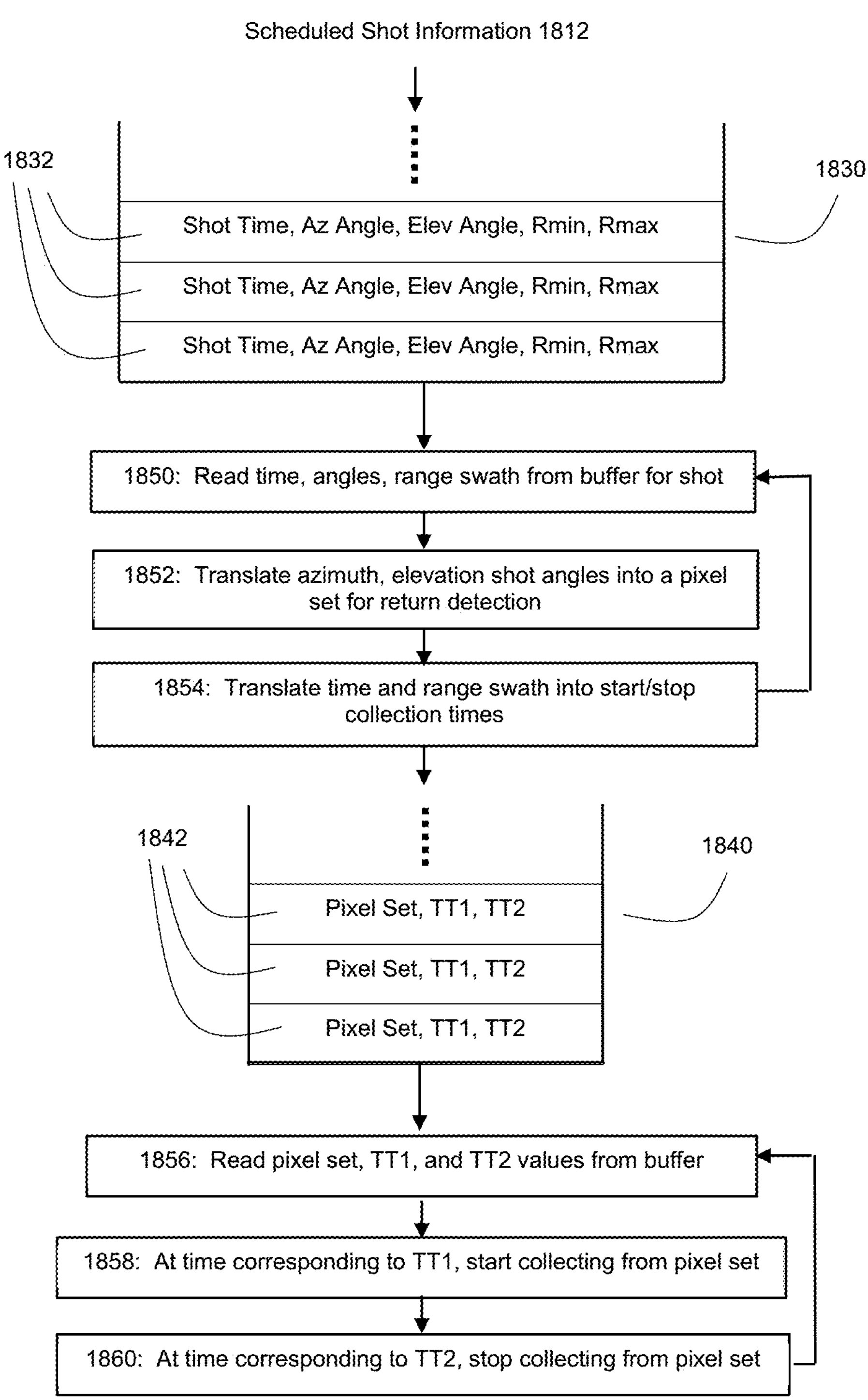
FIG. 18B depicts an example process flow for use by the lidar receiver of FIG. 18A to control the activation and deactivation of detector pixels in a photodetector array.

FIG. 18B depicts an example process flow for execution by the receiver controller 1810 for the lidar receiver 1400 of FIG. 18A to control the selection of detector pixels 1804 in the photodetector array 1802 for readout. In this example, the lidar system includes a buffer 1830 in which the scheduled shot information 1812 is buffered by the control circuit 106. This scheduled shot information 1812 can include, for each scheduled laser pulse shot, data that identifies the time the shot is to be fired, data that identifies range point to be targeted with the subject shot (e.g., the azimuth and elevation angles at which the subject shot will be fired), and data that defines the detection interval for detecting the return from the subject shot (e.g., data that identifies the Rmin and Rmax values to use for detecting the return from the subject shot). The entries 1832 in buffer 1830 thus correspond to the shot time, azimuth angle, elevation angle, Rmin, and Rmax values for each shot. Moreover, the order in which these entries are stored in the buffer 1832 can define the shot schedule. For example, the buffer can be a first in/first out (FIFO) buffer where entries 1832 are added into and read out of the buffer in accordance with the order in which the shots are to be fired.

Steps 1850, 1852, and 1854 of FIG. 18B define a translation process flow for the receiver controller 1810. At step 1850, the receiver controller 1810 reads the entry 1832 corresponding to the first shot to determine the shot time, shot angles, and range swath information for that shot. At step 1852, the receiver controller 1852 determines which pixel set of the photodetector array 1800 to select for detecting the return from the shot defined by the shot angles of the entry 1832 read at step 1850. This can be accomplished by mapping the azimuth and elevation angles for the shot to a particular pixel set of the array 1802. Thus, step 1852 can operate to generate data that identifies one or more pixels 1804 of the array 1802 to include in the pixel set for detecting the return from the subject shot. The above-referenced and incorporated '015 and '873 patents describe how a practitioner can implement this mapping of shot locations to pixels. At step 1854, the receiver controller 1810 translates the shot time and Rmin, Rmax values into the TT1, TT2 values. This translation can use the expressions discussed above for computing TT1(i) and TT2(i) as a function of T(i), Rmin(i), and Rmax(i) for a given Shot(i). The values for the determined pixel set and the start/stop collection times for the pixel set can then be added to buffer 1840 as a new entry 1842. The process flow can then return to step 1850 to iterate through steps 1850-1854 and generate the control data for the next shot (as defined by the next entry 1832 in buffer 1830), and so on for so long as there are new entries 1832 in buffer 1830.

Steps 1856, 1858, and 1860 of FIG. 18B define a readout control process flow for the receiver controller 1810. Each entry 1842 in buffer 1840 corresponds to exercising control over detecting the return from a different shot and identifies the pixel set to use for the detection as well as the start and stop collection times for that detection (TT1, TT2 values). At step 1856, the receiver controller reads the entry 1842 corresponding to the first shot to identify the pixel set, TT1, and TT2 values for detecting the return from that shot. Then, at the time corresponding to TT1, the receiver controller 1810 starts collecting the sensed signal from the identified pixel set (step 1860). In this fashion, the receiver controller 1810 can provide control data 1814 to the photodetector circuitry 1800 at the time corresponding to TT 1 that instructs the photodetector circuitry 1800 to start the signal readout from the pixel(s) within the identified pixel set. Next, at the time corresponding to TT2, the receiver controller 1810 stops the collection from the identified pixel set (step 1862). To accomplish this, the receiver controller 1810 can provide control data 1814 to the photodetector circuitry 1800 at the time corresponding to TT2 that instructs the photodetector circuitry 1800 to stop the readout from the pixel(s) within the identified pixel set. From there, the process flow returns to step 1856 to continue the readout control process flow for the next entry 1842 in buffer 1840. This iteration through steps 1856-1860 continues for so long as there are new entries 1842 in buffer 1840 to process.

As discussed above in connection with FIGS. 8, 11, and 14, a practitioner may want the lidar system to exercise highly precise control over when the laser pulse shots are fired; and this can be accomplished by having the beam scanner controller 802 provide firing commands 120 to the laser source 102 precisely when the fine mirror motion model 808*a* indicates the lidar transmitter 100 will be pointing at a particular shot angle (e.g., an azimuth angle, elevation angle pair). The beam scanner controller 802 can then report these precise shot times to the receiver 1400 as shot timing information 1412. Accordingly, as shown by FIG. 18C, the lidar receiver 1400 can receive the scheduled shot information 1812 in the form of (1) the shot timing information 1410 from the beam scanner controller 802 (which in this example will identify the precise shot times for each shot) and (2) the shot data 1312 from the system controller 800 (which in this example will identify the shot angles for each shot as well as the Rmin and Rmax values for each shot).

Figure 18C:
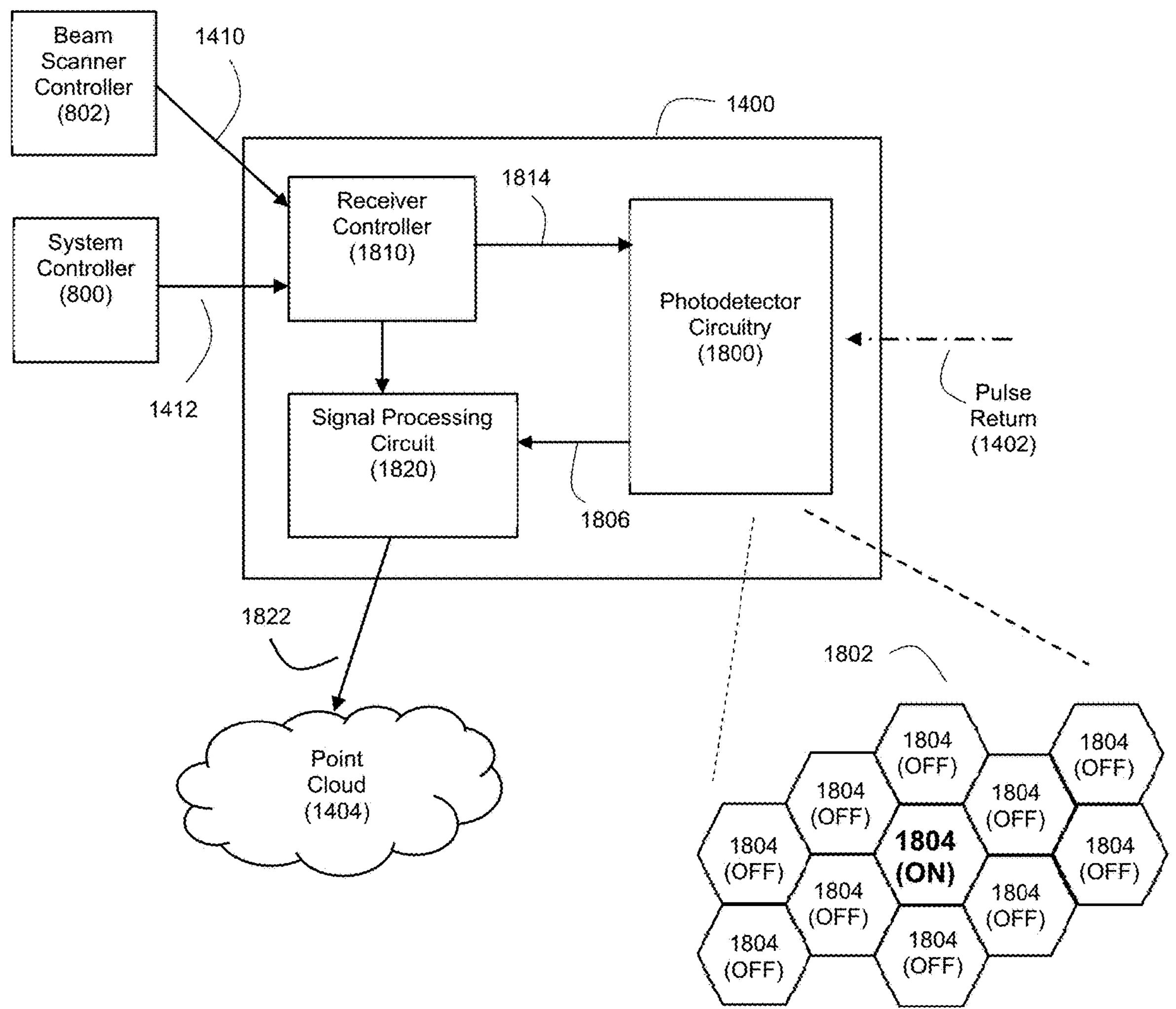
FIG. 18C depicts an example lidar receiver in accordance with another example embodiment.
Figure 18D:
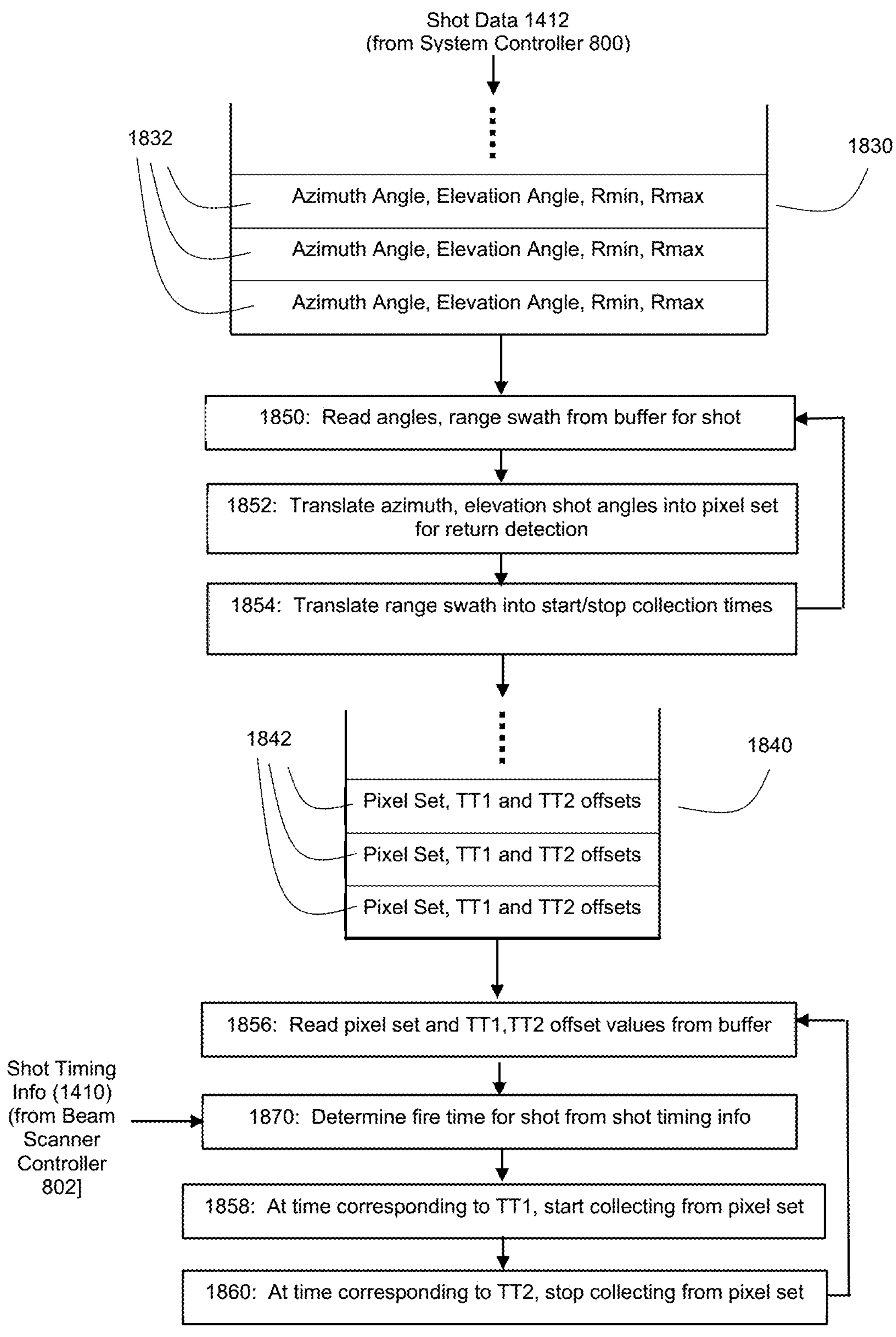
FIG. 18D depicts an example process flow for use by the lidar receiver of FIG. 18C to control the activation and deactivation of detector pixels in a photodetector array.

FIG. 18D depicts an example process flow for the receiver controller 1810 with respect to the example of FIG. 18C. The process flow of FIG. 18D can operate in a similar fashion as the process flow of FIG. 18D with a couple of exceptions. For example, at step 1854 of FIG. 18D, the receiver controller 1810 can compute the start and stop collection times as time offsets relative to the fire time for the shot rather than as absolute values. That is, rather than computing values for TT1(i) and TT2(i), the receiver controller can compute values for (1) TT1(i)–T(i) (which would identify the TT1(i) offset relative to fire time T(i)) and (2) TT2(i)–T(i) (which would identify the TT2(i) offset relative to fire time T(i)) as follows:

$$TT1(i)\ Offset = TT1(i) - T(i) = \frac{2R\min(i)}{c}$$

$$TT2(i)\ Offset = TT2(i) - T(i) = \frac{2R\max(i)}{c}$$

Then, after step 1856 is performed to read entry 1842 in buffer 1840, the receiver controller 1870 can also determine the fire time T(i) for the subject shot(i) based on the shot timing information 1410 received from the beam scanner controller 802. Using this shot time as the frame of reference for the TT1 and TT2 offset values, steps 1858 and 1860 can then operate to start and stop collections from the pixel set at the appropriate times.

Figure 20:
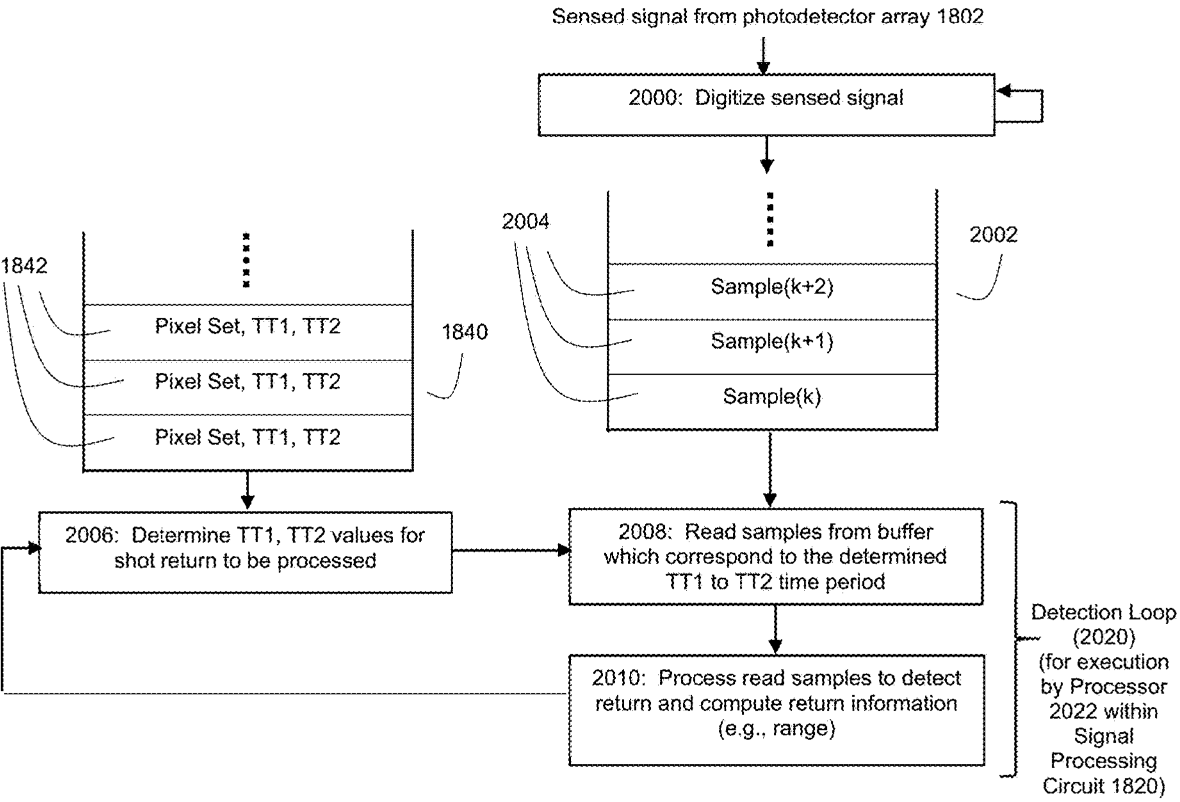
FIG. 20 shows an example process flow for use by a signal processing circuit of a lidar receiver to detect returns from laser pulse shots.

FIG. 20 shows an example process flow for use by the signal processing circuit 1820 to detect returns 1402 and compute return information 1822 for the returns 1402. At step 2000, the signal processing circuit 1820 digitizes the sensed signal 1806 produced by the photodetector circuitry 1800. This sensed signal 1806 represents the incident light on the activated pixels 1804 of the array 1802 over time, and thus is expected to include signals corresponding to the returns 1402. The signal processing circuit 1820 can perform step 2000 using an ADC to produce digital samples 2004 that are added to buffer 2002.

The signal processing circuit 1820 then needs to segment these samples 2004 into groups corresponding to the detection intervals for the returns from each shot. This aspect of the process flow is identified by the detection loop 2020 of FIG. 20. A processor 2202 within the signal processing circuit 1820 can perform this detection loop 2020. To help accomplish this, the processor can access the buffer 1840 to determine the start and stop collection times for detecting the returns from each shot. As discussed above, entries 1842 in buffer 1840 can include the start/stop collection times as either absolute or offset values for TT1 and TT2. At step 2006, the processor reads the next entry 1842 in buffer 1840 to determine the TT1 and TT2 values (which as noted can be either absolute values or offset values). These TT1 and TT2 values can then be used to find which samples 2004 in the buffer 2002 correspond to the detection interval of TT1 to TT2 for detecting the subject return from (step 2008). The processor thus reads the digital samples 2004 corresponding to the subject detection interval, and then processes the digital samples 2004 in this group to detect whether the return is present (step 2010). When a return is detected, step 2010 can also compute return information 1822 based on these samples 2004. As noted above, the samples 2004 can be processed to compute a range to target for the shot. For example, according to a TOF flight technique, the processor can compute the range for the return based on knowledge of when the shot was fired, when the detected return was received, and the value for the speed of light. The samples 2004 can also be processed to compute an intensity for the shot return. For example, the return intensity can be computed by multiplying the return energy by the range squared, and then dividing by the transmitted shot energy and again by the effective receiver pupil aperture. From step 2010, the detection loop 2020 can return to steps 2006 and 2008 to read the next entry 1842 from buffer 1840 and grab the next group of samples 2004 from buffer 2002 and then detect the return and compute its return information at step 2010 (and so on for additional returns).

Figure 21A:
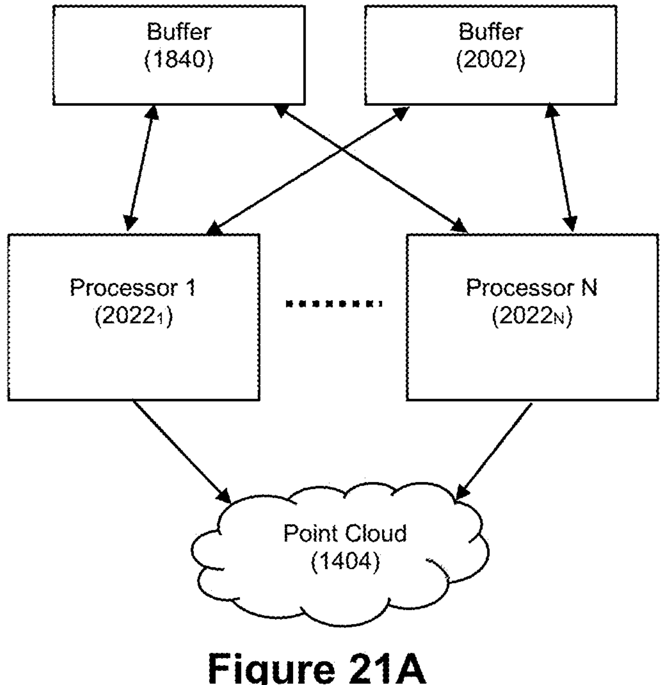
FIGS. 21A and 21B show examples of a multi-processor arrangement for distributing the workload of detecting returns within a lidar receiver.
Figure 21B:
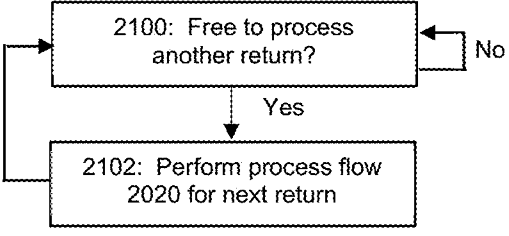

Multi-Processor Return Detection:

The amount of time needed by processor 2022 to perform the detection loop 2020 is an important metric that impacts the lidar system. This amount of time can be characterized as Tproc, and it defines the rate at which processor 2022 draws samples 2004 from buffer 2002. This rate can be referenced as Rate 1. The rate at which the receiver adds samples 2004 to buffer 2002 can be referenced as Rate 2. It is highly desirable for the processor 2022 to operate in a manner where Rate 1 is greater than (or at least no less than) Rate 2 so as to avoid throughput problems and potential buffer overflows. To improve throughput for the lidar receiver 1400 in this regard, the signal processing circuit 1820 can include multiple processors 2022 that distribute the detection workload so that the multiple processors 2022 combine to make it possible for the receiver 1400 to keep up with the shot rate of the lidar transmitter 100 even if Rate 1 is less than the shot rate of the lidar transmitter 100. For example, if there are N processors 2022, then Rate 1 can be N times less than that shot rate of the lidar transmitter 100 while still keeping pace with the shots. FIG. 21A shows an example of a multi-processor architecture for the signal processing circuit 1820 in this regard. As shown by FIG. 21A, the processor 2022 comprises two or more processors $\mathbf{2022}_1, \ldots, \mathbf{2022}_N$. Each processor $\mathbf{2022}_i$ can access buffers 1840 and 2002 to perform the operations set forth by steps 2006-2010 of FIG. 20 for the returns corresponding to different shots. FIG. 21B shows an example of control flow for the different processors $\mathbf{2022}_i$.

At step 2100, each processor $\mathbf{2022}_i$ decides whether it is free to process another return. In other words, has it finished processing the previous return it was working on? If the subject processor $\mathbf{2022}_i$ decides that it is free, it proceeds to step 2102 where it performs the detection processing loop 2020 for the next return available from the buffers 1840 and 2002. In this fashion, each processor $\mathbf{2022}_i$ can grab samples 2004 from buffer 2002 to work on the next return on a first come first served basis and thereby distribute the workload of processing the returns across multiple processors to help reduce the processing latency of the signal processing circuit 1820.

The processors $\mathbf{2022}_i$ can take any of a number of forms. For example, each processor $\mathbf{2022}_i$ can be a different microprocessor that shares access to the buffers 1840 and 2002. In this fashion the different microprocessors can operate on samples 2004 corresponding to different returns if necessary. As another example, each processor $\mathbf{2022}_i$ can be a different processing core of a multi-core processor, in which case the different processing cores can operate on samples 2004 corresponding to different returns if necessary. As yet another example, each processor $\mathbf{2022}_i$ can be a different set of parallelized processing logic within a field programmable gate array (FPGA) or application-specific integrated circuit (ASIC). In this fashion, parallelized compute resources within the FPGA or ASIC can operate on samples 2004 corresponding to different returns if necessary.

It is expected that the use of two processors 2022 will be sufficient to distribute the workload of processing the samples 2004 within buffer 2002. With this arrangement, the two processors 2022 can effectively alternate in terms of which returns they will process (e.g., Processor 1 can work on the samples for even-numbered returns while Processor 2 works on the samples for the odd-numbered returns). However, this alternating pattern may not necessarily hold up if, for example, the detection interval for Return 1 is relatively long (in which case Processor 1 may need to process a large number of samples 2004) while the detection intervals for Returns 2 and 3 are relatively short. In this example, it may be the case that Processor 1 is still processing the samples from Return 1 when Processor 2 completes its processing of the samples from Return 2 (and thus Processor 2 is free to begin processing the samples from Return 3 while Processor 1 is still working on the samples from Return 1).

Moreover, the return information 1822 computed by each processor $\mathbf{2022}_i$ can be effectively joined or shuffled together into their original time sequence of shots when adding the return information 1822 to the point cloud 1404.

Choosing Rmin, Rmax Values:

The task of choosing suitable Rmin and Rmax values for each shot can be technically challenging and involves a number of tradeoffs. In an ideal world, the value of Rmin would be zero and the value of Rmax would be infinite; but this is not feasible for real world applications because there are a number of constraints which impact the choice of values for Rmin and Rmax. Examples of such constraints are discussed below, and these constraints introduce a number of tradeoffs that a practitioner can resolve to arrive at desirable Rmin and Rmax values for a given use case.

For an example embodiment as discussed above where the lidar receiver 1400 is only capable of receiving/detecting one return at a time, a first constraint is the shot timing. That is, the receiver 1400 needs to quit listening for a return from Shot 1 before it can start listening for a return from Shot 2. Accordingly, for a given fixed shot spacing, if a practitioner wants to have fixed Rmin and Rmax values, their differences must be equal to the intershot timing (after scaling by 2/c). For example, for a 1 μsec detection interval, the corresponding range buffer would be a total of 150 m. This would permit Rmin to be set at 0 m and Rmax to be set at 150 m (or Rmin=40 m, Rmax=190 m, etc.). Thus, if Rmax is increased, we can avoid adding time to Tproc by also increasing the value of Rmin by a corresponding amount so that the Rmax−Rmin does not change.

A second constraint on Rmin, Rmax values is physics. For example, the receiver 1400 can only detect up to a certain distance for a given shot energy. For example, if the energy in a laser pulse shot 122 is low, there would not be a need for a large Rmax value. Moreover, the receiver 1400 can only see objects up to a certain distance based on the elevation angle. As an example, the receiver 1400 can only see a short distance if it is looking at a steep downward elevation angle because the field of view would quickly hit the ground at steep downward elevation angles. In this regard, for a receiver 1400 at a height of 1 m and an elevation angle of −45 degrees, Rmax would be about 1.4 m. The light penetration structure of the air within the environment of the lidar system can also affect the physics of detection. For example, if the lidar receiver 1400 is operating in clear weather, at night with dark or artificial lighting, and/or in a relatively open area (e.g., on a highway), the potential value for Rmax could be very large (e.g., 1 km or more) as the lidar receiver 1400 will be capable of detecting targets at very long range. But, if the lidar receiver 1400 is operating in bad weather or during the day (with bright ambient light), the potential value for Rmax may be much shorter (e.g., around 100 m) as the lidar receiver 1400 would likely only need to be capable of detecting targets at relatively shorter ranges.

A third constraint arises from geometry and a given use case. Unlike the physics constraints in the second constraint category discussed above (which are based on features of the air surrounding the lidar system), geometry and use case can be determined a priori (e.g., based on maps and uses cases such as a given traffic environment that may indicate how congested the field of view would be with other vehicles, buildings, etc.), with no need to measure attributes in the return data. For example, if the goal is to track objects on a road, and the road curves, then there is no need to set Rmax beyond the curve. Thus, if the receiver 1400 is looking straight ahead and the road curves at a radius of curvature of 1 km, roughly 100 m for Rmax would suffice. This would be an example where accessing map data can help in the choice of suitable Rmax values. As another example, if the lidar receiver 1400 is operating in a relatively congested environment (e.g., on a city street), the potential value for Rmax may be relatively short (e.g., around 100 m) as the lidar receiver 1400 would likely only need to be capable of detecting targets at relatively short ranges. Also, for use cases where there is some a priori knowledge of what the range is to an object being targeted with a laser pulse shot, this range knowledge can influence the selection of Rmin and Rmax. This would be an example where accessing lidar point cloud data 1404 can help in the choice of suitable Rmin and Rmax values. Thus, if a given laser pulse shot is targeting an object having a known estimated range of 50 m, then this knowledge can drive the selection of Rmin, Rmax values for that shot to be values that encompass the 50 m range within a relatively tight tolerance (e.g., Rmin=25 m and Rmax=75 m).

A fourth constraint arises from the processing time needed to detect a return and compute return information (Tproc, as discussed above). If the receiver 1400 has N processors and all are busy processing previous returns, then the receiver 1400 must wait until one of the processors is free before processing the next return. This Tproc constraint can make it undesirable to simply set the detection intervals so that they coincide with their corresponding shot intervals (e.g., TT1(i)=T(i) and TT2(i)=T(i+1), where TT1(1)=T(1), TT2(1)=T(2), and so on). For example, imagine a scenario where the receiver 1400 includes two processors for load balancing purposes and where the shot spacing has a long delay between Shots 1 and 2 (say 100 μsec), and then a quick sequence of Shots 2, 3, and 4 (say with intershot spacing of 5 μsec). If Tproc is 2×realtime, then Processor A would need 200 μsec to process the return from Shot 1, and Processor B would need 10 μsec to process the return from Shot 2. This means that Processor A would still be working on Shot 1 (and Processor B would still be working on Shot 2) when the return from Shot 3 reaches the receiver 1400. Accordingly, the system may want to tradeoff the detection interval for detecting the return from Shot 1 by using a smaller value for Rmax(1) so that there is a processor available to work on the return from Shot 3. Thus, the variable shot intervals that can be accommodated by the lidar system disclosed herein will often make it desirable to control at least some of the detection intervals so that they have durations that are different than the durations of the corresponding shot intervals, as discussed above.

Accommodating the Tproc constraint can be accomplished in different ways depending on the needs and desires of a practitioner. For example, under a first approach, the Rmax value for the processor that would be closest to finishing can be redefined to a lesser value so that processor is free exactly when the new shot is fired. In this case, the Rmin for the new shot can be set to zero. Under a second approach, we can keep Rmax the same for the last shot, and then set Rmin for the new shot to be exactly the time when the processor first frees up. Additional aspects of this constraint will be discussed in greater detail below.

A fifth constraint arises from the amount of time that the pixels 1804 of the array 1802 need to warm up when activated. This can be referred to as a settle time (Tsettle) for the pixels 1804 of the array 1802. When a given pixel 1804 is activated, it will not reliably measure incident light until the settle time passes, which is typically around 1 μsec. This settle time effectively defines the average overall firing rate for a lidar system that uses example embodiments of the lidar receiver 1400 described herein. For example, if the firing rate of the lidar transmitter 100 is 5 million shots per second, the settle time would prevent the receiver 1400 from detecting returns from all of these shots because that would exceed the ability of the pixels 1804 to warmup sufficiently quickly for detecting returns from all of those shots. However, if the firing rate is only 100,000 shots per second, then the settle time would not be a limiting factor.

Figure 27:
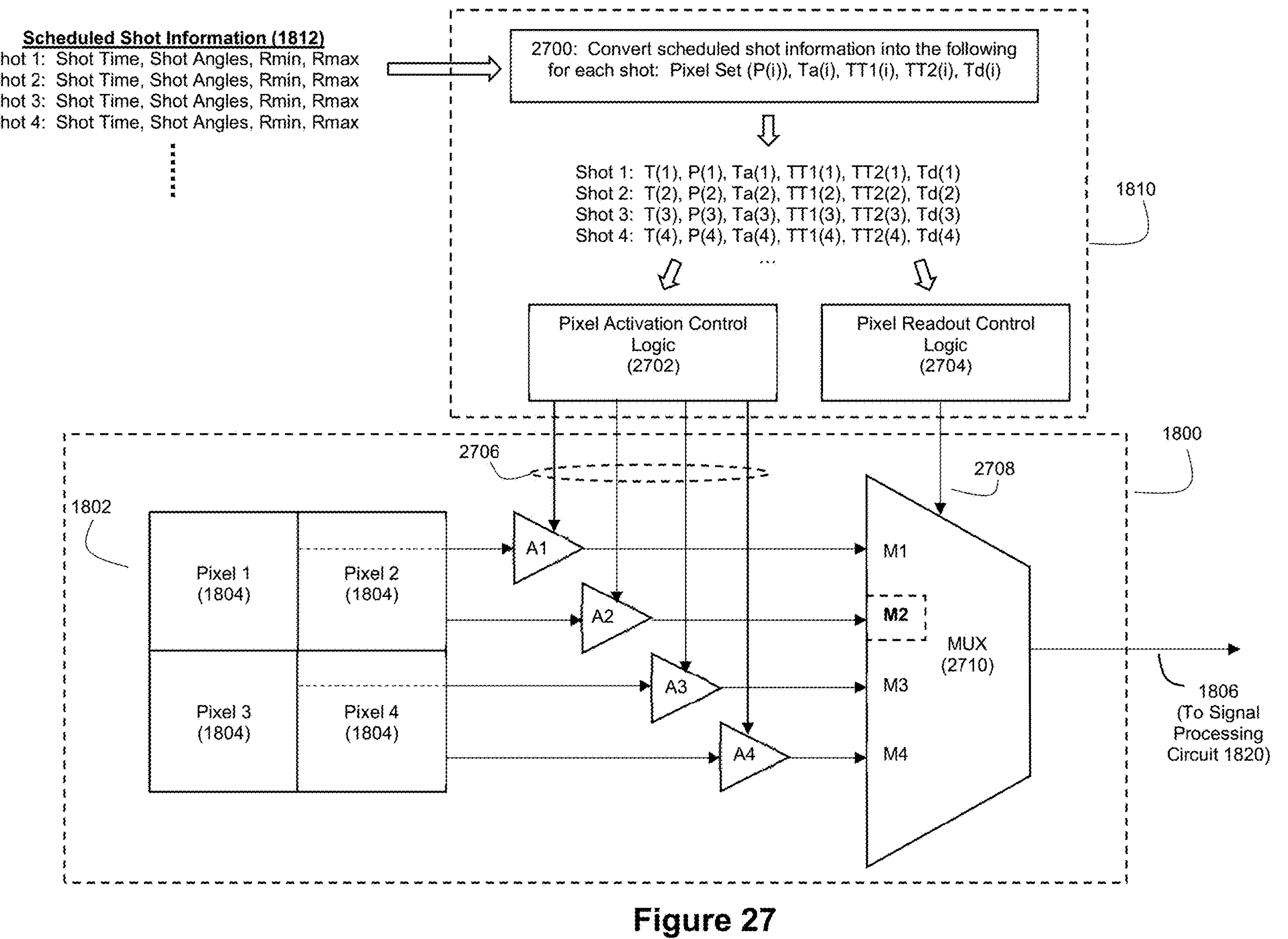
FIG. 27 shows an example embodiment of a lidar receiver that includes details showing how pixel activation can be controlled in concert with selective pixel readout.

FIG. 27 shows an example embodiment that illustrates how the circuitry of the receiver 1400 can accommodate the settle time for the pixels 1804. For ease of illustration, the array 1802 of FIG. 27 includes only four pixels 1804. However, it should be understood that a practitioner would likely choose a much larger number of pixels 1804 for the array 1802. FIG. 27 shows an example where the photodetector circuit 1800 includes an amplifier network that connects the pixels 1804 of array 1802 to a corresponding amplifier that amplifies the signals from its corresponding pixel 1804. Each amplified signal is then fed as an input line to multiplexer 2710. Thus, as shown by FIG. 27, Pixel 1 feeds into amplifier A1, which in turn feeds into multiplexer input line M1. Similarly, Pixel 2 feeds into amplifier A2, which in turn feeds into multiplexer input line M2 (and so on for Pixels 3 and 4). As discussed in the above-referenced and incorporated U.S. Pat. Nos. 9,933,513 and 10,754,015, the amplifiers in the amplifier network can be maintained in a quiescent state when their corresponding pixels 1804 are not being used to detect returns. In doing so, the amount of power consumed by the receiver 1400 during operation can be greatly reduced. When it is time for a given pixel 1804 to be used to detect a return, that pixel's corresponding amplifier is awakened by powering it up. However, as discussed above, the pixel will need to wait for the settle time before its corresponding amplifier can pass an accurate signal to the multiplexer 2710. This means that if the lidar receiver 1400 is to start collection from a pixel at time TT1, then it must activate that pixel at least Tsettle before TT1.

Multiplexer 2710 operates to read out a sensed signal from a desired pixel 1804 in accordance with a readout control signal 2708, where the readout control signal 2708 controls which of the multiplexer input lines are passed as output. Thus, by controlling the readout control signal 2708, the receiver 1400 can control which of the pixels 1804 are selected for passing its sensed signal as the return signal 1806.

The receiver controller 1810 includes logic 2700 that operates on the scheduled shot information 1812 to convert the scheduled shot information into data for use in controlling the photodetector circuit 1800. The scheduled shot information 1812 can include, for each shot, identifications of (1) a shot time (T(i)), (2) shot angles (e.g., an elevation angle, azimuth angle pair), (3) a minimum detection range value (Rmin(i)), and (4) a maximum detection range value (Rmax(i)). Logic 2700 converts this scheduled shot information into the following values used for controlling the photodetector circuit 1800:

- An identification of the pixel set that will be used to detect the return from the subject Shot (i). This identified pixel set is shown as P(i) by FIG. 27.
- An identification of an activation time that will be used to define the time at which the amplifier(s) corresponding to the identified pixel set P(i) will be switched to a powered up state from a quiescent state. This identified activation time is shown as Ta(i) by FIG. 27.
- An identification of the start collection time (TT1(i)) for the identified pixel set P(i)
- An identification of the stop collection time (TT2(i)) for the identified pixel set P(i)
- An identification of a deactivation time that will be used to define the time at which the amplifier(s) corresponding to the identified pixel set P(i) will be switched from the powered-up state to the quiescent state.

The logic 2700 can also pass the shot times T(i) as shown by FIG. 27.

The values for P(i) can be determined from the shot angles in the scheduled shot information 1812 based on a mapping of shot angles to pixel sets, as discussed in the above-referenced and incorporated patents.

The values for Ta(i) can be determined so that the settle time for the identified pixel set P(i) will have passed by the time TT1(i) arrives so that P(i) will be ready to have collection started from it at time TT1(i). A practitioner has some flexibility in choosing how the logic 2700 will compute an appropriate value for Ta(i). For example, the logic 2700 can activate the next pixel set when the immediately previous shot is fired. That is, logic 2700 can set the value for Ta(i)=T(i−1), which is expected to give P(i) enough time to power up so that collection from it can begin at time TT1(i). However, in another example embodiment, the logic 2700 can set the value for Ta(i)=TT1(i)−Tsettle (or some time value between these two options).

The values for TT1(i) and TT2(ii) can be computed from the Rmin(i) and Rmax(i) values as discussed above.

The values for Td(i) can be determined so that Td(i) either equals TT2(i) or falls after TT2(i), preferably sufficiently close in time to TT2(i) so as to not unduly waste power. In choosing a suitable value for Td(i), the logic 2700 can examine the upcoming shots that are close in time to see if any of the pixels in P(i) will be needed for such upcoming shots. In such a circumstance, the logic 2700 may choose to leave the corresponding amplifier powered up. But, in an example embodiment where a practitioner wants to power down the amplifier(s) for a pixel set as soon as collection from that pixel set stops, then TT2(i) can be used as the deactivation time in place of a separate Td(i) value.

In the example of FIG. 27, the receiver controller 1810 includes pixel activation control logic 2702 and pixel readout control logic 2704. Pixel activation control logic 2702 operates to provide an activation control signal 2706 to the amplifier network that (1) activates the amplifier(s) corresponding to each pixel set P(i) at each time Ta(i) and (2) deactivates the amplifier(s) corresponding to each pixel set P(i) at each time Td(i) (or TT2(i) as the case may be). Pixel readout control logic 2704 operates to provide a readout control signal 2708 to the multiplexer 1710 that operates to (1) select each pixel set P(i) for readout at time TT1(i) (to begin collection from that pixel set) and (2) de-select each pixel set P(i) at time TT2(i) (to stop collection from that pixel set).

Accordingly, FIG. 27 shows an example of how the receiver controller 1810 can control which pixel sets of array 1802 will pass their sensed signals as output in the return signal 1806 to be processed by the signal processing circuit 1820. To facilitate this timing control, the receiver controller 1810 can include a pipeline of time slots that are populated with flags for the different control signals as may be applicable, so that the logic 2702 and 2704 can adjust their respective control signals 2706 and 2708 as may be appropriate as the flags come up as time marches on. By activating pixel sets sufficiently prior to when collection from them is to begin for return detection (in view of Tsettle), the receiver 1400 is better able to support close range return detections. For example, if the receiver 1400 were to wait until TT1 to activate a given pixel set, this would mean that the pixel set would not be ready to begin detection until the time TT1+Tsettle. Given that a typical value of Tsettle is around 1 μsec, this would translate to a minimum detection range of 150 m. By contrast, using the pixel activation technique of FIG. 27, the receiver 1400 can support minimum detection ranges of 0 m.

With an example embodiment, the system begins with the shot list and then chooses a suitable set of Rmin and Rmax values for each shot. Of the five constraints discussed above, all but the second and third constraints discussed above can be resolved based simply on the shot list, knowledge of Tproc, and knowledge of the number (N) of processors 2022 used for load balancing. For example, the third constraint would need access to additional information such as a map to be implemented; while the second constraint would need either probing of the atmosphere or access to weather information to ascertain how air quality might impact the physics of light propagation.

In an example embodiment discussed below for computing desired Rmin, Rmax values, the approach balances the first and fourth constraints using a mathematical framework, but it should be understood that this approach is also viable for balancing the other constraints as well.

FIG. 22 shows an example process flow for assigning Rmin and Rmax values to each shot that is scheduled by the control circuit 106. In this example, the control circuit 106 (e.g., system controller 800) can perform the FIG. 22 process flow. However, it should be understood that this need not necessarily be the case. For example, a practitioner may choose to implement the FIG. 22 process flow within the receiver controller 1810 if desired.

The FIG. 22 process flow can operate on the shot list 2200 that is generated by the control circuit 106. This shot list 2200 defines a schedule of range points to be targeted with the laser pulse shots 122, where each range point can be defined by a particular angle pair {azimuth angle, elevation angle}. These shots can also be associated with a scheduled fire time for each shot.

As discussed above, a number of tradeoffs exist when selecting Rmin and Rmax values to use for detecting each shot. This is particularly the case when determining the detection interval in situations where there is little a priori knowledge about the target environment. Step 2202 of FIG. 22 can assign Rmin and Rmax values to each shot based on an analysis that balances a number of constraints that correspond to these tradeoffs. This analysis can solve a cost function that optimizes the detection intervals based on a number of constraints, including the first constraint discussed above for an example embodiment where the receiver 1400 cannot listen to two returns from two different shots at the same time. Thus it is desirable to optimize the maximum and minimum ranges across a given shot list according to a preset cost function, where inputs to the cost function can involve information from the point cloud data 1404 of previous frames. In general, the cost function can include a multiple range function (e.g., a one-to-many or a many-to-many function) resulting in multiple criteria optimization.

The shot list 2200 that step 2202 operates on can be defined in any of a number of ways. For example, the shot list 2200 can be a fixed list of shots that is solved as a batch to compute the Rmin, Rmax values. In another example, the shot list 2200 can be defined as a shot pattern selected from a library of shot patterns. In this regard, the lidar system may maintain a library of different shot patterns, and the control circuit 106 can select an appropriate shot pattern based on defined criteria such as the environment or operational setting of the lidar system. For example, the library may include a desired default shot pattern for when a lidar-equipped vehicle is traveling on a highway at high speed, a desired default shot pattern for when a lidar-equipped vehicle is traveling on a highway at low speed, a desired default shot pattern for when a lidar-equipped vehicle is traveling in an urban environment with significant traffic, etc. Other shot patterns may include foviation patterns where shots are clustered at a higher densities near an area such as a road horizon and at lower densities elsewhere. Examples of using such shot pattern libraries are described in the above-referenced and incorporated U.S. Pat. App. Pub. 2020/0025887. Step 2202 can then operate to solve for suitable Rmin, Rmax values for each of the shots in the selected shot pattern.

With respect to step 2202, the plurality of criteria used for optimization might include, for example, minimizing the range offset from zero meters in front of the lidar receiver 1400, or minimizing the range offset from no less than "x" meters in front of the lidar receiver 1400 (where "x" is a selected preset value). The cost function might also include minimizing the maximum number of shots in the shot list that have a range beyond a certain preset range "xx". In general, "x" and "xx" are adapted from point cloud information in a data adaptive fashion, based on detection of objects which the perception stack determines are worthy of further investigation. While the perception stack may in some cases operate at much slower time scales, the presets can be updated on a shot-by-shot basis.

The value of optimization of the range buffers (specifically controlling when to start and stop collection of each return) to include multiple range buffers per scan row is that this allows faster frame rates by minimizing dead time (namely, the time when data is not being collected for return detection). The parameters to be optimized, within constraints, include processing latency, start time, swath (stop time minus start time), and row angle offsets. Presets can include state space for the processor 2022, state space for the laser source 102 (dynamic model), and state space for the mirror 110.

Step 2202 solves equations for choosing range buffers (where examples of these equations are detailed below), and then generates the range buffer (Rmin and Rmax values) for each shot return. These operations are pre-shot-firing.

The outer bounds for Rmin and Rmax for each shot return can correspond to the pixel switching times TT1 and TT2, where TT1(k) can be set equal to TT2(k−1) and where TT2(k) can be set equal to TT1(k+1). It will often be the case where it is desirable for the lidar receiver 1400 to turn off the old pixel set at exactly the time the new pixel set is turned on.

A set of constraints used for a state space model can be described as follows, for a use case where two processors 2022 are employed to equally distribute the processing workload by handling alternating returns.

We assume that the signal processing circuit 1820 begins processing data the moment the initial data sample is available (namely, at time TT1(k)). Processor A cannot ingest more data until the processing for Return(k) is cleared, which we can define as Tproc seconds after the previous return detection was terminated. The same goes for Processor B. For ease of conception, we will define Tproc as being one half of the realtime rate of return detection (or faster). We will take TT1(k)=T(k) (where an Rmin of zero is the starting point) to simplify the discussion, although it should be understood that this need not be the case. With the TT1 values set equal to the fire times of their corresponding shots, this means that the shot T(k+1) cannot be fired until the system stops collecting samples from the last shot. In other words, T(k+1)>TT2(k).

Collection for the shot fired at T(k+2) cannot be started unless the previous shot processed by the same processor (e.g., the same even or odd parity if we assume the two processors 2022 alternate return collections). This leads to the second of our two inequalities:

$$T(k+2) - T(k) > 2(TT2(k) - T(k)) \rightarrow$$

$$\frac{T(k+2)+T(k)}{2} > TT2(k), \ \rightarrow TT2(k) \leq \min\left(T(k+1), \frac{T(k+2)+T(k)}{2}\right)$$

If we put together these equations, using ≥≈>, adding relaxation constraints, and using S as a shift operator (where ST(k)=T(k+1), we get.

$$TT2(k) + b_k = ST(k),\ b_k \geq 0,\ \frac{S^2T(k)+T(k)}{2} = TT2(k) + b_k',\ b_k, b_k' \geq 0$$

These inequalities can be re-expressed using matrix notation as shown by FIG. 23A. As noted, S is a shift operator where ST(k)=T(k+1), and $S^2$ denotes a shift from T(k) to T(k+2). TT2 and T are expressed as vectors of dimension B, and b is a positive arbitrary 2N dimensional vector (of relaxation terms, built from shuffled versions of $b_k$, $b_k'$ of size twice that of TT2. In is an n-by-n identity matrix where the diagonal values are all ones and the other values are all zeros; and On is an n-by-n matrix of all zeros. Inequality constraints can be replaced with equality constraints using new entries as we have done here. B can be referred to as a relaxation variable. For example, we can replace x>0 with x+b=0 (where b>0). Note that T is known, and TT2 is our free variable.

The equation of FIG. 23A is a state space equation since it is expressed in terms of relations between past and current values on an unknown value. This can be solved for real valued variables using simultaneous linear inequality solvers such as quadratic programming, which is available with software packages such as MATLAB (available from Mathworks). An example quadratic programming embodiment for the state space model of FIG. 23A is shown by FIG. 23B. In this fashion, at step 2202 of FIG. 22, the control circuit 106 can determine the detection interval data for each of a plurality of laser pulse shots according to a state space equation that is solved using multiple simultaneous inequality constraint equations. This can yield the scheduled shot information 1812 where the schedule of range points to be targeted with laser pulse shots is augmented with associated detection interval data such as pixel set activation/deactivation times and/or Rmin, Rmax values. While these discussions are expressed in terms of TT2 values, it should be understood that these solutions can also work from Rmax values using the relationships discussed above where TT2 can be expressed in terms of Rmax and the shot times.

FIG. 23A expresses all possible detection intervals consistent with the shot list, and FIG. 23B represents one solution amongst these possibilities (where this solution is one that, loosely speaking, performs uniformly well). But, this solution is not necessarily optimal. For example, at a shot elevation that is low, the ground can be expected to be close, in which it case it makes little sense to set TT2 in a fashion that enables long range detection. A toy example can help illustrate this point.

Suppose our shot list has shot times in a sequence of 1 μsec, 2 μsec, 98 μsec, 100 μsec, 102 μsec.

If we have two processors, each of which computes detections at 2*x* realtime, we might have as a solution (where we will assume in all cases that Rmin=0):

| Processor A: | | |
|---|---|---|
| Shot Time: | 1 μsec pulse | 98 μsec pulse |
| Range Interval: | Rmax = 7.3 km | Rmax = 150 m |

| Processor B: | | |
|---|---|---|
| Shot Time: | 2 μsec pulse | 100 μsec pulse |
| Range Interval: | Rmax = 7.3 km | Rmax = 150 m |

While this solution "works", it should be understood that the two large Rmax values (>7 km) would "hog" the processors by making them unavailable for release to work on another return for awhile. This might not be ideal, and one might want to adjust the solution for a smaller Rmax value. There are an almost endless set of reasons why this is desirable because the processors are used for a variety of functions such as: intensity computation, range computation, velocity estimation, bounding box estimation etc.

Accordingly, the inventors also disclose an embodiment that combines mathematical optimization functions with some measure of value substitutions and updating in certain circumstances to arrive a better solution (an example of which is discussed below in connection with FIG. 24).

As another example where range substitutions and optimization updates can improve the solution, suppose the shot list obtained for a particular scenario fires at the following times in units of microseconds, at elevation angle shown respectively:

- Shot Time ($\mu$sec) = {12 40 70 86 101 121}
- Elevation-Angle (degrees) = {−10, −10, 0, 0, 0, 0}

Using the inequality for TT2 above and picking the largest detection interval at each shot, the result for the first four shots is:

$$TT2(1) \leq 40,\ TT2(2) \leq 63,\ TT2(3) \leq 85.5,\ TT2(4) \leq 101$$

This maps to detection intervals (in sec of time) of:

$$\{TT2(k) - T(k)\}_{k=1,2,3,4} = \{28, 23, 15.5, 15\}$$

The sub-optimal nature of this solution arises because it yields large detection intervals at low elevations (where a long detection interval is not needed) and a small detection intervals at the horizon (where elevation angle is zero degrees, which is where a long detection interval is more desirable).

Figure 24:
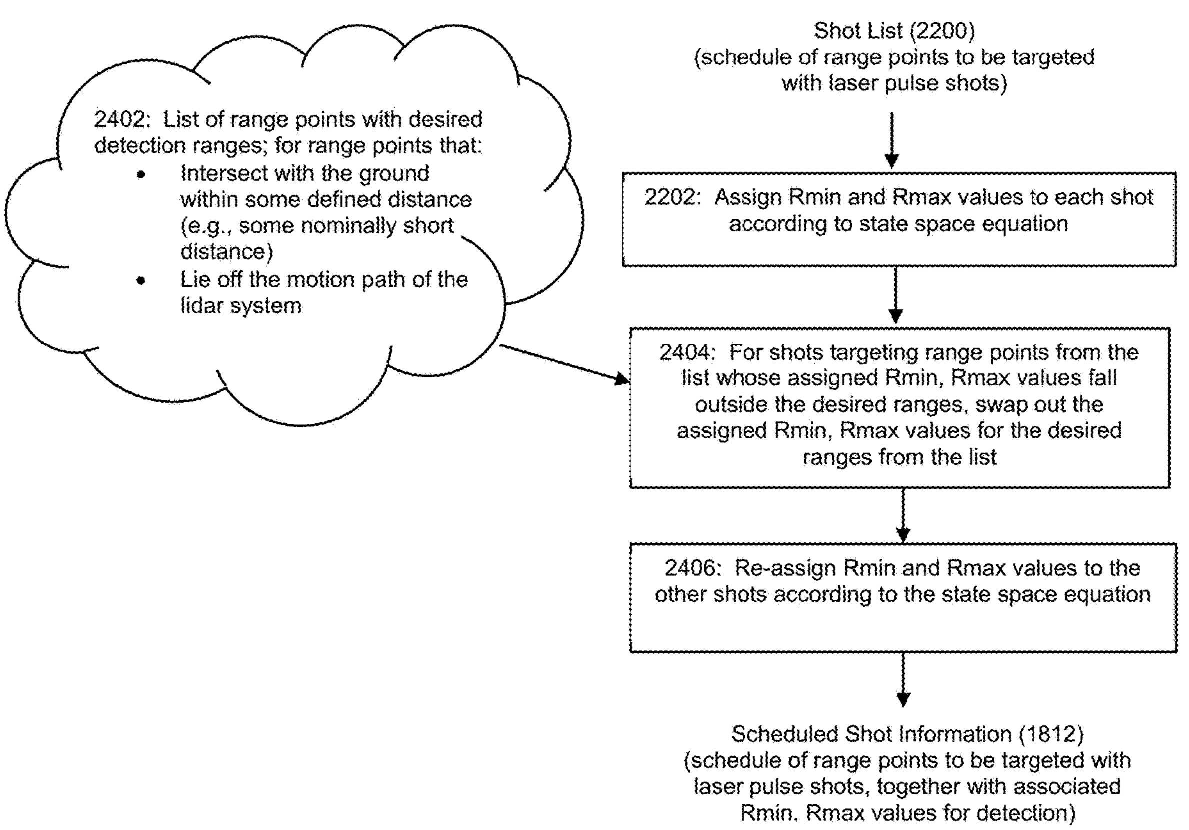
FIG. 24 shows another example process flow for assigning range swaths to return detections for a shot list of laser pulse shots.

As a solution to this issue, FIG. 24 discloses a process flow where the control circuit 106 can swap out potentially suboptimal detection intervals for more desirable detection intervals. As shown by FIG. 24, step 2202 can operate as described in connection with FIG. 22 to generate data corresponding to the detection interval solutions computed in accordance with the models of FIGS. 23A and 23B.

The control circuit 106 can also maintain a list 2402 of range points with desired detection intervals. For example, the list 2402 can identify various shot angles that will intersect with the ground within some defined distance from the lidar system (e.g., some nominally short distance). For a lidar-equipped vehicle, examples of such shot angles would be for shots where the elevation angle is low and expected to be pointing at the road within some defined distance. For these shot angles, the detection interval corresponding to Rmax need not be a large value because it will be known that the shot will hit the ground within the defined distance. Accordingly, for these low elevation angles, the list 2402 can define a desired Rmax or TT2 value that reflects the expected distance to ground. As another example, the list 2402 can identify shot angles that lie off the motion path of the lidar system. For example, for a lidar-equipped vehicle, it can be expected that azimuth angles that are large in absolute value will be looking well off to the side of the vehicle. For such azimuth angles, the system may not be concerned about potential targets that are far away because they do not represent collision threats. Accordingly, for these large absolute value azimuth angles, the list 2402 can define a desired Rmax or TT2 value that reflects the shorter range of potential targets that would be of interest. Range segmentations that can be employed by list 2402 may include (1) shot angles linked to desired Rmax or TT2 values corresponding to 0-50 m, (2) shot angles linked to desired Rmax or TT2 values corresponding to 50-150 m, and (3) shot angles linked to desired Rmax or TT2 values corresponding to 150-300 m.

Then, at step 2404, the control circuit 106 can compare the assigned detection interval solutions produced by step 2202 with the list 2402. If there are any shots with assigned detection interval solutions that fall outside the desired detection intervals from list 2402, the control circuit 106 can then swap out the assigned detection interval for the desired detection interval from list 2402 (for each such shot). Thus, step 2404 will replace one or more of the assigned detection intervals for one or more shots with the desired detection intervals from the list 2402.

The control circuit 106 can then proceed to step 2406 where it re-assigns detection intervals to the shots that were not altered by step 2404. That is, the shots that did not have their detection intervals swapped out at step 2404 can have their detection intervals re-computed using the models of FIGS. 23A and 23B. But, with step 2406, there will be fewer free variables because one or more of the shots will already have defined detection intervals. By re-solving the state space equation with the smaller set of shots, more optical detection intervals for those shots can be computed because there will be more space available to assign to shots that may benefit from longer detection intervals.

For example, we can re-consider the toy example from above in the context of the FIG. 24 process flow. In this example, step 2404 will operate to impose a 50 m value for Rmax on the shots targeting the elevation of −10 degrees. This 50 m value for Rmax translates to around 0.3 sec. This relaxes the −10 degree cases to:

$$TT2(1) = T(1) + 0.3 = 12.3$$

$$TT2(2) = 40.3$$

This means that both processors 2022 are free when Shot 3 is taken at time 70 (where Shot 3 is the first shot at the horizon elevation, whose detection interval we wish to make long). The FIG. 24 process flow can make Shot 3 collect until time 85.5, which frees up a processor 2022 (say Processor A) at time 101, just in time to collect on Shot 5. The next shot begins at time 86, whereupon Processor B is free, and Processor B can process 17.5 μsec of data and still free up before the shot at time 121 arrives.

This yields the following for the toy example with respect to FIG. 24:

- Shot Time ($\mu$sec) = {12 40 70 86 101 121}
- Elevation-Angle (degrees) = {−10, −10, 0, 0, 0, 0}
- Detection Intervals: $\{TT2(k) - T(k)\}_{k=1,2,3,4} = \{0.3, 0.3, 15.5, 17.5\}$ We can see that the FIG. 24 process flow has increased the detection interval for the zero degree elevation shots at the expense of those at −10 degrees in elevation, which provides a better set of detection intervals for the shot list.

Figure 25:
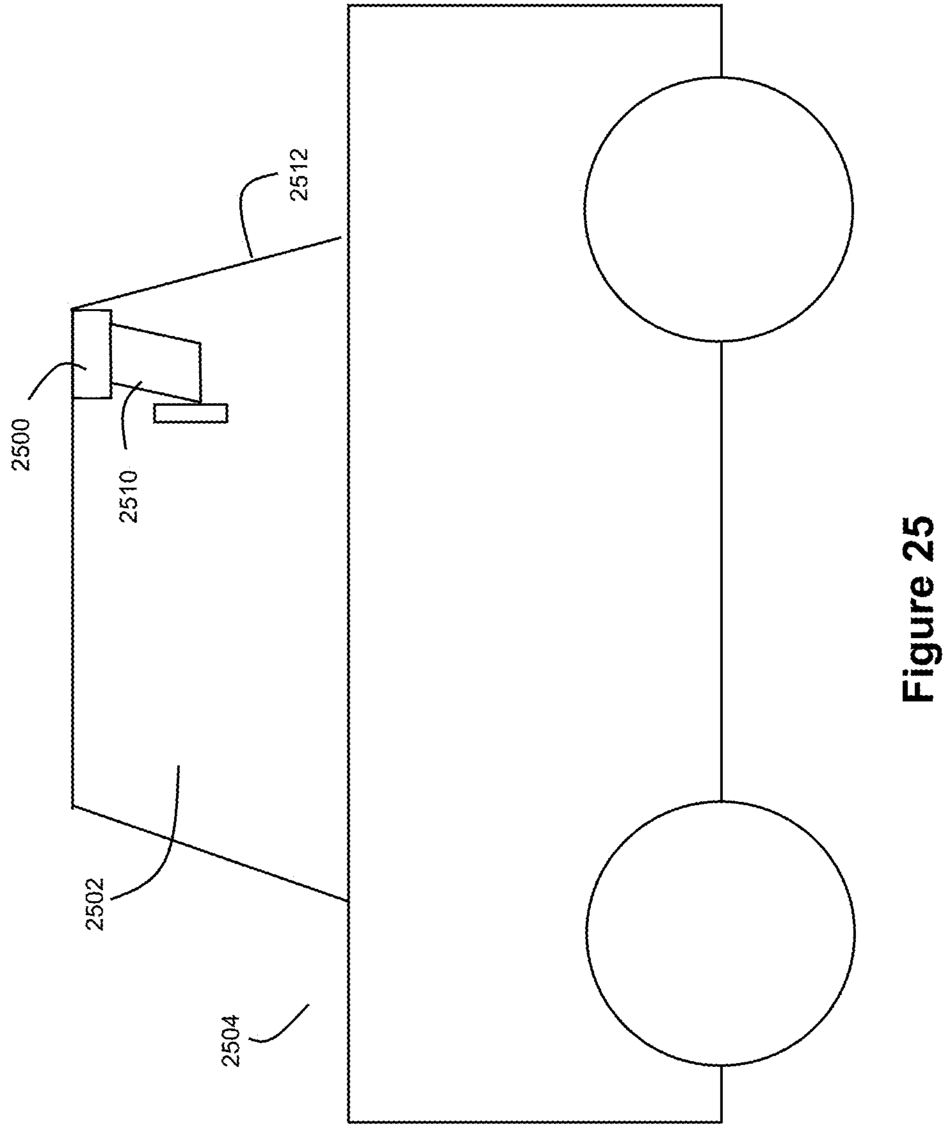
FIG. 25 shows an example where a bistatic lidar system in accordance with an example embodiment is deployed inside a climate-controlled compartment of a vehicle.

Lidar System Deployment:

The inventors further note that, in an example embodiment, the lidar receiver 1400 and the lidar transmitter 100 are deployed in the lidar system in a bistatic architecture. With the bistatic architecture, there is a spatial offset of the field of view for the lidar transmitter 100 relative to the field of view for the lidar receiver 1400. This spatial separation provides effective immunity from flashes and first surface reflections that arise when a laser pulse shot is fired. For example, an activated pixel cluster of the array 1802 can be used to detect returns at the same time that the lidar transmitter 100 fires a laser pulse shot 122 because the spatial separation prevents the flash from the newly fired laser pulse shot 122 from blinding the activated pixel cluster. Similarly, the spatial separation also prevents the receiver 1400 from being blinded by reflections from surfaces extremely close to the lidar system such as glass or other transparent material that might be located at or extremely close to the egress point for the fired laser pulse shot 122. An additional benefit that arises from this immunity to shot flashes and nearby first surface reflections is that it permits the bistatic lidar system to be positioned in advantageous locations. For example, in an automotive or other vehicle use case as shown by FIG. 25, the bistatic lidar system 2500 can be deployed inside a climate-controlled compartment 2502 of the vehicle 2504 (such as the passenger compartment), which reduces operational risks to the lidar system arising from extreme temperatures. For example, the air-conditioning inside the compartment 2502 can reduce the risk of the lidar system 2500 being exposed to excessive temperatures. Accordingly, FIG. 25 shows an example where the bistatic lidar system 2500 is deployed as part of or connected to a rear view mirror assembly 2510 or similar location in compartment 2502 where the lidar system 2500 can fire laser pulse shots 122 and detect returns 1402 through the vehicle's windshield 2512. It should be understood that the components of FIG. 27 are not shown to scale.

Figure 26:
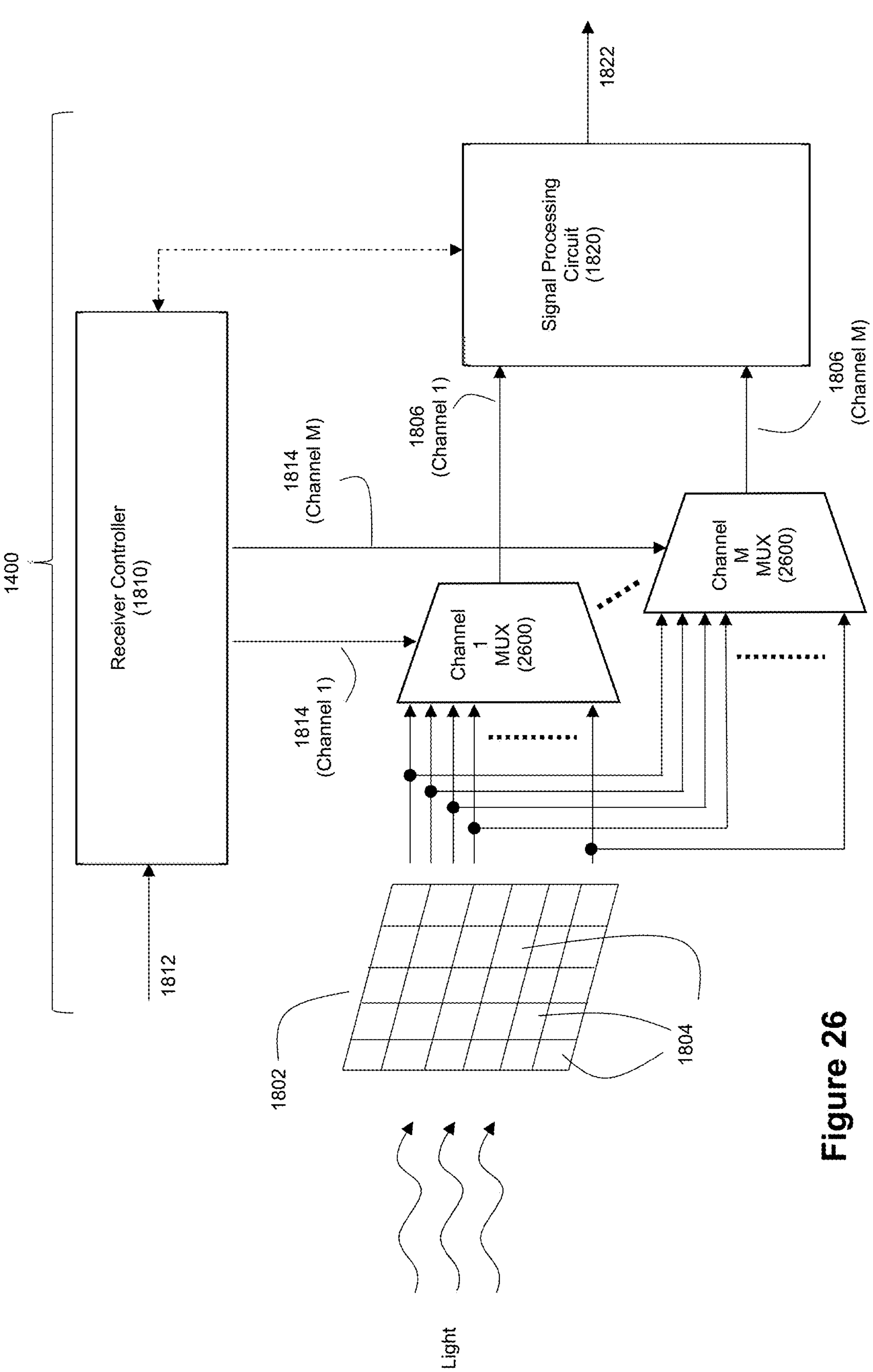
FIG. 26 shows an example embodiment for a lidar receiver which employs multiple readout channels to enable the use of overlapping detection intervals for detecting the returns from different shots.

Multi-Channel Readout for Returns:

For another example embodiment, it should be understood that the detection timing constraint discussed above where the detection intervals are non-overlapping can be removed if a practitioner chooses to deploy multiple readout channels as part of the photodetector circuitry 1800, where these multiple readout channels are capable of separately reading the signals sensed by different activated pixel clusters at the same time. FIG. 26 shows an example receiver 1400 that includes multiple readout channels (e.g., M readout channels). Each readout channel can include a multiplexer 2600 that reads the signals sensed by a given activated cluster of pixels 1804, in which case the lidar receiver 1400 is capable of detecting returns that impact different pixel clusters of the array 1802 at the same time. It should be understood that amplifier circuitry can be placed between the array 1802 and the multiplexers 2600 as described above with reference to FIG. 27 and as described in the above-referenced and incorporated U.S. Pat. Nos. 9,933,513 and 10,754,015. Through the use of multiple readout channels as exemplified by FIG. 26, practitioners can relax the constraint that the detection intervals for detecting returns from different shots be non-overlapping. Among other benefits, this approach can open up possibilities for longer range detections that might otherwise be missed because collections from a first pixel cluster needed to detect the long range return would have stopped so the receiver 1400 could start collection from a second pixel cluster needed to detect a shorter range return. With the approach of FIG. 26, collections from the first pixel cluster can continue for a longer time period, even when collections are occurring from the second pixel cluster through a different readout channel, thereby enabling the detection of the longer range return.

Figure 28:
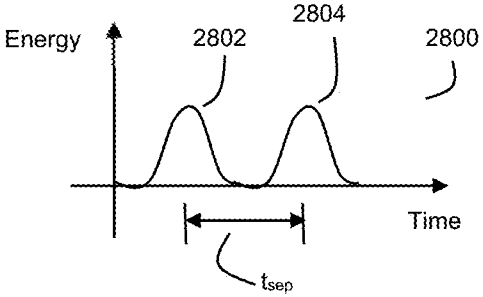
FIG. 28 shows an example pulse burst.

Pulse Bursts to Resolve Angle to Target:

In accordance with another example embodiment, the lidar system can fire pulse bursts. The use of pulse bursts can provide greater precision in resolving an angle to a detected object in the field of view, as explained in greater detail below. With a pulse burst, the lidar transmitter 100 fires multiple laser pulse shots with short time separations between the shots. FIG. 28 shows an example pulse burst 2800 as plotted with respect to energy over time. In the example of FIG. 28, the pulse burst includes two pulses—a first pulse 2802 and a second pulse 2804. Pulses 2802 and 2804 can exhibit a Gaussian pulse shape. The time separation between pulses 2802 and 2804 is expressed as $t_{sep}$. For a pulse burst, this time separation $t_{sep}$ will be short, namely a time separation value in a range between 100 nsec and 10 μsec. For example, a preferred time separation can be a value in a range between 200 nsec and 500 nsec. While FIG. 28 shows an example where the first pulse 2802 and second pulse 2804 have roughly equal energies, it should be understood that this need not be the case. In some circumstances, the second pulse 2804 may exhibit a lower energy than the first pulse 2802 due to the short charging time for the laser source 102 during the time separation $t_{sep}$ between the shots. However, some practitioners may employ techniques such as those described below with respect to FIG. 35 to roughly equalize the energies of pulses 2802 and 2804 via adjustable control of seed energy for the laser source 102.

Figure 29:
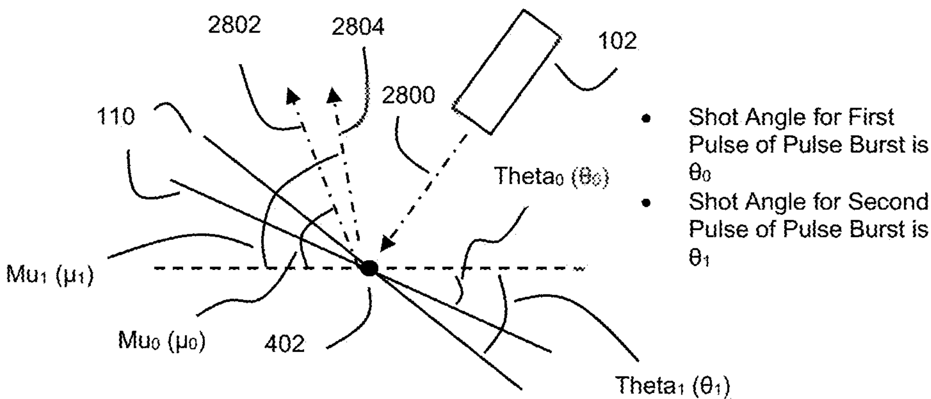
FIG. 29 shows an example of how mirror motion causes the pulses of a pulse burst to be directed toward different shot angles.

FIG. 29 shows how mirror motion can cause the pulses 2802 and 2804 of a pulse burst 2800 to be directed at different shot angles. In the example of FIG. 29, mirror 110 can scan as discussed above, and when laser source 102 fires the pulse burst 2800, the first pulse 2802 will strike the mirror 110 when the mirror 110 is at a tilt angle of $\theta_0$. This results in the first pulse 2802 being directed at a shot angle of $\mu_0$. The second pulse 2804 will strike the mirror 110 a short time later, when the mirror 110 is at a tilt angle of $\theta_1$. This results in the second pulse 2804 being directed at a shot angle of $\mu_1$. Due to the short time separation between pulses 2802 and 2804, the angular separation between the pulses 2802 and 2804 will also be small.

The lidar system can leverage this small angular separation between pulses 2802 and 2804 to more precisely resolve the shot angle to an object detected in the field of view. When the lidar system detects a return from a laser pulse shot fired at a given shot angle, there will be some level of uncertainty about the precise shot angle to the object from which the return was received. This is because there will be a spreading of pulse energy as the laser pulse shot propagates toward the object. If the object is located precisely at the shot angle, the maximum amount of shot energy will strike the object and reflect back to the lidar receiver 1400. However, if the object is located slightly off the shot angle, it may still receive some of the energy of the laser pulse shot and reflect it back to the lidar receiver 1400 to produce a return detection. Accordingly, there is some level of angular imprecision when detecting a return from a single laser pulse shot. This angular imprecision is due to the fact that the intensity is unknown because, as is usually the case, we cannot separate the contribution of the reduced energy from intensity weakness versus angle offset. For example if we "expect" a 1 nJ pulse return but instead get 0.8 nJ, we do not know if (1) our object is 80% of the anticipated reflectivity or (2) the reflectivity is as we anticipated, but the angle offset decremented the received value by to 80% of the original value. The use of the pulse burst as described herein can provide the system with the additional measurements to reduce this uncertainty.

Figure 30:
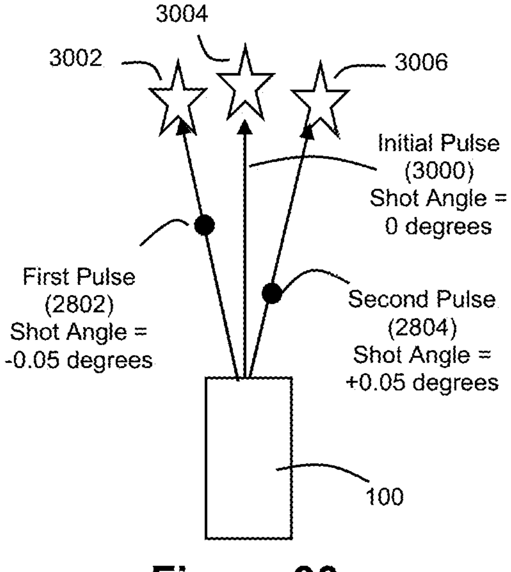
FIG. 30 shows an example of how a pulse burst can be used to resolve an angle to a target detected by an initial laser pulse shot.

As noted, the use of pulse bursts can help resolve much of this angular imprecision. FIG. 30 shows an example where the pulse burst 2800 is used to help resolve a shot angle to an object. In the example of FIG. 30, an initial laser pulse shot 3000 is fired at an initial shot angle (which we will set at 0 degrees for ease of explanation). The lidar receiver 1400 detects a return from shot 3000, which means that the initial shot angle can serve as a candidate position 3004 for the detected object. In response to this detection, the lidar system can then fire the pulse burst 2800 at shot angles which surround the initial shot angle, where one of the pulses of the pulse burst 2800 is fired just to the left of the initial shot angle and the other of the pulses of the pulse burst 2800 is fired just to the right of the initial shot angle. In the example of FIG. 30, the first pulse 2802 of the pulse burst 2800 can be fired at a shot angle of −0.05 degrees while the second pulse 2804 of the pulse burst 2800 can be fired at a shot angle of +0.05 degrees. Returns from the shots for pulses 2802 and 2804 can establish candidate positions 3002 and 3006 respectively for their respective shot angles. While the example of FIG. 30 shows the shot angles of pulses 2802 and 2804 as being offset from the initial shot angle by 0.05 degrees, it should be understood that other offsets from the initial shot angle could be employed. For example, a practitioner may find it desirable to fire the pulses of the pulse bursts at shot angles that are offset from the initial shot angle by values in a range between 0.025 degrees and 0.1 degrees. While the example angle resolution embodiments discussed herein are focused on resolving the azimuth angle to the detected object, it should be understood that similar techniques could be employed for resolving elevation angle if desired. That said, in a lidar system which has dual axis scan with one axis resonant, the resonant axis will be the axis of choice for pulse bursts simply because the time before revisit to an object would be much faster.

The lidar system can then use the returns from the initial laser pulse shot 3000 and the pulse burst 2800 to more precisely resolve the angle to the detected object. In this context, the initial laser pulse shot 3000 and the pulses 2802 and 2804 can be fired sufficiently quickly relative to the closing speed of the object that any change in range to the object during the time from the initial laser pulse shot to the shot for the second pulse 2804 will be negligible; in which case the range value for the returns from all three shots can be deemed equal. Given the preferred operational ranges for mirror scan frequency as discussed above and typically expected velocities for objects in the field of view, it can be expected that this assumption of negligible changes in range for the object over the course of the three laser pulses shots will be accurate. However, in situations where the time duration covered by the three laser pulse shots is sufficiently long (relative to the object's closing speed) that the change in range for the object over this time is not negligible, the pulse burst can still help resolve angular precision to the object if the object's closing speed is known. With knowledge of object speed, range offsets can be determined, and the effects of object motion can be removed from the angular resolution process. Similarly, if the object is relatively stationary, but the lidar system itself is moving at a high rate of speed, knowledge of the lidar system's speed can be used to offset range changes to allow for higher precision angular resolution via pulse bursts. As an example, suppose a target has a closing speed of 50 m/s (corresponding to two vehicles on approach at 100 kph each). Suppose the time between pulses in a dual pulse burst is 1 msec. In that time the object has moved 5 cm. Now suppose in the first shot, at angle −0.05 degrees, we get two returns, at 100 m and 101.15 m, and in the second shot at angle +0.05 degrees, we get two returns at 102 m and 101.1 m. We proceed by first imposing a range offset on the first shot, based in our knowledge that closing speed imposes a shift of 5 cm, so now we are comparing: {99.95 m, 101.1 m} to {101.95 m, 101.1 m}. In this instance, clearly the second element in each shot corresponds to the same target, while the first element corresponds to some other object present in each beam solely.

Figures 31, 32A, 32B:
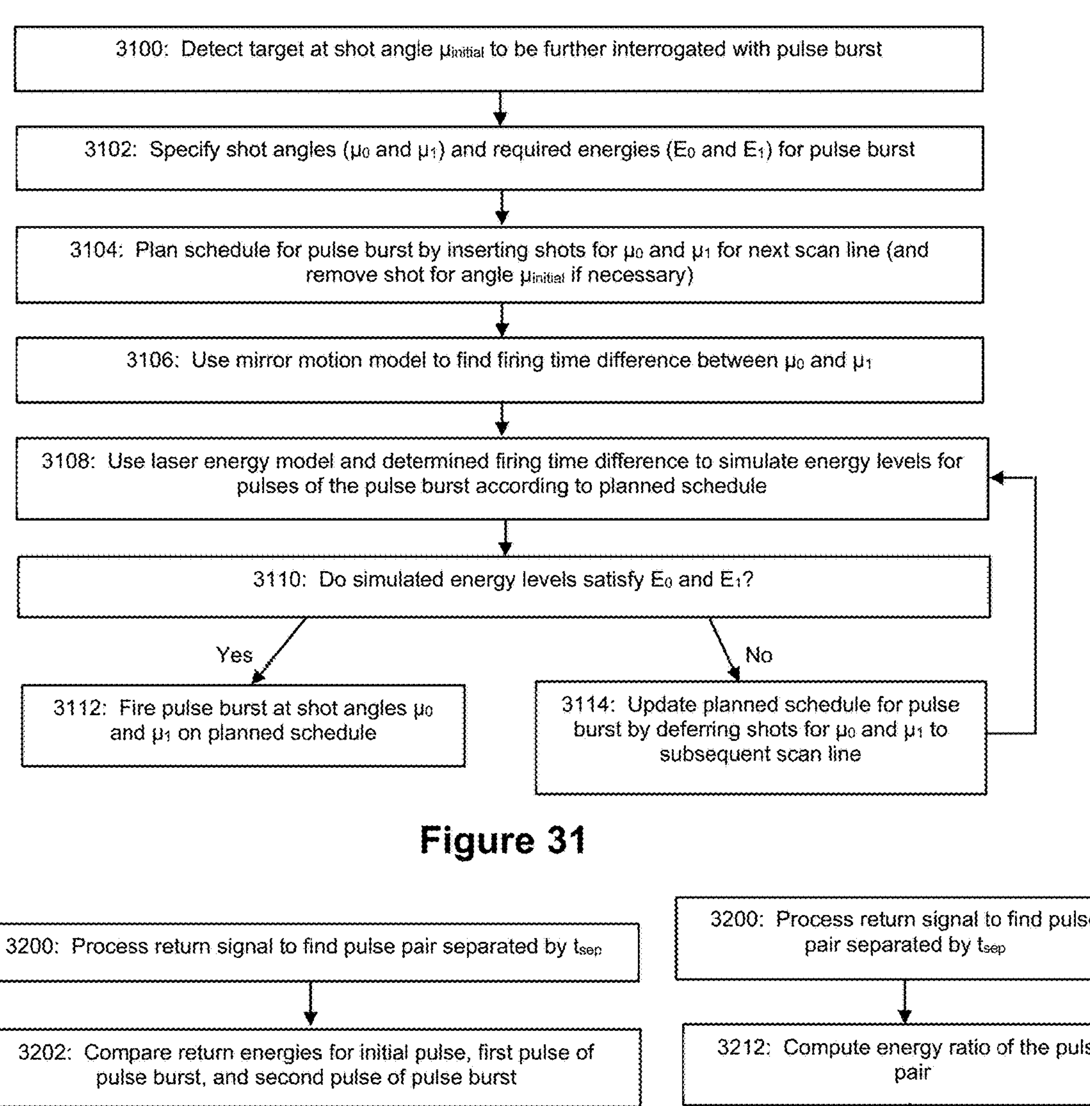
FIG. 31 shows an example process flow for pulse burst firing.
FIGS. 32A and 32B show example process flows for return processing with respect to a pulse burst to more precisely resolve an angle to target.

FIG. 31 shows an example process flow for controlling the firing of pulse bursts in response to object detections, and FIGS. 32A and 32B show example process flows for return signal processing to more precisely resolve the angle to the detected object based on the returns from the pulse burst.

At step 3100 of FIG. 31, the lidar receiver 1400 detects an object (the target) with a return from a laser pulse shot fired at a shot angle of $\mu_{initial}$. This laser pulse shot can serve as the initial pulse for angle resolution, and it can also be referred to as the previous laser pulse shot with respect to the subsequent pulse burst discussed below. As an example, the lidar transmitter 100 can fire the initial laser pulse shot when the lidar system is operating according to a baseline scan pattern, such as a scan pattern where laser pulse shots are fired at defined time intervals (such as a new laser pulse shot every 1 μsec). Another example of a baseline scan pattern can be shot pattern corresponding to a software-defined frame such as any of those described in U.S. Pat. No. 11,002,857, the entire disclosure of which is incorporated herein by reference (e.g., a foviation shot pattern, a region of interest shot pattern, etc.).

From the return detected at step 3100, the system will know (1) a range to the detected target, (2) the initial shot angle for the detected target, and (3) the return energy from the initial pulse. This target can then be interrogated with a pulse burst 2800 to better resolve the angle to the target, in which case the lidar transmitter 100 can switch from the baseline scan pattern to a pulse burst mode where the pulse burst 2800 is fired at the detected target. With the pulse burst, the time separation between laser pulse shots will be significantly shorter than the time separation between laser pulse shots when operating according to the baseline scan pattern. This decrease in time separation between pulse shots for the pulse burst mode may be an increase in a range of 10× to 100× relative time separation between pulse shots for the baseline scan mode. Thus, in an example where the baseline scan pattern separates laser pulse shots by 10 μsec, the pulse burst mode can then separate the pulses 2802 and 2804 of the pulse burst by 100 nsec for an example where a 100× reduction in pulse separation is achieved. In another example, where the baseline scan pattern separates laser pulse shots by 2 μsec, a 10× factor reduction leads to a time separation between pulses 2802 and 2804 of the pulse burst 2800 equal to 200 ns.

The decision to further interrogate the target can be made by control circuit 106. For example, in an automotive use case, the control circuit 106 can communicate with the vehicle's motion planning control system, and the motion planning control system may include control laws that decide which targets are worthy of further interrogation. For example, if the motion planning control system predicts that an incoming target has a sufficiently high probability of posing a collision threat on a current motion planning trajectory, the target can be slated for further interrogation via a pulse burst. Examples of coordination between a lidar system and a vehicle motion planning control system are described in U.S. Pat. No. 10,495,757, the entire disclosure of which is incorporated herein by reference.

At step 3102, the control circuit 106 specifies the shot angles and energies to use for the pulses 2802 and 2804 of the pulse burst 2800. The shot angle and energy for pulse 2802 can be specified as $\mu_0$ and $E_0$ respectively. The shot angle and energy for pulse 2804 can be specified as $\mu_1$ and $E_1$ respectively. Shot angles $\mu_0$ and $\mu_1$ can be centered around the initial shot angle initial so that they effectively surround the initial shot angle $\mu_{initial}$. A number of factors can impact the choices available for specifying the shot angles for the pulses 2802 and 2804 of the pulse burst. For example, the specified shot angles should be selected so that the shot angles for pulses 2802 and 2804 are expected to stay on the target. Accordingly, the specified shot angles should not be too far off the initial shot angle to reduce the risk of missing the target with pulses 2802 and 2804. Another factor that can affect the choice of specified shot angles for pulses 2802 and 2804 would be the angular spacing of the shot list according to the baseline scan pattern. In this regard, the specified shot angles should be less than the angular spacing of the baseline scan pattern because the goal of the pulse burst is to add angular precision to the target than the baseline scan pattern would otherwise provide. At the other end of the spectrum, the minimum angular spacing can be impacted by the ability to discriminate angular resolution above noise levels. In this regard, a likely minimum for the specified shot angles relative to the initial shot angle would be around plus or minus 0.025 degrees as smaller angular spacing would erode the ability to rely on the conclusions that can be drawn from the angle refinements due to noise. In consideration of these factors, in an example embodiment, the shot angles for pulses 2802 and 2804 can be a value that is a range of around plus or minus 0.025 degrees to plus or minus 0.1 degrees relative to the initial shot angle. The choice of shot energies $E_0$ and $E_i$ for the pulses 2802 and 2804 of the pulse burst 2800 can be based on the expected range to the target (where the energies are set sufficiently high to be able to detect returns from the target at the expected range).

The control circuit 106 can then, at step 3104, schedule for this pulse burst 2800 by inserting shots for $\mu_0$ and $\mu_1$ for a subsequent scan line (e.g., the next return scan from the scan that produced the detection at step 3100). If this subsequent scan line previously had a shot for $\mu_{initial}$ scheduled, step 3104 can also remove the shot for $\mu_{initial}$ from the schedule. In a preferred embodiment, the pulse burst 2800 is scheduled to be fired between 30 μsec and 100 μsec after the initial laser pulse shot is fired.

The control circuit 106 can then evaluate whether the planned schedule for the specified pulse burst 2800 can be accomplished during the subsequent scan line in view of the laser energy model 108 and the mirror motion model 308. At step 3106, the control circuit 106 uses the mirror motion model 308 to find the time difference between pulses 2802 and 2804 of the specified pulse burst 2800. It should be understood that this time difference would correspond to the value $t_{sep}$ discussed above with respect to FIG. 28. As noted above, the mirror motion model 308 can predict the time slot at which the subject mirror 110 will direct shots at a specified shot angle. Thus, by computing the time slots for shots at shot angles of $\mu_0$ and $\mu_1$, the control circuit 106 can compute the time difference between these pulses 2802 and 2804 as the difference between the two time slots. Knowledge of this time difference allows the control circuit 106 to also determine how much energy is available in the laser source 102 for the second pulse 2804.

Thus, at step 3108, the control circuit 106 uses the laser energy model 108 and the determined time difference from step 3106 to simulate the energy levels for pulses 2802 and 2804 according to the planned schedule. The control circuit 106 can use the computed time difference from step 316 as the value of the time duration δ that represents the time between the firing of pulse 2802 and the firing of pulse 2804. Accordingly, the laser energy model 108 can be used to determine the energy levels that the lidar system can produce for pulses 2802 and 2804 according to the planned schedule.

At step 3110, the control circuit 106 compares these determined energy levels with the specified energy levels of $E_0$ and $E_1$ for pulses 2802 and 2804 respectively. If the determined energy levels for pulses 2802 and 2804 satisfy $E_0$ and $E_1$, then the process flow can proceed to step 3112. At step 3112, the lidar transmitter 100 fires the specified pulse burst 2800 according to the planned schedule. However, if the determined energy level for pulse 2802 does not satisfy $E_0$ and/or the determined energy level for pulse 2804 does not satisfy $E_1$, then the process flow would proceed from step 3110 to step 3114. At step 3114, the control circuit 106 updates the planned scheduled for the specified pulse burst 2800 by deferring the pulse burst 2800 to a subsequent scan line (e.g., the next scan line after the scan line defined at step 3104 and evaluated at steps 3106-3110). It should be understood that the order of pulses 2802 and 2804 can be flipped as a result of the deferral in view of the reverse scan direction exhibited by the next scan line. A practitioner may choose to make this next scan line a scan line set aside specially for the pulse burst to ensure that the laser source 102 will have sufficient energy available for $E_0$ and $E_1$. From step 3114, the process flow can return to step 3108 where the laser energy model 108 is consulted to simulate the energy levels for the newly scheduled pulse burst 2800. In this fashion, the control circuit 106 will eventually find the proper time to fire the pulse burst at step 3112.

Once the pulse burst 2800 has been fired, the lidar receiver 1400 can then process the returns from this pulse burst 2800 to more precisely resolve the angle to target. FIGS. 32A and 32B show examples of different options for such return processing. The lidar receiver 1400 can perform the process flows of FIGS. 32A and 32B using signal processing circuit 1820 (e.g., a processor within the signal processing circuit 1820).

The FIG. 32A process flow describes a first technique for resolving the angle to the target. At step 3200 of FIG. 32A, the lidar receiver 1400 processes the return signal 1806 corresponding to the pulse burst 2800 to find a pulse pair within the return signal 1806 that is separated by $t_{sep}$. This pulse pair in the return signal 1806 would correspond to the returns from pulses 2802 and 2804, and the lidar receiver 1400 can determine the energy levels for the returns.

At step 3202, the lidar receiver 1400 then compares the return energies for the initial pulse (known from step 3100), the first pulse 2802 of the pulse burst 2800 (known from step 3200), and the second pulse 2804 of the pulse burst (known from step 3200). If the return energy from the initial pulse is the largest, this means that the initial shot angle serves as a good approximation of the angle to the target and can be used to reflect the angle to the target (step 3204). If the return energy from the first pulse 2802 is the largest, this means that the lidar receiver can resolve the target angle in the direction of the shot angle for the first pulse 2802 ($\mu_0$) (see step 3206). As an example, the lidar receiver can use the first pulse shot angle $\mu_0$ as the target angle (or some value between the first pulse shot angle $\mu_0$ and the initial shot angle initial). If the return energy from the second pulse 2804 is the largest, this means that the lidar receiver can resolve the target angle in the direction of the shot angle for the second pulse 2804 ($\mu_1$) (see step 3208). As an example, the lidar receiver can use the second pulse shot angle $\mu_1$ as the target angle (or some value between the first pulse shot angle $\mu_1$ and the initial shot angle initial).

If still more precision is desired for resolving the angle to the target, a technique such as the process of FIG. 32B can be employed. Step 3200 of FIG. 32B can operate in the same manner as step 3200 of FIG. 32A, to thereby detect the return energies for the first and second pulses 2802 and 2804 of the pulse burst. At this point, the lidar receiver 1400 can compute the target angle using the technique discussed below.

FIG. 33A shows a plot of expected return energy from a laser pulse shot that strikes a target as a function of an offset angle to the target (for an example where the laser pulse shot exhibits a Gaussian pulse shape). This plot will have the same basic shape as the laser pulse shot itself. The offset angle in this context is the difference between the shot angle and the true angle to the target. Thus, if the shot angle happens to be the true angle to the target, then the offset angle would be zero (and the return energy would be at a maximum). However, as the offset angle increases in value (in either the positive or negative direction), the return energy will decrease as shown by the plot of FIG. 33A.

The lidar receiver 1400 can leverage the relationship shown by the plot of FIG. 33A to better resolve the angle to the target by determining a fit of the determined return energy levels for pulses 2802 and 2804 to this curve. For example, FIG. 33B shows an example where return 3302 from pulse 2802 falls just to the left of the return energy peak and where return 3304 from pulse 2804 falls just to the right of the return energy peak. In this scenario, the lidar receiver 1400 can use the midpoint of these returns as the offset angle for the object, in which case it should be understood that the initial shot angle would serve as the true angle (given that pulses 2802 and 2804 are equally offset from the initial shot angle). FIG. 33C shows an example where the pulse burst returns 3302 and 3304 fall on the curve to the right of the peak return energy. In this case, the true angle would fall to the right of the initial shot angle (presuming the rightward direction corresponds to a positive offset angle). FIG. 33D shows an example where the pulse burst returns 3302 and 3304 fall on the curve to the left of the peak return energy. In this case, the true angle would fall to the left of the initial shot angle (presuming the leftward direction corresponds to a negative offset angle).

However, while the shape of the FIG. 33A plot is known (due to knowledge of the pulse shape), the scale of the FIG. 33A plot will be unknown. Accordingly, curve fitting techniques can be used to find out where given pulse returns fall on the FIG. 33A plot. To facilitate such curve fitting, at step 3212 of FIG. 32B, the lidar receiver 1400 can compute the energy ratio of the return energies for the pulse pair. This ratio can be computed by taking the difference of return intensities and dividing that difference by the sum of the return intensities. Thus, if the return energy from pulse 2802 is A, and the return energy from pulse 2804 is B, the energy ratio can be computed as:

$$\text{Energy Ratio} = \frac{A - B}{A + B}$$

Figure 34:
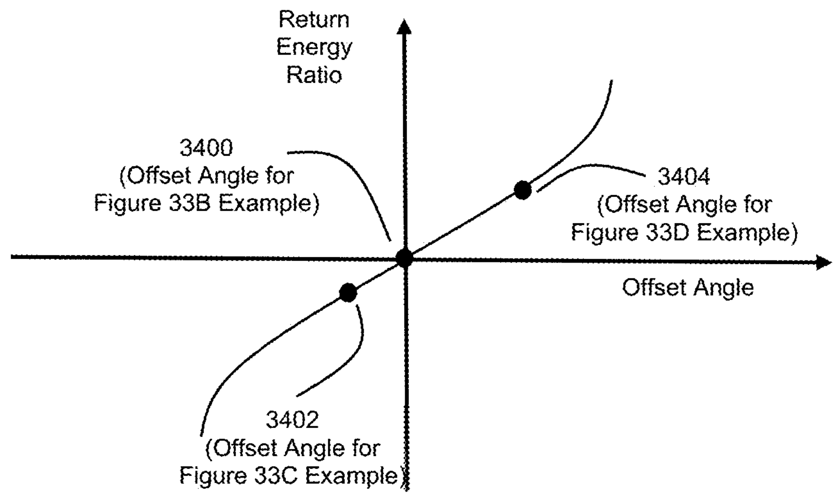
FIG. 34 shows an example of how a plot of the derivative of the shot return intensity shown by FIGS. 33A-33D versus offset angle can be used to resolve the offset angle based on the return intensities from the pulse burst.

To translate the FIG. 33A plot to a scaleless relationship, the derivative of the return energy can be plotted as a function of offset angle as shown by FIG. 34. With this relationship, the y-axis of the FIG. 34 plot corresponds to the computed energy ratio. Accordingly, at step 3214, the lidar receiver 1400 can determine the offset angle for the pulse burst based on where the computed energy ratio from step 3212 falls on the FIG. 34 plot. FIG. 34 shows an offset angle 3400 that corresponds to the FIG. 33B example of pulse burst returns, an offset angle 3402 that corresponds to the FIG. 33C example of pulse burst returns, and an offset angle 3404 that corresponds to the FIG. 33D example of pulse burst returns. Given that the pulse shape is known, this means that the FIG. 34 plot can also be known in advance. Accordingly, the plot of FIG. 34 can be represented as a lookup table (LUT) where different offset angles are indexed by different energy ratio values. Thus, at step 3214, the lidar receiver 1400 can determine the subject offset angle for the pulse burst by looking up the offset angle from the LUT that corresponds to the computed energy ratio from step 3212. If there is not an entry in the LUT for the precise energy ratio computed at step 3402, the lidar receiver 1400 can use interpolation to find the offset angle based on the offset angles of the energy ratios immediately larger and smaller than the computed energy ratio.

At step 3216, the lidar receiver 1400 can then resolve the angle to the target based on the shot angle of the initial laser pulse shot and the determined offset angle from step 3214. In this regard, the refined angle to target can be computed as the sum of the initial shot angle ($\mu_{initial}$) and the determined offset angle.

With FIGS. 32A and 32B, the refined angle to the target can be reported to the point cloud along with a corresponding range value applicable to the subject pulse shots. If desired, a practitioner need not have the point cloud register all three returns (from the initial laser pulse shot, pulse 2802, and pulse 2804). Instead, the point cloud may conflate the three returns to the refined target angle, along with a corresponding range value and some aggregation of the return energies from the shots (e.g., a weighted average of the return intensities from the shots).

Furthermore, the three returns may be used by the system to update velocity information. For example, if the ranges are offset by an amount exceeding that anticipated variation from random noise fluctuation, then one might attribute this difference to the presence of a true range offset. The lidar receiver 1400 can then apply this range offset, in reverse of the previously described range alignment process, to derive velocity information for the target.

Variable Laser Seed Energy to Control Pulse Burst Energies:

The examples of FIGS. 32A and 32B presume that the energies of pulses 2802 and 2804 have been roughly equalized in the transmitted pulse burst 2800. However, this need not be the case. In the event that there is a mismatch in energy between pulses 2802 and 2804 (e.g., where pulse 2804 may have lower energy), the lidar receiver 1400 can employ scaling to normalize the return energy from the second pulse 2804 to the energy level of the first pulse 2802. This scaling can proceed as follows. Suppose the system knows the first pulse 2802 when fired had twice the energy of the second pulse 2804. The lidar receiver can then divide the first pulse return intensity measurement by 2 before computing the sum and difference. Conversely, if pulse 2804 had 50% less energy than pulse 2802, then when computing the energy ratio at step 3212, the lidar receiver can double the value of B (or halve the value of A) to compensate for the lesser energy in the second pulse 2804. Similar scaling can be used when comparing the return energies at step 3202. The system can thus isolate and remove all dependencies except angle offsets so that it can attribute the angle offsets alone to accounting for the change in intensity returns between pulse burst shot returns.

Figure 35:
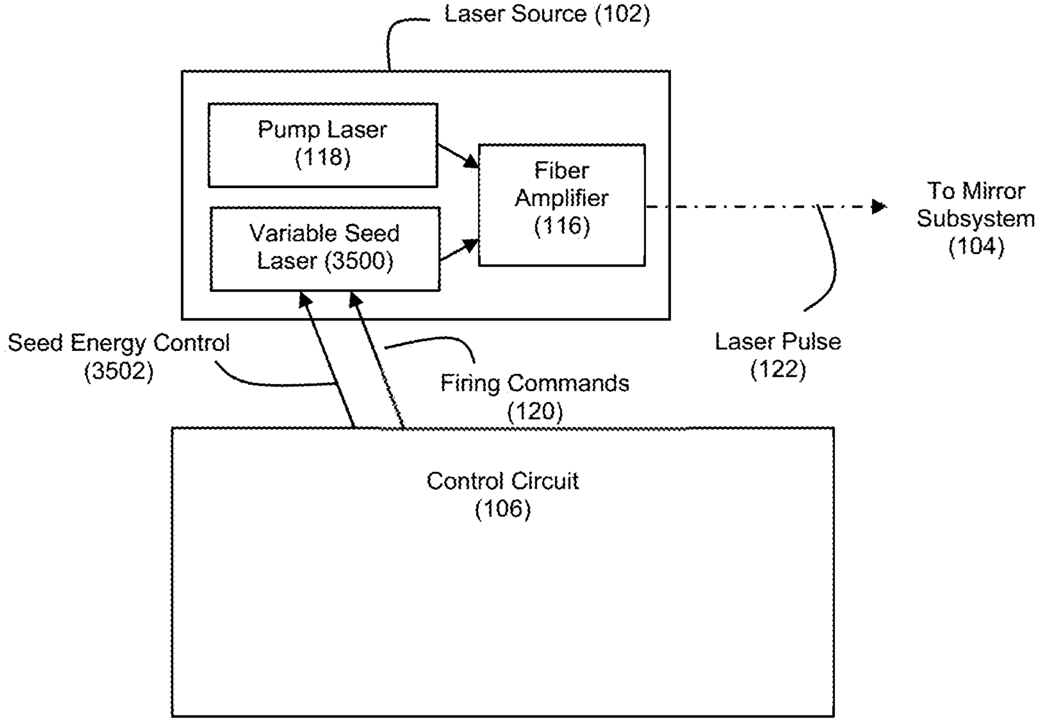
FIG. 35 shows an example laser source where seed energy can be controlled to equalize the energies within the pulses of a pulse burst.

FIG. 35 shows an example laser source 102 that uses adjustable seed energy to regulate the energy levels in the pulses of a pulse burst. The laser source 102 of FIG. 35 can be an optical amplification laser source that comprises an optical amplifier 116, pump laser 118, and variable seed laser 3500. As an example, the optical amplification laser source can be a pulsed fiber laser source where the optical amplifier 116 is a fiber amplifier. The control circuit 106 can then provide a seed energy control signal 3502 to the variable seed laser 3500 to regulate the energy levels in the pulses of a pulse burst.

While one can adjust the pump energy over time, this is not a fast enough process for pulse bursts (where typical switching times will be on the order of many microseconds). This is because the pulse burst must be fired quickly to remain consistent with the mirror speed. For example a typical mirror velocity with respect to example embodiments discussed above is a degree per microsecond, and a typical pulse burst angle offset is 0.1 degrees. This translates into a need to fire the shots of the pulse burst at 100 nanosecond timescales.

To accommodate this need, the control circuit 106 can change the energy in the variable seed laser 3500 for the shots of the pulse burst.

Suppose we have a pump laser 118 that produces 1 W of energy in the optical amplifier 116 (which might be a doped fiber laser amplifier for example). If we fire two shots spaced by 100 nanoseconds, and we have a gain factor of a in the fiber amplifier 116; then the energy in each pulse shot of the pulse burst, after a prior delay of T=1 μsec with stored energy E=1 μJ is given in units of μJ by:

$$E_1 = \alpha E + (1-\alpha)T = 1$$

$$E_2 = (1-\alpha)(.1) + 1 = 1.1 - .1\alpha$$

It should be understood that without adjustable control over the seed energy, the laser source 102 cannot make the two pulses in a pulse burst have equal energy due to the time constraints of charging the laser balanced against the short time interval between pulses of the pulse burst. But, we can equalize the pulse energies in the pulse burst if we can change the gain factor α. In this simple toy example α=1.0.

Physically changing the gain for fixed pump power is achieved by adjusting the seed energy. The reason such adjustment of the seed energy adjusts the gain is that the role of the seed laser 3500 is to stimulate the electrons in the excited energy states in the fiber amplifier 116 to collapse to the ground state. The more energy in the seed, then the stronger the electric field and the more likely that ground state collapse-induced photon emission occurs.

The expression below defines the relationship between pulse energy and seed gain adjustments as follows:

$$E_n = \left(\left(\frac{A_{new}}{A_{old}} - kA_{new}\right)E_{n-1} + A_{new}kt_n\right)$$

In this equation:

n is the index associated with the n-th shot being fired.

$t_n$ is the time difference between shots at index n−1 and index n.

E is the energy in the shot corresponding to its index.

k is a "gain factor", and it corresponds to the gain term when the seed pulse energy is set to the "normal" level.

$A_{new}$ and $A_{old}$ are the current and prior seed gain levels (corresponding to different seed pulse energy levels for a fixed pump energy level). The values for A can range from Ak being (nearly) zero to 1. The reason for the [0,1] range is as follows.

When the gain Ak is 1, the entire energy in the optical amplifier 116 is expunged ($E_n$=$t_n$).

When $A_k$~0 the energy fired by the laser source 102 no longer depends on the charge time and is roughly constant. Note that the value of A can be bigger or smaller than unity depending on need, as long as the value of Ak lies in these bounds.

Note that when $A_{new}$ and $A_{old}$ are both equal to 1 we get:

$$E_n = E_{n-1}(1-k) + kt_n$$

Note that this is same as in laser energy model 108 discussed above for the expression EF(t+δ), but where $t_n$ is used in place of δ and where k is used in place of a. But, for the purpose of explaining the variable seed gain, it is useful and makes algebra simpler to work with this new notation.

We can assure that the seed energy is varied to achieve the two shots in the pulse burst having equal energy. We will describe this process in mathematical detail below.

To start, let the energy in the initial pulse shot (the shot prior to the pulse burst) be E. Next, let $t_{sep}$ be the time between the pulse shots of the pulse burst, and let T be the time before the first pulse shot of the pulse burst.

We will pursue the math using a toy example. To begin we assume when we fire at time T, we had full pump level ($A_{old}$=1). Moreover, we can set values for T, $t_{sep}$, E, and k as follows:

$$T = 10$$

$$t_{sep} = 2$$

$$E = 4$$

$$k = \frac{1}{2}$$

Next, let x=$A_{new}$ and y=$A'_{new}$, where $A_{new}$ and $A'_{new}$ denote the seed gain at the first and second pulse shots of the pulse burst respectively. We can also denote the corresponding energies for the first and second pulse shots of the pulse burst as $E_{1st}$ and $E_{2nd}$ respectively. Using the expression for $E_n$ discussed above, this yields:

$$2x + 5x = E_{1st}$$

$$y\left[\left(\frac{1}{x} - \frac{1}{2}\right)[2x+5] + x\right] = E_{2nd}$$

We then seek to make the energies equal:

$$y\left[\left(1 - \frac{x}{2}\right)[2x+5] + x\right] = 7x^2$$

This yields a quadratic formula that gives us the expression for the seed gain:

$$0 = x^2(7+y) + x\left(-\frac{y}{2}\right) - 5y \rightarrow \frac{y}{4(7+y)} \pm \frac{\sqrt{y^2 + 5y(7+y)}}{2(7+y)} = x,$$

$$E_{1st} = E_{2nd} = E = 4 = 7x$$

Here, we assume we wish to keep the generated pulse energy after optical amplification equal to the original (at 10× less charge time), and the solution is:

$$x = \frac{4}{7} = A_{new}$$

$$A'_{new} = y = \sim 1.8$$

As expected the seed gain, in the second term, is larger than the first. Notice that in both cases the seed gain is physically realizable (with a 1 W laser, we can never get more than t_n extra energy from charge time $t_n$, and in our case we get 2⁄7 and 0.9 respectively).

In practice, it is often desirable to simply simulate the laser energy model 108 and then find the desired seed gains that result. The toy example discussed above simply shows the behavior of this simulation for a particular case. The control circuit 106 can thus provide seed energy control signals 3502 to the variable seed laser to control the values for A in a manner that achieves a desired regulation of the energy levels in the pulses of the pulse burst. As discussed above, this regulation can be equalized pulse energy. However, it should be understood that this need not necessarily be the case if desired by a practitioner.

Matched Filters to Determine Target Obliquity:

In accordance with another example embodiment, the lidar receiver can employ multiple matched filters to determine target characteristics such as target obliquity and/or target retro-reflectivity.

Figures 36A, 36B, 36C:
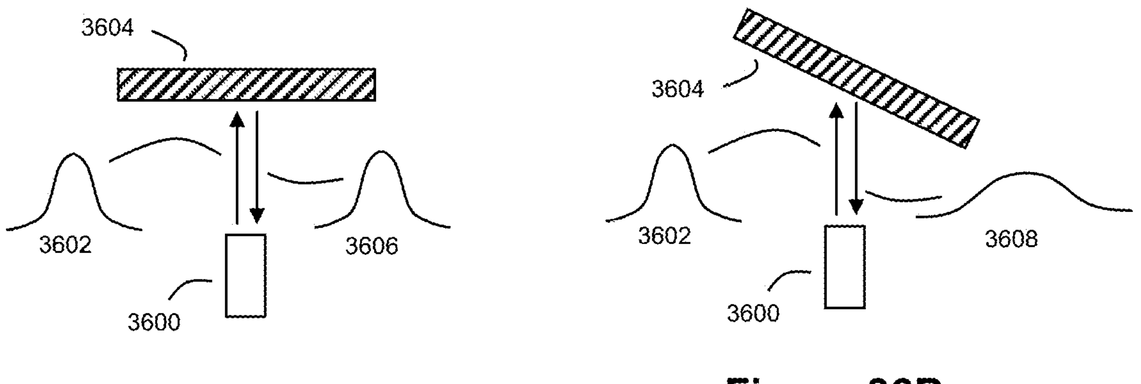
FIGS. 36A and 36B show examples of how target obliquity can produce return pulse stretching.
FIG. 36C shows an example signal processing circuit for a lidar receiver that uses multiple matched filters to determine target obliquity.

FIGS. 36A and 36B show examples of how target obliquity can produce stretching in the shape of the return pulse that is reflected by a target.

The example of FIG. 36A shows a lidar system 3600 that transmits a lidar pulse 3602 toward a target 3604 that is oriented perpendicularly relative to the lidar system 3600. In other words, the target 3604 in FIG. 36A is non-oblique. With this non-obliquity orientation, the return pulse 3606 that is detected by the lidar receiver will exhibit the same shape as the transmitted pulse 3602. Because the target 3604 is perpendicular to the transmitted pulse 3602, its photons will strike the target at a time exactly synchronized (temporally) with the order the photons were launched. Thus, if the photons in the transmitted pulse 3602 were transmitted with a 2 nsec width, then they would impact the target 3602 and return to the lidar receiver with the same width.

In the example of FIG. 36B, the target 3604 is oblique (non-perpendicular) relative to the incoming pulse 3602. This oblique orientation means that the portion of the target 3604 that is closest to the lidar system 3600 will reflect the pulse 3602 sooner, while the portion of the target 3604 that is furthest from the lidar system 3600 will reflect the pulse later. This spreading of reflection times will produce a stretching (or elongation) of the pulse return as indicated by the shape of return pulse 3608 shown by FIG. 36B.

Accordingly, due to the pulse stretching that is caused by the obliquity of the target, the lidar receiver 1400 can determine target obliquity by being able to detect pulse stretching in the return pulse. To facilitate such detection, the lidar receiver 1400 can employ matched filters that are tuned to detect defined pulse shapes such as stretched pulse returns. FIG. 36C shows an example lidar receiver 1400 that uses multiple matched filters 3610 to determine target obliquity. The circuitry of FIG. 36C can be implemented as a portion of signal processing circuit 1820.

A filter bank of different matched filters 3610 can process the pulse return samples 2004 that represent the return signal 1806 as digitized by an analog-to-digital converter (ADC). These samples 2004 can be stored in a cache memory that serves as part of signal processing circuit 1820 to provide for high speed access to such samples for processing. Each matched filter 3610 can be tuned with a different pulse shape that corresponds to a different amount of target obliquity. For example, Matched Filter 1 in FIG. 36C can be tuned with a pulse shape that corresponds to a pulse reflection from a non-oblique target while Matched Filter N in FIG. 36C can be tuned with a pulse shape that corresponds to a pulse reflection from an oblique target (e.g., 15 degrees of obliquity, 30 degrees, 45 degrees, etc.).

A comparator 3612 can then compare the responses of the different matched filters 3610 to the pulse return samples 2004. The matched filter 3610 which produces the largest response can be classified by logic 3614 as the matched filter that most closely corresponds to the target's obliquity. Logic 3614 can thus determine the target's obliquity as the obliquity which corresponds to the matched filter 3610 with the largest response. Accordingly, in an example where the lidar receiver 1400 employs two matched filters 3610 (e.g., where N=2 in FIG. 36C) the lidar receiver can discriminate between oblique and non-oblique targets by tuning one of the matched filters to an unstretched pulse return while tuning the other matched filter so that it is able to detect an amount of stretching that would correspond to a minimum obliquity needed by the target to be classified as "oblique" rather than "non-oblique". However, it should be understood that values of N larger than 2 could be employed by the lidar receiver 1400. For example, different matched filters can be tuned to correspond to different amounts of obliquity—such as 0 degrees, 15 degrees, 30 degrees, 45 degrees, etc. of obliquity, in which case the return pulse shapes would be progressively stretched for greater degrees of obliquity.

In an example embodiment, the matched filters 3610 can be deployed in parallel on the signal processing circuit 1820 so that the pulse return samples 2004 are tested in parallel against each of the matched filters 3610. Such parallel deployment of multiple matched filters 3610 can allow the lidar receiver 1400 to determine target obliquity at low latency and high throughput. Parallelized compute resources such as the parallelized logic available on field programmable gate arrays (FPGAs) and/or application-specific integrated circuits (ASICs) can be used to implement the matched filter processing shown by FIG. 36C.

FIG. 37A shows an example process flow for how a matched filter 3610 can be tuned to detect a particular stretched pulse shape. The process flow of FIG. 37A can be implemented by receiver controller 1810 as machine-readable code that is resident on a non-transitory machine-readable storage medium such as memory within or available to the receiver controller 1810 if desired by a practitioner. The code can take the form of software or firmware that define the processing operations discussed herein. This code can be downloaded onto a processor within the receiver controller 1810 using any of a number of techniques, such as a direct download via a wired connection as well as over-the-air downloads via wireless networks, which may include secured wireless networks.

At step 3700 of FIG. 37A, the processor selects a stretch factor box pulse that corresponds to a desired amount of target obliquity. This stretch factor box pulse can be referred to as SFBP(i), where the index i references which matched filter 3610 is being tuned. The SFBP takes the form of a square pulse that exhibits the following property:

$$SFBP(t) \equiv \frac{1}{f}, \text{ where } t \in [0, f]$$

Thus, the stretch factor f denotes the length of the square pulse, where longer pulse lengths will have the effect of reducing the pulse's magnitude. FIG. 37B shows two examples of different SFBPs, where SFBP(1) employs a smaller stretch factor (which corresponds to less pulse stretching, and hence less target obliquity) than SFBP(2). The range of values for f (and in particular, a maximum value for f) can be chosen by a practitioner based on empirical observation (or numerical simulation) of how much pulse stretching is tolerated before the return pulse is no longer detectable. That is, as the value of f grows larger (corresponding to greater target obliquity), a point will be reached where the return pulse becomes hidden and undetectable within thermal and/or optical noise within the incident light that impacts the photodetector array 1802, and a practitioner can choose to keep the maximum value for f below this point. Which values of f correspond to which target obliquities can be determined as a function of geometric considerations, as discussed below.

At step 3702, the processor convolves a reference pulse (Pref) with the selected SFBP(i). This convolution operation, which can be performed in the digital domain on samples that represent SFBP(i) and Pref, operates to generate a pulse reflection reference shape PRRS(i). The reference pulse Pref is the pulse shape that is exhibited by the transmitted laser pulse 3604, and the pulse reflection reference shape (PRRS(i)) is the pulse shape that would be exhibited by the reflection of the transmitted laser pulse 3604 from a target at the desired amount of obliquity. FIG. 37B shows two examples of how this convolution operation can generate PRRSs. In the upper example, it can be seen that a narrower SFBP(1) is convolved with Pref to produce PRRS(1), where PRRS(1) largely mirrors Pref. Accordingly, this upper example represents a case where the target is largely non-oblique to the transmitted pulse 3604. In the lower example, it can be seen that a more elongated SFBP(2) is convolved with Pref to produce PRRS(2), where PRRS(2) shows a fair amount of stretching relative to PRRS(1). As such, it should be understood that PRRS(2) would correspond to an oblique target.

At step 3704, the processor stores PRRS(i) in a register for the subject matched filter 3610. This has the effect of tuning the subject matched filter to detect pulse reflections of the shape exhibited by PRRS(i), and thus detect reflections from targets at the subject amount of obliquity. Thus, the process flow of FIG. 37A can be performed over the range and resolution of target obliquity (e.g., for each amount of target obliquity) that the practitioner wants the lidar receiver 1400 to have sensitivity to. It should also be understood that the convolutions of Pref with different SFBP(i)'s can be pre-computed and stored in a lookup table (LUT) if desired by a practitioner to reduce computations and/or latency. When a practitioner later wants to tune a matched filter 3610 to detect a given target obliquity, the LUT can then be accessed to determine the PRRS(i) values to use for tuning the matched filter 3610 to that given target obliquity.

FIG. 37C shows an example matched filter 3610 that can be tuned in accordance with the process flow of FIG. 37A. The matched filter 3610 includes a register 3710 in which PRRS(i) is stored, preferably as a plurality of samples. However, it should be understood that the PRRS(i) can be represented in different forms; e.g., as a parametric expression. The matched filter 3610 also includes correlation logic 3720 that operates to correlate pulse return samples 2004 against the PRRS(i) samples from register 3710. This correlation operates to produce a cross-correlation that will reach its maximum value when the shape of the pulse return samples 2004 most closely aligns with the shape of the PRRS(i) samples. Accordingly, it should be understood that the signal processing circuit 1820 may include multiple matched filters 3610, where each matched filter 3610 is tuned to a different PRRS(i) which corresponds to a different amount of target obliquity.

Figure 38:
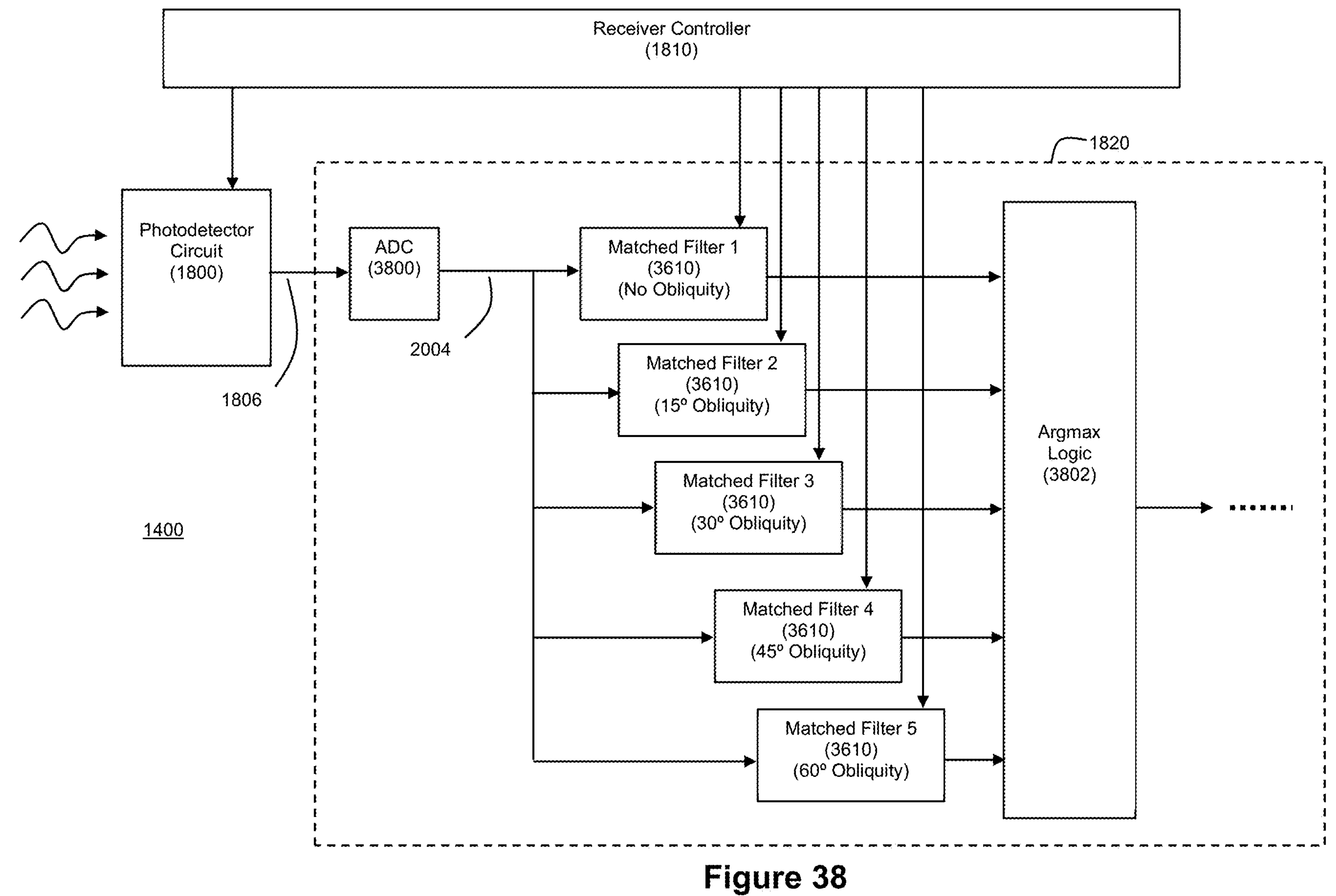
FIG. 38 shows another example lidar receiver architecture that uses multiple matched filters to determine target obliquity.

FIG. 38 shows an example lidar receiver 1400 that uses 5 matched filters 3610 in parallel to determine target obliquity. While the example of FIG. 38 uses 5 matched filters 3610, it should be understood that a practitioner may choose to employ more or fewer matched filters 3610 in the lidar receiver 1400 depending on how much sensitivity the practitioner desires for the lidar receiver 1400 with respect to target obliquity.

In the example of FIG. 38, the photodetector circuit 1800 receives incident light and generates return signal 1806 as discussed above. The signal processing circuit 1820 includes an ADC 3800 that converts the return signal 1806 into the pulse return samples 2004. These pulse return samples 2004 are then processed in parallel through Matched Filters 1-5. In this example, Matched Filter 1 can be tuned to detect pulse returns from a target with no obliquity, while Matched Filters 2-5 can be tuned to detect pulse returns from a target at obliquities of 15 degrees, 30 degrees, 45 degrees, and 60 degrees respectively. The outputs of the parallel matched filters 3610 are fed into argmax logic 3802. The argmax logic 3802 operates to identify which of the outputs from the parallel matched filters 3610 produces the largest response. This identification would then serve to identify the obliquity of the subject target (based on the obliquity that corresponds to the matched filter 3610 which produced the largest response).

It should be understood that the signal processing circuit 1820 of FIG. 38 can include additional features as discussed above. For example, the signal processing circuit 1820 can include threshold comparisons that operate to detect the existence of the pulse return itself. In this regard, the signal processing circuit 1820 would then operate to use threshold testing to detect the existence of a pulse return from a target (as opposed to noise) and also use the matched filters 3610 to determine the obliquity of the target from which the detected pulse return was received. Further still, the signal processing circuit 1820 can also include logic that determines the range for the target from which the pulse return was received as well as logic for refining the angle to the target in the event pulse bursts are fired toward the target. The signal processing circuit 1820 can be deployed as parallelized hardware logic available on processors such as FPGAs or ASICs if desired by a practitioner. However, it should also be understood that one or more of the processing operations described herein for the signal processing circuit 1820 could also be deployed in software executed by a general purpose processor or the like if desired by a practitioner.

The receiver controller 1810 can operate to tune the matched filters 3610 to their corresponding obliquities using the technique of FIG. 37A. Receiver controller 1810 can also operate to control the photodetector circuit 1800 and other aspects of the signal processing circuit 1820 as discussed above. For example, the receiver controller 1810 can control the activation and readout of pixels within the photodetector circuit as well as control the detection intervals that are used by the signal processing circuit 1820 to detect given returns from particular laser pulse shots using techniques as described above.

Orienting the Lidar System to a Frame of Reference:

The lidar system can advantageously use the determined target obliquity in any of a number of fashions. For example, in a particular advantageous case, the determined target obliquity can be used to orient the lidar system to a frame of reference as the lidar system moves through space. In this regard, the determined target obliquity can allow the lidar system to keep track of where the horizon is located, even as the lidar system may tilt upward or downward (e.g., as would be caused by bumps in the road that are encountered by a lidar-equipped vehicle). By tracking how the lidar system's field of view shifts in response to such tilting, the lidar system can compute offsets that map data in the point cloud and/or scheduled shots to the shifted field of view. To accomplish this, the lidar receiver can determine the obliquity of fiducials in the field of view, such as a road surface or a street sign. For example, a street sign can be treated as being oriented perpendicular to the horizon.

Figure 39A:
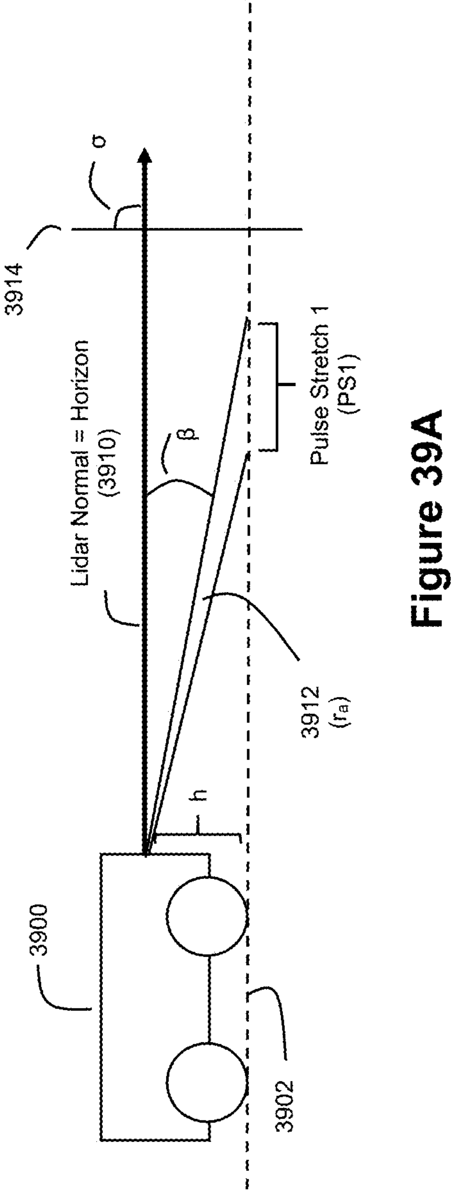
FIGS. 39A and 39B show an example environmental context for horizon tracking with a lidar system when a vehicle experiences a vertical displacement that tilts the lidar system relative to the horizon.
Figure 39B:
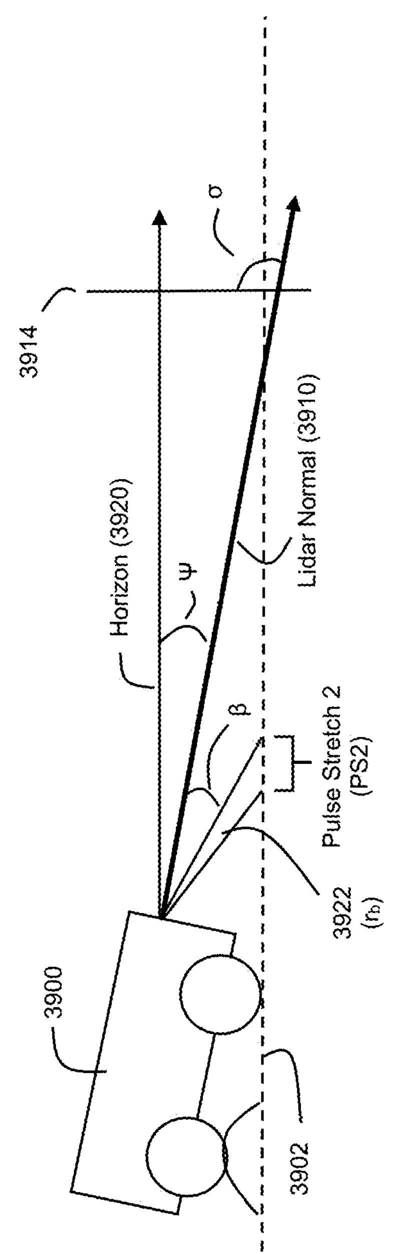

FIGS. 39A and 39B show an example environmental context for horizon tracking with a lidar system when a vehicle 3900 experiences a vertical displacement that tilts the lidar system relative to the horizon.

FIG. 39A shows the case where the vehicle 3900 is untilted while traveling on a flat road 3902 with all tires touching the road 3902. In this case, the "lidar normal" 3910 of the lidar system points to the horizon. The lidar system can be calibrated at the factory so that its 0 degrees shot setting (which is shown as the lidar normal 3910 in FIG. 39A) maps to the horizon, where the horizon can be defined in this context as a ray perpendicular the ground 3902 at a height of h, where the height h corresponds to the mounting height of the lidar system on the vehicle 3900.

If there is an object 3914 such as (1) a car moving toward the vehicle 3902 in the vehicle's lane or away from the vehicle 3902 (ignoring microstructure on the object 3914 such as curved facets, etc.) or (2) a vertical sign, such an object 3914 will present as being non-oblique when the vehicle 3900 is oriented as shown by FIG. 39A. In this case, the angle sigma (σ) of the object 3914 relative to the transmitted laser pulse shot (at the lidar normal 3910) will be π/2 (90 degrees).

Now, suppose the vehicle 3900 of FIG. 39A fires a laser pulse shot at the ground 3902 at angle beta (p). In this example, it should be understood that the angle β serves as the elevation angle of lidar system (the angle between the laser pulse shot and the lidar normal 3910). This pulse's forward edge will strike the road surface 3902 at a range $r_a$ from the lidar system, and the rear edge of the pulse will strike the road surface 3902 closer to the vehicle 3900. This characteristic of pulse width is called beam divergence, and a given laser source 102 for a lidar system will have a known beam divergence characteristic that is available from the vendor of the laser source 102. The difference between where the forward edge and rear edge of the pulse impact the road surface 3902 can be referred to as the pulse stretch (see PS1 in FIG. 39A).

The relationships between $r_a$, beam width W, elevation angle β, the height h, and the pulse stretch PS1 can be expressed as:

$$r_a = \frac{h}{\sin(\beta)},\ PS1 \approx \frac{hW\sec(\beta)}{(\tan(\beta)+W)\tan(\beta)}$$

With these relationships, we expect the pulse stretching to be unbounded when β=0. That is, when the shot is fired at the horizon, the pulse will not reflect off the road surface 3902. Furthermore, the pulse stretching will be zero when β=+/−90 degrees; which means that if the pulse were to be fired straight down (or up, say indoors at a wall), that pulse would be perpendicular to the flat road surface 3902.

FIG. 39B shows a scenario where the vehicle 3900 has struck a bump, causing the vehicle 3900 to rock up and down (which creates a mismatch between the lidar normal 3910 and horizon 3920). In the example of FIG. 39B, the vehicle 3900 is tilting down as it would when its rear tires are elevated because of a bump in an otherwise flat road 3902. In this case, the lidar normal 3910 also tilts downward relative to the horizon 3920 by angle psi (Ψ). This non-zero angle Ψ would thus represent the angular extent of divergence between the lidar normal 3910 and horizon 3920.

In FIG. 39B, the object 3914 (such as a street sign) will now not appear perpendicular to the lidar normal 3910, in which case the angle σ will present an obliqueness (i.e., the angle σ will no longer be 90 degrees). This disparity between the angle σ and 90 degrees equals the angle Ψ.

If the lidar system in the orientation of FIG. 39B fires a laser pulse shot at the same angle β as shown by FIG. 39A, it can be seen that the laser pulse shot will impact the road surface 3902 closer to the vehicle 3900 than shown by FIG. 39A, as denoted by range $r_b$. This results in a different pulse stretch (PS2) (and we will assume that any change in the height h is negligible). This means, that for the pulse stretch expression above, we can replace β with β+Ψ, which yields the following expression for PS2 following some minor geometric algebra:

$$PS2 \approx \frac{hW\sec(\beta)}{(\tan(\beta)+\Psi)(\tan(\beta)+\Psi+W)}$$

In the example of FIG. 39B, where the vehicle 3900 tilts downward, it can be seen that both the pulse stretch PS2 and range $r_b$ will decrease relative to the FIG. 39A case for pulse stretch PS1 and range $r_a$. It should be understood that the same basic principles and relationships apply for a use case where the vehicle tilts upward, albeit where the divergence between the lidar normal 3910 and horizon 3920 will be in the opposite direction. Note that the slope of PS is monotonic. We conclude there is a 1:1 relationship between the angle Ψ and the pulse stretch PS, which allows us to infer the vehicle pitch from the pulse stretch.

FIG. 39C shows an example process flow for using the measured pulse stretch (PS) with respect to a pulse fired toward the road surface 3902 to determine the angle Ψ, which then allows the lidar system to orient itself relative to a defined frame of reference such as horizon 3920.

At step 3950, the lidar receiver 1400 measures the pulse stretch (PS2) for a laser pulse shot in the ground plane at elevation shot angle β using the obliquity of the ground plane (which can be determined using the techniques discussed above in connection with FIGS. 36C and 38). For example, the relationship between the pulse stretch (PS) and the stretch factor variable f for a Gaussian pulse can be expressed, assuming the beam spread is sufficiently small that the cubic energy fall off is negligible inside the ground footprint, as:

$$PS \sim \sqrt{1+2\ln(2)f^2}.$$

Here we use the fact that Gaussian pulse variance sums in quadrature, and HWHM (half width half max) for a Gaussian is given 2 ln(2) times the variance, and f is the standard Gaussian scale factor, with the initial pulse width HWHM normalized to unity.

Thus, when the stretch factor f is zero (indicating that the target is not oblique), then the pulse stretch PS is 1, which indicates no stretching. By contrast, when the stretch factor f is 2 ($f^2$=4), this results in the pulse stretch being around 2.6, which roughly corresponds to a 3× pulse stretching relative to the unstretched pulse.

At step 3952, the lidar receiver 1400 computes the angle Ψ based on the measured pulse stretch PS2. To accomplish this, the lidar receiver 1400 can solve the following quadratic equation, where the solution Ψ has a real positive root (which serves as the pitch angle of the vehicle 3900):

$$(\tan(\beta)+\Psi)(\tan(\beta)+\Psi+W)-\frac{hW\sec(\beta)}{PS2}=0\rightarrow\Psi^2+\Psi(W+2\tan(\beta))+\left(\tan^2(\beta)+W\tan(\beta)-\frac{hW\sec(\beta)}{PS2}\right)=0$$

This pitch angle Ψ also serves as a correction angle that can be used to adjust scheduled shot angles and/or point cloud return data to accommodate the tilted field of view (step 3954). For example, if the lidar system was supposed to fire a laser pulse shot at an elevation angle of 0 degrees when the vehicle 3900 is tilted below the horizon 3920 at the pitch angle of Ψ, then the lidar system can correct that shot to an elevation angle of P degrees above the lidar normal 3910. Similarly, if the point cloud has tracked a particular object at an elevation angle of (say) 15 degrees above horizon 3920, then the lidar system could adjust its knowledge so that the elevation angle to that target is 15+Ψ degrees when the vehicle 3900 is tilted as shown by FIG. 39B. This step 3954 of adjusting shot angles and/or point cloud data can be performed by a processor within control circuit 108, whereas steps 3950 and 3952 can be performed by the signal processing circuit 1820 or receiver controller 1810.

FIG. 39D shows an example process flow for using the measured pulse stretch (PS) with respect to a pulse fired toward an object with a known orientation relative to the horizon 3920 (such as a road sign that is presumed to be perpendicular to the horizon 3920) to determine the angle T. The process flow of FIG. 39D may be useful when a vehicle 3900 is in heavy traffic (in which case there may not be a clear shot line to the road surface 3902) or in other scenarios where the shot path to the road surface 3902 is not clear.

At step 3960, the lidar receiver 1400 measures the pulse stretch (PS2) for a laser pulse shot fired at object 3914 at elevation shot angle β using the obliquity of the object (which can be determined using the techniques discussed above in connection with FIGS. 36C, 38 and 39C).

At step 3962, the lidar receiver 1400 computes the angle Ψ based on the measured pulse stretch PS2 and the measured range $r_b$. To accomplish this, the lidar receiver 1400 can use the following expression to solve for the angle Ψ:

$$\Psi=\frac{PS2}{r_b}-W$$

Step 3954 can then be performed to adjust shot angles and/or point cloud angles based on the correction angle Ψ while the vehicle is tilted as shown by FIG. 39B.

When performing a point cloud adjustment as part of step 3954 for FIG. 39C and/or FIG. 39D, the system can apply the correction offset angle Ψ after a given laser pulse shot is taken. But, when performing step 3954 for FIG. 39C and/or FIG. 39D to adjust a shot angle of a scheduled shot, the shot adjustment will rely on a prediction of where the lidar system is oriented when the next shot is to be taken. Accordingly, the faster that the lidar system can update its estimation of where the horizon 3920 is located, the shorter the time scale that is needed for predicting orientation. Accordingly, it should be understood that one of the benefits of the matched filter approach described herein is that the use of multiple matched filters 3610 within the lidar receiver 1400 allows the system to track the horizon 3920 very quickly on a per-shot basis, which is expected to perform significantly better than using a downstream perception across multiple frames in the point cloud to determine orientation. In this fashion, it can be appreciated that the use of multiple matched filters 3610 as described herein to determine target obliquity to orient the lidar system relative to a frame of reference such as horizon 3920 supports hyper temporal operations of the lidar system.

A primary use case for horizon tracking in order to keep laser pulse shots steady in absolute elevation coordinates is for long range detection on highways or other roads where lidar-equipped vehicles are moving at relatively fast speeds. In this context, we do not anticipate major "bumps" in the road (if there is debris (or a pothole) on the road, we generally expect the vehicle to detect and avoid in most cases). Thus, for most highway travel or the like, we expect the elevation and vehicle tilt to oscillate at a fairly slow rate due to the vehicle's suspension system dampening motion for the comfort of passengers during route acceleration.

A typical acceleration is 3 degrees per second squared, and a typical frame rate is 10 Hz. In this context, we can expect the elevation will change by around 0.3 degrees from frame to frame. This is on the order of several beamwidths (W). This means that the reported shot elevations will already drift considerably within the current frame before the next frame is shot. With obliquity detection and estimation using matched filters 3610, the lidar system can orient to the horizon 3920 sufficiently fast to prevent such drift.

As an example, suppose with a 10 Hz frame rate, the lidar system has 100 rows to scan, which implies 1 msec of time spent on each row. If we use the scan time on that row to predict where the horizon will be on the next row scan, the lidar system only needs to predict ahead by 1 msec. For the use case described above, this maps to 0.003 degrees of motion. This amount is negligible, suggesting that we can treat the elevation drift as negligible if we update on a row by row basis.

As the lidar system tracks the horizon 3920, the lidar system may step by different amounts from row scan to row scan. For example, suppose we originally have elevation step sizes of 0.1 degrees so that the lidar system scans {0.1 degrees, 0.2 degrees, 0.3 degrees, . . . , 1 degree} for 10 row scans over 10 msec, with a stable horizon 3920. With horizon correction, we would have elevation step sizes after correction of {0.1003 degrees, 0.2006 degrees, 0.3009 degrees, . . . , 1.03 degrees}. It can be seen that this is a very mild correction, and a practitioner can likely afford to only adjust/correct after every 10 rows or so. A remaining consideration can be eye safety. But, the current criteria for eye safety is the integral across a 2 degree sector, so the slight adjustments described herein will have little to no impact on eye safety. More specifically, as long as there is a few percent margin in terms of dosage, the lidar system will remain eye safe after horizon correction.

Another consideration for horizon tracking to correct elevation shot angles arises from signal to noise ratio (SNR) considerations. High SNR is desired when determining target obliquity so that horizon estimations are accurate. To accomplish such high SNR, it is desirable that the laser pulse shots that are used for purposes of finding the horizon 3920 exhibit relatively high shot energy. For example, the following expression relates a desired tolerance for tracking the orientation of the lidar system in terms of variables such as SNR, the correction angle Ψ, the pulse stretch PS, and beamwidth W:

$$\text{rms}_{error(\Psi)} \sim \frac{2\sqrt{2}}{SNR}\frac{WPS}{W\Psi}$$

Thus, if we wish to track the horizon within 0.1 degrees and we have a 3 nsec unstretched reference pulse, where the shot is fired 12 degrees below the horizon with a lidar system mounted 1.5 m above the ground with a beam divergence of 0.1 degrees, the SNR that is desired would be around 14. This presents only a modest demand on frame rate since the lidar system will only need a few dedicated shots (whether targeting the road surface or a sign) to solve for the horizon 3920 using the techniques described herein.

Further still, while the matched filter examples described herein focus on target obliquity in terms of elevation, it should be understood that the same principles apply in the azimuth direction. As such, the techniques described herein can also be used to detect obliquity in the azimuth direction.

Matched Filters to Determine Target Retro-Reflectivity:

The matched filter techniques discussed above can also be used to determine a retro-reflectivity characteristic of the target. Highly retro-reflective targets can produce high magnitude pulse returns that may overwhelm the lidar receiver 1400 (either by exceeding the linear regime of the photodetector array 1802 or by exceeding the bit range of the ADC 3800). Such high magnitude pulse returns can then manifest themselves as a pulse return shape 4020 that exhibits a vertical clipping 4022, as shown by FIG. 40. The signal processing circuit 1820 can then be configured to determine a retro-reflectivity characteristic of the target by tuning one or more matched filters 3610 to detect a pulse return shape that exhibits some degree of vertical clipping 4022.

For example, as shown by FIG. 40, Matched Filter 1 can be tuned with a regular pulse return shape while Matched Filter 2 can be tuned with a vertically clipped pulse return shape 4020. The pulse return samples 2004 can be applied to these matched filters 4010, and a comparator 4012 can compare the responses of these matched filters 4010 to determine which of the matched filters 4010 produced the largest response. Logic 4014 can then operate to determine the target's retro-reflectivity based on which of the matched filters 4010 (suitably scaled (e.g., with unit energy)) produced the largest response. In an example where the signal processing circuit 1820 includes two matched filters 4010, the signal processing circuit 1820 can characterize the target as retro-reflective or non-retro-reflective based on how the matched filters 4010 respond to the pulse return samples 2004. In another example, the signal processing circuit 1820 can be sensitive to different amounts of retro-reflectivity by tuning multiple matched filters with different vertically clipped pulse return shapes 4022 that correspond to the different amounts of retro-reflectivity. In this fashion, the signal processing circuit can operate in a similar fashion to the signal processing circuit 1820 of FIG. 38 to provide deeper insight into target retro-reflectivity. Matched filter 4010 can have the same basic configuration as matched filter 3610 shown by FIG. 37C, but where the PRRS(i) stored in register 3710 is a representation of the vertically clipped pulse return shape 4020. To tune the matched filter 4010 in this regard, PRRS(i) can be computed as a function of time as the minimum of P(t) and V, where V is a specified vertical clip level 4022 and where P(t) is the anticipated unclipped pulse return shape.

Moreover, it should be understood that the retro-reflectivity characterization can be combined with the target obliquity determination by first computing P(t) as the stretched PRRS(i) shape in accordance with the FIG. 36A process flow, and then computing the minimum relative to V as noted above. Thus, for oblique targets that exhibit sufficiently high retro-reflectivity, the signal processing circuit 1820 can be sensitive to both the obliquity and the retro-reflectivity.

While the invention has been described above in relation to its example embodiments, various modifications may be made thereto that still fall within the invention's scope.

For example, while the example embodiments discussed above involve a mirror subsystem architecture where the resonant mirror (mirror 110) is optically upstream from the point-to-point step mirror (mirror 112), it should be understood that a practitioner may choose to position the resonant mirror optically downstream from the point-to-point step mirror.

As another example, while the example mirror subsystem 104 discussed above employs mirrors 110 and 112 that scan along orthogonal axes, other architectures for the mirror subsystem 104 may be used. As an example, mirrors 110 and 112 can scan along the same axis, which can then produce an expanded angular range for the mirror subsystem 104 along that axis and/or expand the angular rate of change for the mirror subsystem 104 along that axis. As yet another example, the mirror subsystem 104 can include only a single mirror (mirror 110) that scans along a first axis. If there is a need for the lidar transmitter 100 to also scan along a second axis, the lidar transmitter 100 could be mechanically adjusted to change its orientation (e.g., mechanically adjusting the lidar transmitter 100 as a whole to point at a new elevation while mirror 110 within the lidar transmitter 100 is scanning across azimuths).

As yet another example, a practitioner may find it desirable to drive mirror 110 with a time-varying signal other than a sinusoidal control signal. In such a circumstance, the practitioner can adjust the mirror motion model 308 to reflect the time-varying motion of mirror 110.

As still another example, it should be understood that the techniques described herein can be used in non-automotive applications. For example, a lidar system in accordance with any of the techniques described herein can be used in vehicles such as airborne vehicles, whether manned or unmanned (e.g., airplanes, drones, etc.). Further still, a lidar system in accordance with any of the techniques described herein need not be deployed in a vehicle and can be used in any lidar application where there is a need or desire for hyper temporal control of laser pulses and associated lidar processing.

As yet another example, while the example FIG. 31 process flow shows the firing of the pulse burst 2800 in response to target detection from an initial laser pulse shot (see step 3100), it should be understood that the initial laser pulse shot can be omitted in certain circumstances if desired by a practitioner. Improvements in angle resolution can still be achieved through the use of returns from just the pulse burst. While the additional use of the initial pulse return helps further improve angle resolution while also improving performance by averaging out more noise, some practitioners may find it desirable to fire pulse bursts 2800 even if an initial laser pulse shot was not fired.

As still another example, while the example embodiments for angle resolution using pulse bursts discussed above employ compute resources within the lidar receiver 1400 to resolve the angle to the target, it should be understood that compute resources located elsewhere in the lidar system could be employed for this purpose if desired by a practitioner. While having the lidar receiver 1400 perform the angle resolution is advantageous because of the reduced latency involved in having the relevant processing operations performed by the system components that directly process the return signals from the laser pulse shots, it should be understood that some practitioners may choose to employ compute resources located elsewhere (such as compute resources within the system controller 800 if a practitioner deems the increased latency arising from data transfer across system components acceptable.

These and other modifications to the invention will be recognizable upon review of the teachings herein.

What is claimed is:

1. A lidar system comprising:

a photodetector circuit, the photodetector circuit comprising an array of pixels for sensing incident light; and a signal processing circuit for processing a signal representative of the sensed incident light to detect a reflection of a laser pulse from a target within a field of view, wherein the signal processing circuit comprises a matched filter corresponding to a retro-reflective target that is tuned to a reflected pulse shape that exhibits a vertical clipping relative to a transmitted pulse shape for the laser pulse that is indicative of the retro-reflective target, wherein the matched filter is tuned according to a function that computes a minimum as between (1) a specified vertical clip level corresponding to a saturation threshold of at least one of the array of pixels or an analog-to-digital converter and (2) a reference pulse shape corresponding to the transmitted pulse shape, and wherein the signal processing circuit determines a retro-reflector status for the target based how the matched filter responds to the signal.

2. The lidar system of claim 1, wherein the matched filter includes a plurality of matched filters corresponding to different amounts of retro-reflectivity for the target that are tuned to different reflected pulse shapes for reflections from the target at different amounts of retro-reflectivity.

3. The lidar system of claim 2, wherein the signal processing circuit determines an amount of retro-reflectivity for the target based on which of the plurality of matched filters produces a largest response to the signal.

4. The lidar system of claim 2, wherein the different amounts of retro-reflectivity include non-retro-reflectivity.

5. The lidar system of claim 2, wherein the plurality of matched filters include:

a first matched filter tuned to a reflected pulse shape for a reflection from a non-retro-reflective target; and a second matched filter tuned to a reflected pulse shape for a reflection from a retro-reflective target.

6. The lidar system of claim 5, wherein the signal processing circuit classifies the target as retro-reflective or non-oblique not retro-reflective based on which of the first matched filter and the second matched filter produces a larger response to the signal.

7. The lidar system of claim 2, wherein the plurality of matched filters include:

a first matched filter tuned to a reflected pulse shape for a reflection from a non-retro-reflective target;

a second matched filter tuned to a reflected pulse shape for a reflection from a retro-reflective target at a first amount of retro-reflectivity; and a third matched filter tuned to a reflected pulse shape for a reflection from a retro-reflective target at a second amount of retro-reflectivity.

8. The lidar system of claim 7, wherein the signal processing circuit determines whether the target exhibits non-retro-reflectivity, the first amount of retro-reflectivity, or the second amount of retro-reflectivity based on which of the first matched filter, the second matched filter, and the third matched filter produces a largest response to the signal.

9. The lidar system of claim 2, wherein each of the plurality of matched filters is tuned according to a function that computes a minimum as between (1) a specified vertical clip level corresponding to a defined amount of retro-reflectivity and (2) a reference pulse shape, wherein different matched filters are associated with different specified vertical clip levels corresponding to different amounts of retro-reflectivity.

10. The lidar system of claim 9, wherein the reference pulse shape is a convolution of a stretch factor box pulse with a reference pulse shape corresponding to a transmitted laser pulse shot, wherein the stretch factor box pulse corresponds to a stretch factor that is indicative of an extent of target obliquity, and wherein the different matched filters are associated with different stretch factor box pulses corresponding to different stretch factors that are indicative of different extents of target obliquity.

11. The lidar system of claim 9, further comprising:

a lookup table of precomputed minimum functions; and a control circuit that tunes the plurality of matched filters based on the precomputed minimum functions in the lookup table.

12. The lidar system of claim 2, wherein the signal processing circuit applies the signal to the plurality of matched filters in parallel.

13. The lidar system of claim 1, wherein the matched filter comprises:

a register in which data corresponding to a pulse reflection reference shape is stored to thereby tune the matched filter to a given reflected pulse shape; and correlation logic that performs a cross-correlation between the data in the register and the signal.

14. The lidar system of claim 13, wherein the pulse reflection reference shape is stored in the register as a plurality of samples, and wherein the correlation logic performs the cross-correlation between the plurality of samples in the register and a plurality of samples representative of the signal.

15. The lidar system of claim 1, wherein the signal processing circuit further comprises an analog-to-digital converter (ADC) that generates a plurality of digital samples that are representative of the sensed incident light, and wherein the signal comprises the plurality of digital samples.

16. The lidar system of claim 15, wherein the signal processing circuit further comprises a cache memory for caching the plurality of digital samples to be applied to the matched filter.

17. The lidar system of claim 1, wherein the signal processing circuit comprises an application-specific integrated circuit (ASIC) on which the matched filter is deployed.

18. The lidar system of claim 1, wherein the signal processing circuit comprises a field programmable gate array (FPGA) on which the matched filter is deployed.

19. The lidar system of claim 1, further comprising:

a lidar transmitter; and a control circuit;

wherein the control circuit defines a shot energy for a laser pulse shot to be transmitted by the lidar transmitter and for use in producing a pulse reflection from which a retro-reflectivity for the target is determined, wherein the defined shot energy provides a desired amount of signal-to-noise ratio for producing a desired amount of accuracy with respect to the determined retro-reflectivity for the target.

20. The lidar system of claim 1, wherein the laser pulse exhibits a transmitted laser pulse shape that is Gaussian.

21. The lidar system of claim 1, wherein the target is a road surface.

22. The lidar system of claim 1, wherein the target is an object above a road surface.

23. The lidar system of claim 22, wherein the object comprises a moving object.

24. The lidar system of claim 23, wherein the object comprises a street sign.

25. The lidar system of claim 1, further comprising:

a laser source;

a lidar transmitter, wherein the lidar transmitter comprises a plurality of scannable mirrors, and wherein the lidar transmitter transmits a plurality of laser pulses from the laser source toward a plurality of targets in the field of view via the plurality of scannable mirrors according to a shot list; and a control circuit that schedules laser pulses in the shot list for targeting defined range points in the field of view based on (1) a laser energy model that models energy available for laser pulses from the laser source over time and (2) a mirror motion model that models motion for at least one of the plurality of scannable mirrors over time.

26. The lidar system of claim 25, wherein the lidar transmitter scans a first scannable mirror in a resonant mode and scans a second scannable mirror in a point-to-point mode according to a step function that varies as a function of the defined range points targeted by the shot list.

27. A lidar method comprising:

sensing incident light via an array of pixels, wherein the incident light includes a reflection of a laser pulse from a target within a field of view;

applying a signal representative of the sensed incident light to a matched filter corresponding to a retro-reflective target that is tuned to a reflected pulse shape that exhibits a vertical clipping relative to a transmitted pulse shape for the laser pulse that is indicative of the retro-reflective target, wherein the matched filter is tuned according to a function that computes a minimum as between (1) a specified vertical clip level corresponding to a saturation threshold of at least one of the array of pixels or an analog-to-digital converter and (2) a reference pulse shape corresponding to the transmitted pulse shape; and determining a retro-reflector status for the target based on how the matched filter responds to the applied signal.

28. An article of manufacture for a lidar receiver, the article of manufacture comprising:

machine-readable code that is resident on a non-transitory computer-readable storage medium, wherein the machine-readable code defines processing operations to be performed by a processor to cause the processor to:

apply a signal to a matched filter corresponding to a retro-reflective target, wherein the applied signal is representative of incident light sensed by an array of pixels, wherein the incident light includes a reflection of a laser pulse from a target within a field of view for the lidar receiver, and wherein the matched filter is tuned to a reflected pulse shape that exhibits a vertical clipping relative to a transmitted pulse shape for the laser pulse that is indicative of the retro-reflective target, where the matched filter is tuned according to a function that computes a minimum as between (1) a specified vertical clip level corresponding to a saturation threshold of at least one of the array of pixels or an analog-to-digital converter and (2) a reference pulse shape corresponding to the transmitted pulse shape; and determine a retro-reflector status for the target based on how the matched filter responds to the applied signal.

* * * * *